United States Patent [19]
Watanabe et al.

[11] Patent Number: 5,819,016
[45] Date of Patent: Oct. 6, 1998

[54] APPARATUS FOR MODELING THREE DIMENSIONAL INFORMATION

[75] Inventors: Mutsumi Watanabe; Kazunori Onoguchi; Kaoru Suzuki; Takashi Wada; Hiroshi Hattori; Minoru Yagi; Tatsuro Nakamura, all of Tokyo, Japan

[73] Assignee: Kabushiki Kaisha Toshiba, Kanagawa-ken, Japan

[21] Appl. No.: 665,546

[22] Filed: Jun. 18, 1996

Related U.S. Application Data

[63] Continuation of Ser. No. 317,817, Oct. 4, 1994, abandoned.

[30] Foreign Application Priority Data

| Oct. 5, 1993 | [JP] | Japan | 5-248992 |
| Nov. 22, 1993 | [JP] | Japan | 5-292251 |
| Nov. 26, 1993 | [JP] | Japan | 5-296895 |
| Jun. 30, 1994 | [JP] | Japan | 6-148400 |

[51] Int. Cl.[6] ............................................. G06T 7/40
[52] U.S. Cl. .............................................. 395/119
[58] Field of Search ................................ 395/119, 152; 382/106, 154, 144, 145, 209, 218

[56] References Cited

U.S. PATENT DOCUMENTS

| 4,175,862 | 11/1979 | DiMatteo et al. | 382/154 |
| 4,573,191 | 2/1986 | Kidode et al. | 382/106 |
| 4,584,704 | 4/1986 | Ferren | 382/154 |
| 4,736,436 | 4/1988 | Yasukawa et al. | 382/154 |
| 4,752,957 | 6/1988 | Maeda | 382/206 |
| 4,752,964 | 6/1988 | Okada et al. | 382/154 |
| 4,837,616 | 6/1989 | Kasano et al. | 348/139 |
| 4,900,128 | 2/1990 | Lom | 382/154 |
| 4,965,752 | 10/1990 | Keith | 395/127 |
| 4,969,036 | 11/1990 | Bhanu et al. | 348/113 |
| 4,982,438 | 1/1991 | Usami et al. | 382/154 |
| 5,179,638 | 1/1993 | Dawson et al. | 395/125 |
| 5,283,837 | 2/1994 | Wood | 382/285 |
| 5,285,438 | 2/1994 | Marchand et al. | 369/103 |
| 5,345,086 | 9/1994 | Bertram | 250/558 |
| 5,361,127 | 11/1994 | Daily | 356/3.02 |
| 5,490,239 | 2/1996 | Myers | 395/129 |
| 5,579,454 | 11/1996 | Bilyard et al. | 395/121 |

FOREIGN PATENT DOCUMENTS

| 4-86957 | 3/1992 | Japan . |

OTHER PUBLICATIONS

Soneira, Raymond M.; *Three–Dimensional Imaging and Scanning Range Finders Using the Parallax Principle*; 1988; pp. 1715–1720.

Alvertos, Nicolas; *Resolution Limitations and Error Analysis for Stereo Camera Models*; 1988; pp. 220–224.

Chang et al.; *3D Structure Reconstruction from an Ego Motion Sequence Using Statistical Estimation and Detection Theory*; 1991; pp. 268–273.

Chamberlin et al.; *Electronic 3–D Imaging*; 1991; pp. 16–18.

(List continued on next page.)

*Primary Examiner*—Anton W. Fetting
*Attorney, Agent, or Firm*—Finnegan, Henderson, Farabow, Garrett & Dunner, L.L.P.

[57] ABSTRACT

A modelling apparatus including a three-dimensional information input unit for measuring and inputting three-dimensional information concerning objects in a space. An environmental model processing unit constructs an environmental model for each object in the space by comparing prestored object data to the three-dimensional information. A picture composing unit composes an artificial picture from a specific viewpoint within the space according to the environmental model constructed by the environmental model processing unit. An analyzing unit validates the environmental model by comparing the artificial picture composed by the picture composing unit with the three-dimensional information from the specific viewpoint. An observation control unit controls the measurement and input operation of the three-dimensional information input unit according to the result of validation by the analyzing unit.

17 Claims, 62 Drawing Sheets

OTHER PUBLICATIONS

Morikawa et al.; *Structure and Motion of Deformable Objects From Image Sequences;* 1991; pp. 2433–2436.

Sinha et al.; *Use of TV Cameras for Robot Position Determination;* 1992; pp. 567–570.

Lebegue et al.; *Extraction and Interpolation of Semantically Significant Line Segments for a Mobile Robot;* 1992; pp. 1778–1785.

"Using Occupancy Grids for Mobile Robot Perception and Navigation", Elfes, A., Computer, IEEE, pp. 46–57, Jun. 1989.

OTHER REGION A

SEARCH REGION B

PREDICTED PICTURE

PHOTOGRAPHED PICTURE

OPERATION RESULT

APPARATUS FOR MODELING THREE DIMENSIONAL INFORMATION

This application is a continuation, of application Ser. No. 08/317,817, filed Oct. 4, 1994, now abandoned.

BACKGROUND OF THE INVENTION a. Technical Field

The present invention relates to modeling apparatuses which automatically prepare model descriptions useful for three-dimensional (3D) CAD, 3D computer graphics, mobile robot control and other applications.

b. Prior Art

Recent years have witnessed a rapidly increased need for 3D CAD for assisting in the design of industrial components and parts, picture-making by the technique of 3D computer graphics, and intelligent mobile robots. In these technical fields, the computer must be provided with design data, data for computer graphic display or data on the geometry, surface attributes and, where necessary, motion of the environment which robots are to traverse. The process involved is referred to as modeling and the numerical data expressed within the computer is called a model. However, this modeling has so far been made at the cost of much human labor and a great demand exists for automation in this realm.

Recently, an automatic input system claimed to find application in 3D CAD has been proposed which automatically inputs the shape of a presented object employing a distance measuring device called "range finder". However, because of the limited measurable distance of the range finder, the objects that can be input by the current technology are limited to small ones. Expanding the measurable range requires an increase of laser output but this means an increased risk of hazards to human health, so that this system is not suited for indoor use, for example in an office. Furthermore, when the objective is a computer graphic display, data on the color, pattern and other surface attributes are required and the television (TV) camera image must be concurrently input and analyzed. However, since the range image and the camera image are different kinds of information, it is not easy to integrate them.

So far, the technology is also known which involves a direct extraction of the 3D object information from a TV camera picture. Specifically, a stereo technique employing multiple cameras in the manner of triangular surveying and a technique which comprises varying the focal distance of a single camera and analyzing the resulting picture series to obtain 3D information. To site an example of application of this technology to modeling, with a view to application to presence communications and TV conferences, attempts are being made to automatically input the shape of a human face by utilizing the stereo-view technique. Research is also in progress for automatic preparation of stochastic descriptions of spaces by equipping an indoor mobile robot with ultrasonic sensors and/or plural cameras.

However, throughout these research endeavors, the object explored is limited to the face, post, door or the like which can be easily information-processed by the conventional techniques, and complicated objects or domains such as the top of a desk on which office machine and documents are located or a bookcase loaded with a large number of books cannot be input successfully. Furthermore, because of the absence of means for validating and correcting input data, any omission or error of input geometric data that may occur owing to noise and the like cannot be recovered so that only incomplete data can be supplied.

For the reasons mentioned above, the techniques heretofore proposed are still inadequate for the purpose of reducing work burdens in image construction by 3D computer graphics and the automatic construction of environmental models useful for the navigation control of mobile robots.

OBJECT OF THE INVENTION

As mentioned above, the conventional modeling systems are devoid of means for validating and correcting defects and errors of environmental models and, therefore, have the disadvantage that only incomplete environmental models can be provided.

The object of the present invention is to provide a modeling apparatus capable of constructing an environmental model of high precision through the provision of means for enquiring whether an environmental model has any defect or error and, if the answer is affirmative, correcting the defect or error.

SUMMARY OF THE INVENTION

The first modeling apparatus of this invention comprises a 3D information input means for measuring and inputting 3D information concerning objects in a space, an environmental model processing means for constructing an environmental model for each object in said space by applying prestored object data to the 3D information from the 3D information input means, a picture composing means for composing an artificial picture from a specific viewpoint within said space according to the environmental model constructed by the environmental model processing means, an analyzing means for validating the environmental model by comparing the artificial picture composed by the picture composing means with the picture information from the 3D information input means in the specific viewpoint, and an observation control means for controlling the measurement and input operation of the 3D information input means according to the result of validation by the analyzing means.

In this modeling apparatus, the 3D information in the current position is first input by the 3D information input means which is equipped with a means for generating geometric information, such as ultrasonic sensor or TV camera means, and a means for inputting surface attributes such as color and pattern, e.g. a TV camera, according to the attributes of the object present in the environment. This input operation is controlled by the observation control means.

In the environmental model processing means, the above input information and the 3D environment data accumulated in the past are used to perform a data integration and updating and prepare an environmental model description.

The environmental model description thus prepared is transformed into an artificial picture and displayed by the picture composing means utilizing computer graphics.

The analyzing means performs such processings as a validation including the detection of an error in the description due to the omission or invalidity of geometric data input by comparison of the artificial picture with the camera image in the current position and a detection of the region for which a model description has not been obtained to generate a new observation command for correction of the environmental model description.

Thus, in accordance with the present invention, the restriction to the object, which has been a technical problem unsolved by the prior art, is neatly resolved by providing different input means according to different attributes of the object present in the environment and integrating the input results. Moreover, by correcting the environmental model description based on a comparison of the artificial picture composed using the model description and the camera image in the analyzing means, the invention reduces the chances for deterioration of a model description due to the defect or error of input geometric data to thereby provide an accurate model description. Thus, the invention enables the construction of high-precision modeling systems for picture-making by 3D computer graphics and the control of mobile robots.

The modeling apparatus according to the second invention comprises a 3D information input means for generating 3D information such as data on the distance, configuration and surface attributes using the visual information from TV camera, sonar or other visual sensor means, an environmental model processing means for managing the 3D information fed from the 3D information input means and preparing an environmental model, a picture composing means for composing an artificial picture of the environment based on the environmental model stored in the environmental model processing means, an analyzing means for validating the environmental model description by comparing the artificial picture produced by the picture composing means with the visual information in the corresponding position, and an observation control means for distinguishing between the outline and non-outline data on the object space in the input 3D information from the 3D information input means and controls the input action of the 3D information input means so as to sequentially form a detailed environmental model starting with the outline data.

In this arrangement, as the background of the object to be observed, a region where surface information is simple can be selected, and the clipping of the object from the picture and inter-picture collation are facilitated.

Thus, with this modeling apparatus, acquisition of 3D data on the environment is performed by successive observations starting with the outline and, after input of this outermost region, the image of the inner object is input from a position/direction such that a region of simple texture constitutes the background, with the result of the procedure of 3D data acquisition is facilitated and the reliability of acquired data is increased. Since 3D data of high reliability can thus be obtained, the input of a dependable environmental model becomes feasible.

The modeling apparatus according to the third invention comprises a 3D information input means for measuring 3D attributes using TV camera or ultrasonic visual sensor means, an environmental model processing means for managing the 3D information input from the 3D information input means and preparing and memorizing an environmental model description, a picture composing means for composing an artificial picture in a specific position of the environment based on the environmental model description stored in the environmental model processing means, an analyzing means for validating the environmental model description by comparing the artificial picture composed by the picture composing means with the factual picture in the corresponding position, and an observation control means for performing an input control of the 3D information input means, the observation control means comprising an error region estimating means for estimating an error region in the position of observation point accessed by the 3D information input means, an observing site determining means which predicts an error region in the position of observation point from a new observing site and establishes said new observing site in such a manner that the overlap region between the error region estimated by said error region estimating means and the predicted error region will not be greater than the estimated error region, and a position re-estimating means which re-estimates the position of observation point according to the result of measurement by the 3D information input means from the observing site established by the observing site determining means.

In the above arrangement, the observing position is controlled in such a manner that the extent of overlap of the error regions in the observation from a plurality of positions can be diminished, with the result that the position estimation error can be decreased by a reduced number of observations. In other words, the observation can be controlled in such a manner that the amount of error included in the 3D information necessary for the construction of an environmental model will be decreased.

The modeling apparatus according to the fourth invention comprises a 3D information input means for generating 3D attribute information using an observation device such as a TV camera or an ultrasound or other visual sensor, an environmental model processing means for managing the 3D information input from the 3D information input means and preparing an environmental model description, a picture composing means for constructing an artificial picture of the environment based on the environmental model description stored in the environmental model processing means, an analyzing means for validating the environmental model description by comparing the artificial picture composed by the picture composing means with the corresponding factual picture, and an observation control means for controlling the 3D information input means, said observation control means being adapted to control the rotary motion of said observation device in such a manner that the 3D information relevant to the outline of the observation object space may be input on mere change of the direction of view from a given point and while computing the position and direction of the observation device using the 3D information on the outline of the object space, controlling the rotary motion of the observation device so that the 3D information on the internal portion of the object space may be input.

In this modeling apparatus, the observation control means controls the observation device so that the outline of an interior environment (e.g. a set of ceiling, floor and wall planes) can be scanned only by changing the direction of view at a fixed point (this observation is hereinafter called outline observation). After the outline information has thus been input, the observation device is controlled so that the internal region of the interior environment will be scanned by changing the observation position and direction (this observation is hereinafter called internal observation).

With this apparatus, the outline information is first input accurately by controlling the observation device at one point of view and, while the self-position is verified using this information, the internal region is scanned. Therefore, an environmental model can be input with high accuracy. Moreover, since the outline observation provides a definition of the expanse of the subject space, the truth or false of measured values in internal observation can be grossly evaluated.

The modeling device according to the fifth invention comprises a model memory means for storing a model describing the position of an object in a three-dimensional space in terms of small unit planes constituting the surface of the object, a predicted picture composing means for stochastically generating a picture of the object as mapped from a predetermined point of view according to the model stored in the model memory means, a picture memory means for storing a factual picture of the object as taken from said predetermined point of view, a picture composing means for comparing the predicted picture generated by the predicted picture composing means with the factual picture stored in the picture memory means, a difference region finding means for finding a difference region between the predicted picture and factual picture according to the result of comparison by the picture comparing means, and a model revising means for modifying the corresponding small-plane region of the model within the model memory means according to the difference region found by the difference region finding means.

In this arrangement, a predicted picture is generated according to the stored model, this picture is compared with the picture actually taken to detect differences, and these differences are corrected. Therefore, a model describing the position and shape of an object within a space can be automatically corrected as if it were actualized data without enlisting the help of a human being.

In the above comparison of pictures, the region of the predicted picture which corresponds to the small plane of the model is compared with the picture actually taken. Moreover, in this comparison, the normal direction of the small plane is determined and small planes are selected such that the angle between the normal direction and the direction of view is not greater than the value determined by the user. Furthermore, the domain including the region corresponding to this small plane in the constructed picture is compared with the picture taken. And using a plurality of pictures, the model is modified.

DETAILED DESCRIPTION OF THE PREFERRED EMBODIMENTS

First Embodiment

The modeling apparatus according to the first embodiment of the first invention is now described in detail with reference to FIGS. 1 through 12.

The term "3D information" as used in this specification means "geometric information" comprising distance and shape data and "surface attribute information" comprising color, pattern, reflectance and other data.

Figure 1:
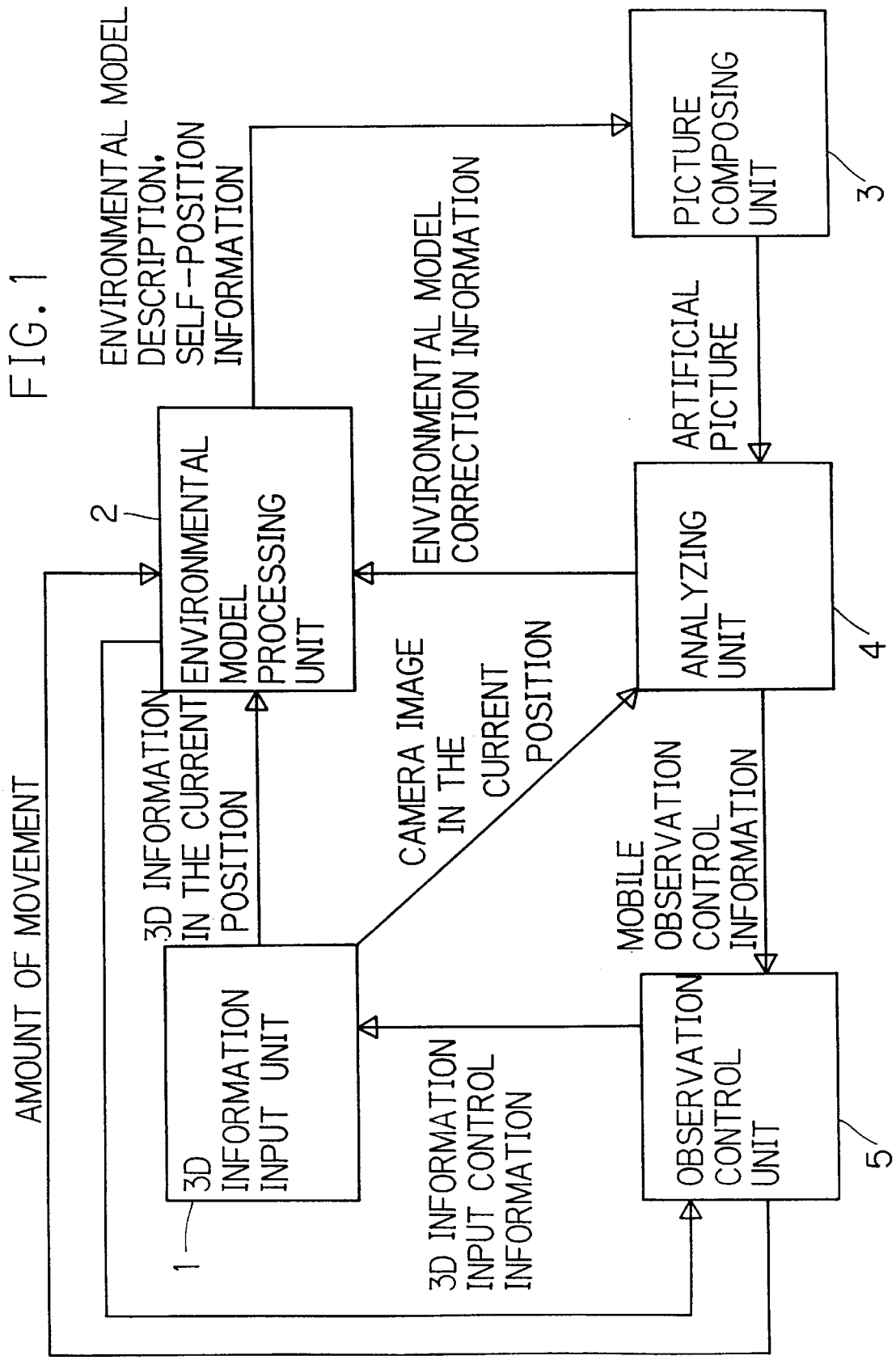
FIG. 1 is a block diagram of the modeling apparatus according to a first embodiment of the first invention.
Figure 2:
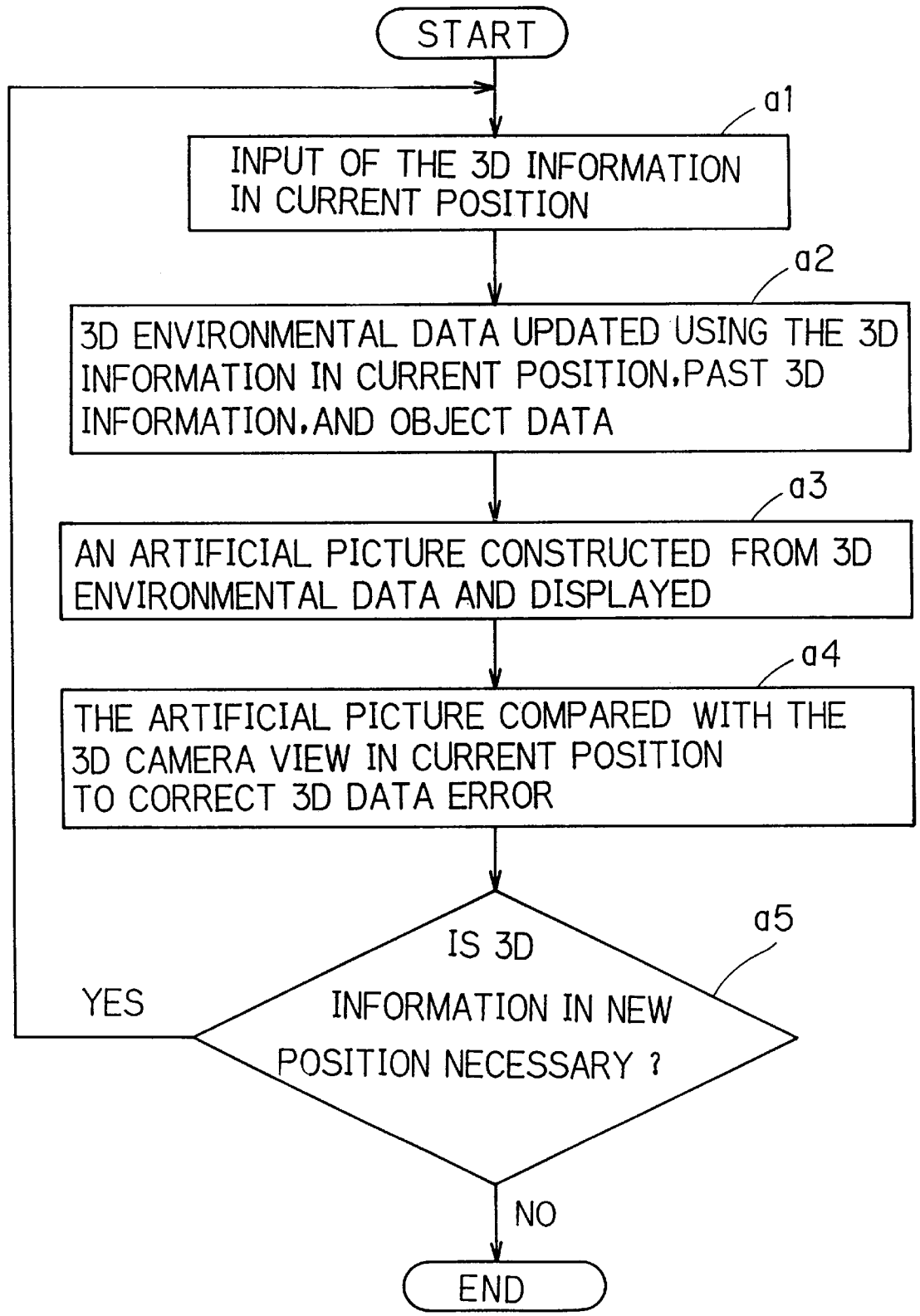
FIG. 2 is a flow diagram of the modeling apparatus according to the first embodiment of the first invention.

FIG. 1 is a block diagram of the modeling apparatus and FIG. 2 is a flow diagram of the apparatus.

This modeling apparatus comprises a 3D information input unit 1, an environmental model processing unit 2, a picture composing unit 3, an analyzing unit 4 and an observation control unit 5.

The 3D information input unit 1 is equipped with a means for obtaining geometric information, such as stereo-view TV cameras, sonars or other visual sensors, and a means for inputting data on surface attributes, such as a TV camera, in a plurality of kinds according to the attributes of the object existing in an environment. This unit takes in the 3D information in the current position and feeds it to the environmental model processing unit 2 (Step a1).

The environmental model processing unit 2 prepares an environmental model description using the input information relevant to the current position and the 3D environmental data and intra-environmental object data accumulated in the past (Step a2).

The picture composing unit 3 transforms the environmental model description into a picture utilizing the technique on computer graphics to construct an artificial picture and displays the picture (Step a3).

The analyzing unit 4 compares this artificial picture with the camera picture obtained by the 3D information input unit 1 in the current position to detect a description error due to the omission or error of geometric information input and corrects the environmental model description stored in the environmental model processing unit 2 (Step a4). In addition, the analyzing unit 4 detects the region for which model data have not been obtained by said comparison processing, transmits a new observation command through the observation control unit 5 to the 3D information input unit 1 and controls a mobile observation (Step a5). The structural components of this invention are now described in detail.

3D attribute information input unit

Figure 3:
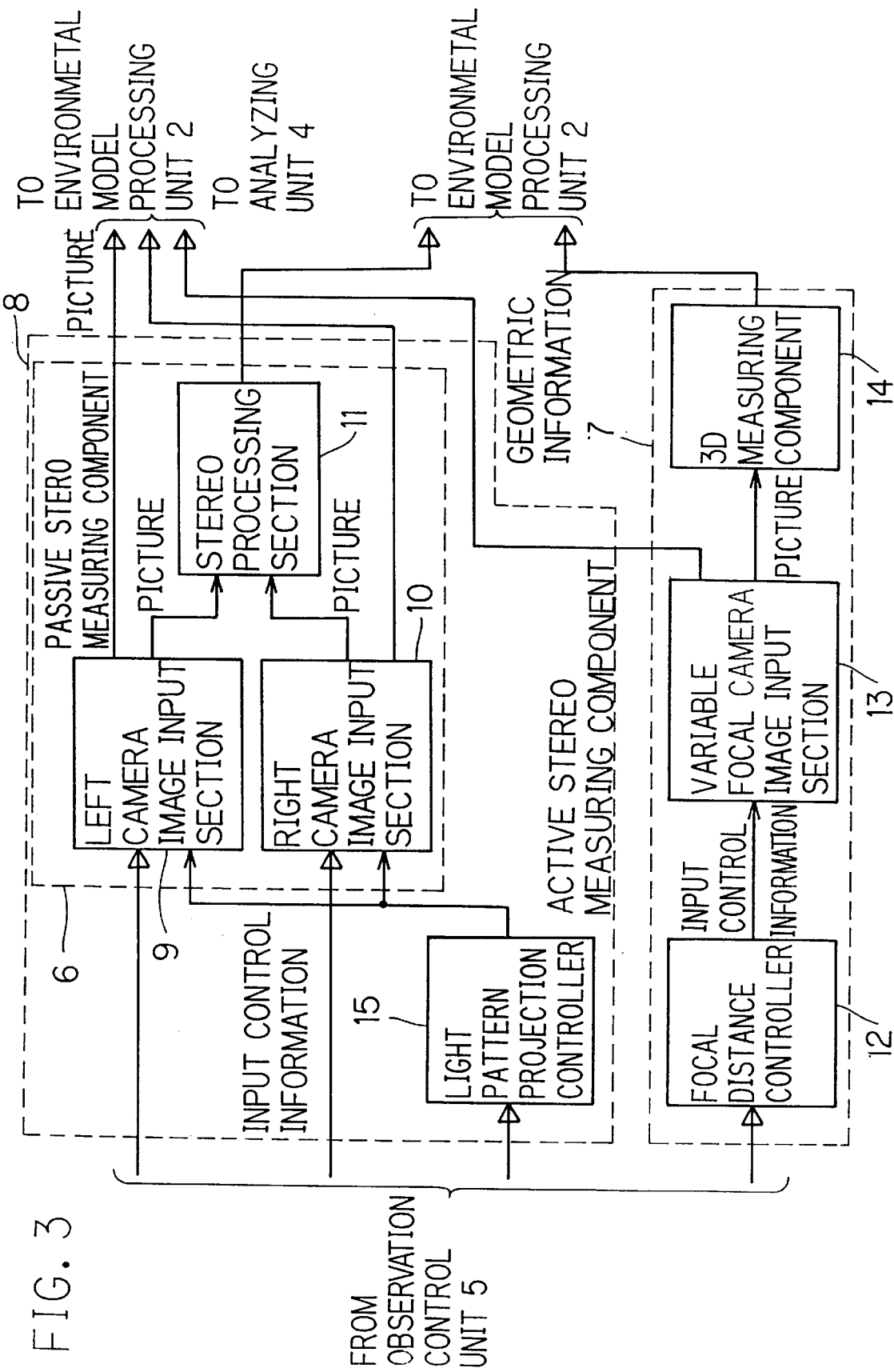
FIG. 3 is a block diagram of a 3D information input unit used in the first embodiment of the first invention.

FIG. 3 is an exemplary architecture of said 3D information input unit 1. In order to ensure an adequate input of information covering geometry, shape and surface attributes according to various objects in an environment, this embodiment comprises 3 different input means, namely a passive stereo measuring component 6 having two cameras, a 3D measuring component 7 which derives 3D information by analysis of a picture series obtained by varying the focal distance of one camera, and an active stereo measuring component 8 utilizing light pattern projection.

The passive stereo measuring component 6 is used for the input of a region amenable to 3D measurement by stereo processing because of its simple contour as it is the case with a post or a door. The 3D measuring component 7 is used for the input of a region hardly amenable to 3D measurement by stereo processing, such as the top of a desk where an office machine and documents are located or a bookcase carrying a number of books on its shelves. The active stereo measuring component 8 is used for the input of a region to which neither said stereo processing nor 3D measurement by variable focal video image processing is applicable, such as a white wall having no contour or surface pattern.

In the passive stereo measuring component 6, the stereo image in the current position is input with a left camera image input section 9 and a right camera image input section 10. Timing and other control of this input is carried out by the analyzing unit 4 and observation control unit 5. The input stereo picture is subjected to feature extraction, matching and geometric information extraction in a stereo processing section 11 and the result is transferred to the environmental model processing unit 2.

In the 3D measuring component 7 which performs variable-focus picture processing, the focal distance of the lens mounted on a camera is varied by a focal distance controller 12 and the camera image is input into a variable focal camera image input section 13. Timing and other control of this input is performed by the observation control unit 5. The input picture series consisting of a plurality of pictures taken by varying the focal distance is fed to a 3D measuring component 14 where it is subjected to high pass filtering, maximum filter output region detection, and geometric information extraction by the application of fundamental optico-geometric expressions and the result is transmitted to the environmental model processing unit 2.

In the active stereo measuring component 8, which deals with regions having no contour feature or surface pattern, such as a white wall, a known light pattern is projected from a light pattern projection controller 15 on the object surface and the irradiated part is measured by said passive stereo measuring component 6 for extraction of geometric information. In this arrangement, for simplification of the structural elements, the active stereo measuring unit 8 is designed to include the passive stereo measuring component 6 completely.

In parallel with the above geometric information extraction procedure, the picture input by components 6, 7 and 8 is fed to the environmental model processing unit 2 for analysis of surface attributes. As described hereinafter, the pictures are also transferred to the analyzing unit 4 for validation of the environmental model. In FIG. 3, the input picture signal lines to the left camera image input 9, right camera image input 10 and variable focal camera image input 13 are not shown.

Environmental model processing unit

Figure 4:
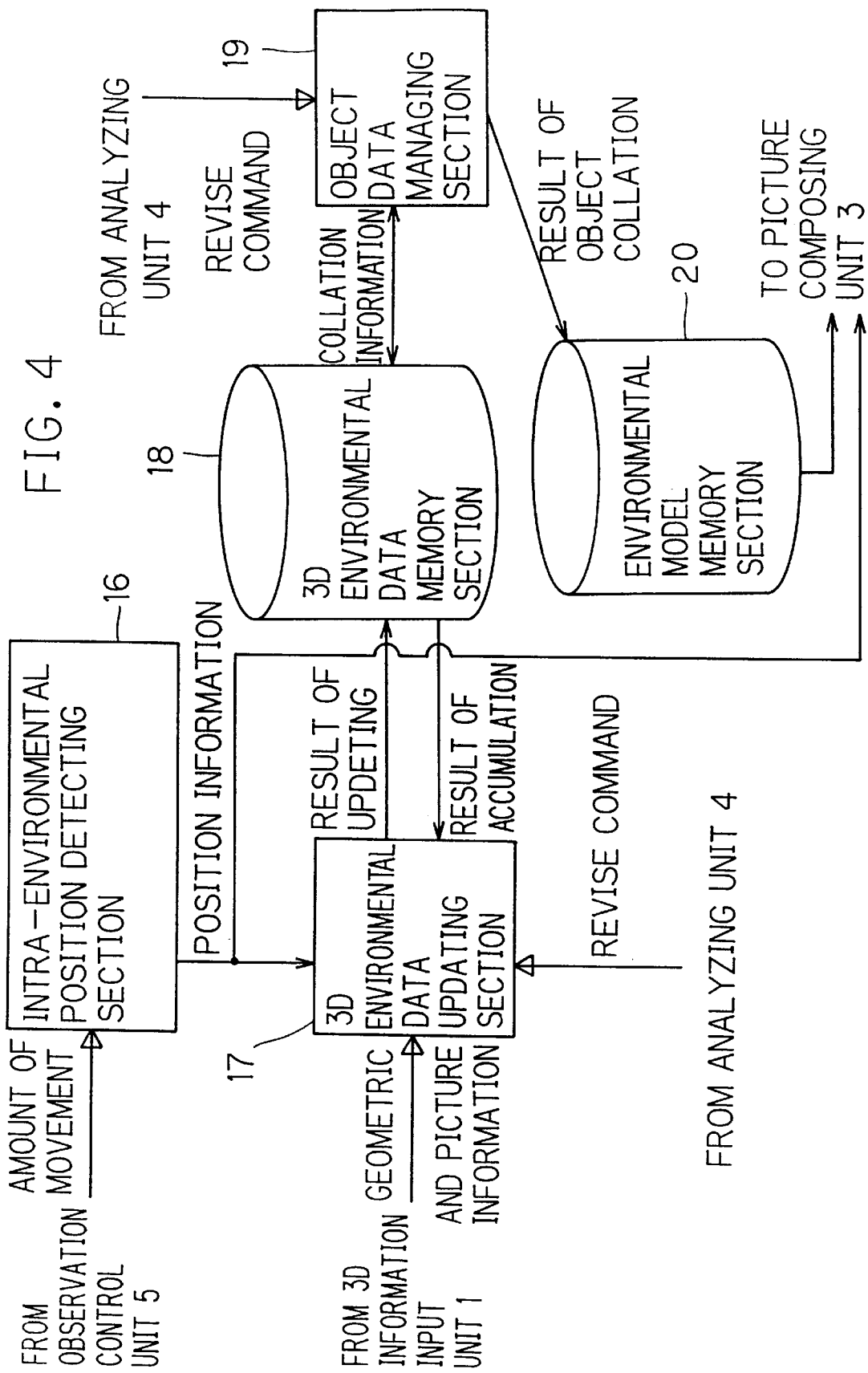
FIG. 4 is a block diagram of an environmental model processing unit of the first embodiment of the first invention.

FIG. 4 is an exemplary architecture of the environmental model processing unit 2.

This environmental model processing unit 2 comprises an intra-environmental position detecting section 16, a 3D environmental data updating section 17, a 3D environmental data memory section 18, an object data managing section 19, and an environmental model memory section 20.

The amount of movement of the modeling apparatus itself is transmitted from said observation control unit 5 to the intra-environmental position detecting section 16. The intra-environmental position detecting section 16 computes the position of the modeling apparatus in a coordinate system fixed to the environment (world coordinate system) using the amount of movement and the immediately preceding position information and transmits the result to the 3D environmental data updating section 17. The geometric and picture information obtained by said 3D information input unit 1 is also transmitted to the 3D environmental data updating section 17. The geometric information is the data described in the camera coordinate system in the current position and expressed in the form of (Xi, Yi, Zi), where each parameter is a distance datum and i is a subscript indicating the observation position.

Figure 5:
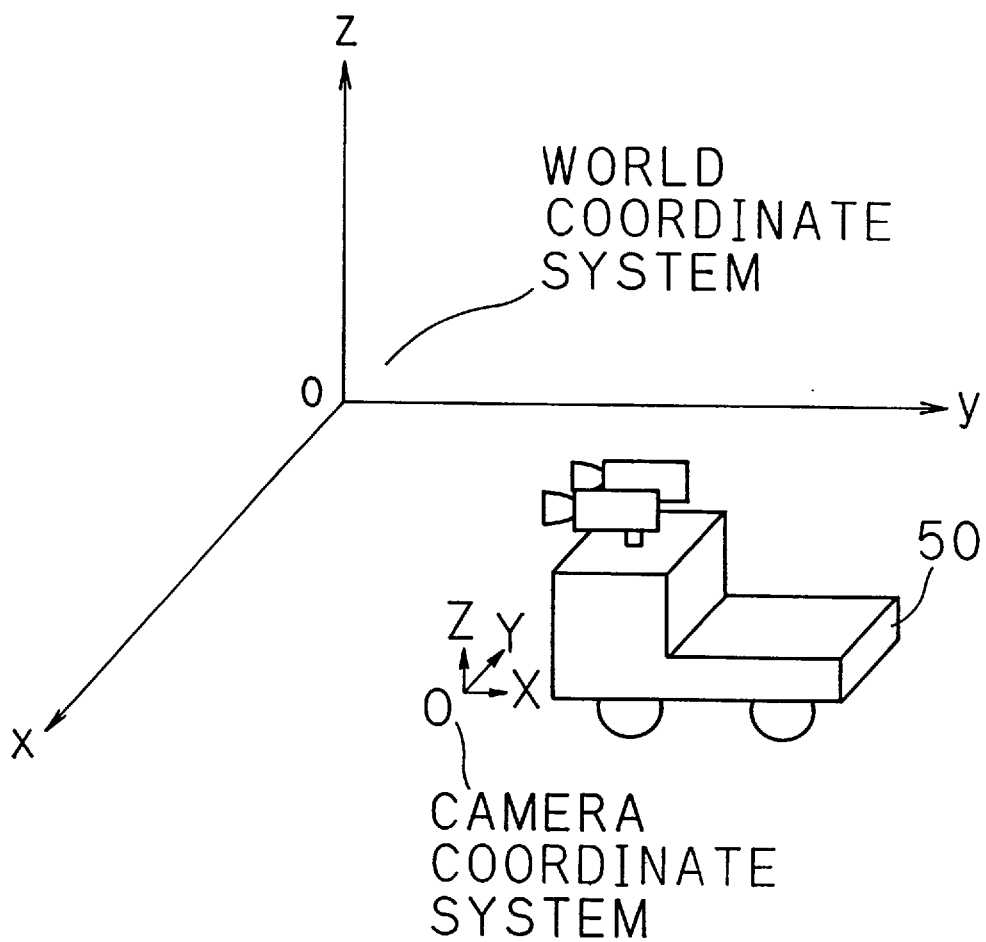
FIG. 5 is a schematic diagram showing the relationship between a world coordinate system and a camera coordinate system.

Using the current position information supplied from the intra-environmental position detecting section 16, the 3D environmental data updating section 17 transforms these data into data in the world coordinate system fixed to the environment and performs an updating integration with the 3D environmental data generated in the past and stored in the 3D environmental data memory section 18. FIG. 5 is a schematic diagram showing the relationship between the world coordinate system and the camera coordinate system. The world coordinate system means a predetermined set of reference coordinate values for an object space. The camera coordinate system is a coordinate system based on the current position of a mobile unit 50 (a robot corresponding to the 3D information input unit 1 in FIG. 1). In other words, the 3D information input from the mobile unit 50 are data in the camera coordinate system, while the environmental model is stored as data in the world coordinate system.

Figure 6:
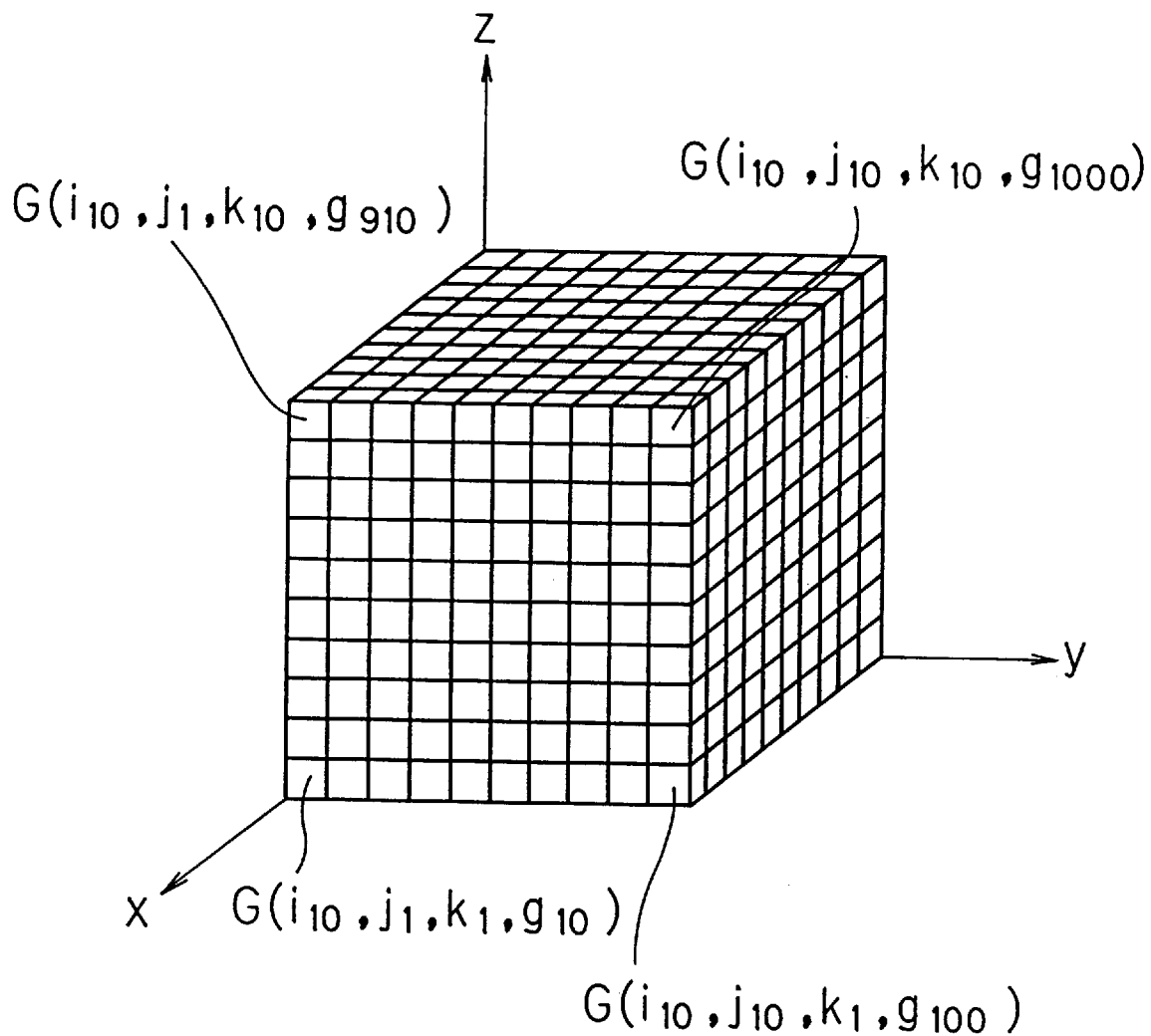
FIG. 6 is a diagrammatic representation of the tesselation of a space into occupancy grids.

For the expression of 3D environmental data, the entire environment is tessellated into a 3D grid beforehand and the occupancy probability 0 is assigned to the respective cells of the grid. The 3D grid is expressed in the form of G (i, j, k, g), where i, j and k represent the 3D positions of the cell and g stands for occupancy probability. FIG. 6 is a diagram showing a space tessellated into such cells. Here, 10 cells are assigned to each of the x-axis, y-axis and z-axis, so that the space is divided into a total of 1000 cells. Therefore, each of the dimensional positions i, j and k assume 10 values and g occurs for 1000 cells.

The cells receiving geometric information from the 3D information input unit 1 are updated in the probability of being regions occupied by an intra-environmental object and, in addition, the picture corresponding to this region is recorded as information covering the surface attributes of the object. This operation is sequentially performed. If geometric information is newly obtained by any cell for which data has remained to be obtained, the grid is regarded as occupied by an intra-environmental object and given the minimum probability. If any grid cell labeled as occupied as the result of supply of geometric information is further supplied with geometric information, it is considered highly probable that this cell was occupied by the object, so that a higher probability of occupancy is given to the cell. On the other hand, if geometric and surface information beyond the labeled cell from the current position is directly obtained, the probability of this cell being occupied by the object is considered rather low so that its occupancy probability is decreased.

Of the 3D environmental information thus obtained, the region G obtained by extraction of the cells with high occupancy probabilities (i, j, k, g>TH) is the sphere occupied by the intra-environmental object. Here, TH represents the threshold value of occupancy probability which is experimentally set beforehand. The 3D environmental data stored in this 3D environmental data memory 18 is a mere description at the level of the occupancy or non-occupancy of a spatial region and, as such, is still inadequate for use as a model for 3D CAD or computer graphics. The object data managing section 19 collates the data on this region G (i, j, k, g>TH) against the stored data on the object in the environment and prepares an environmental model description on each object for storage in the environmental model memory 20.

Figure 7:
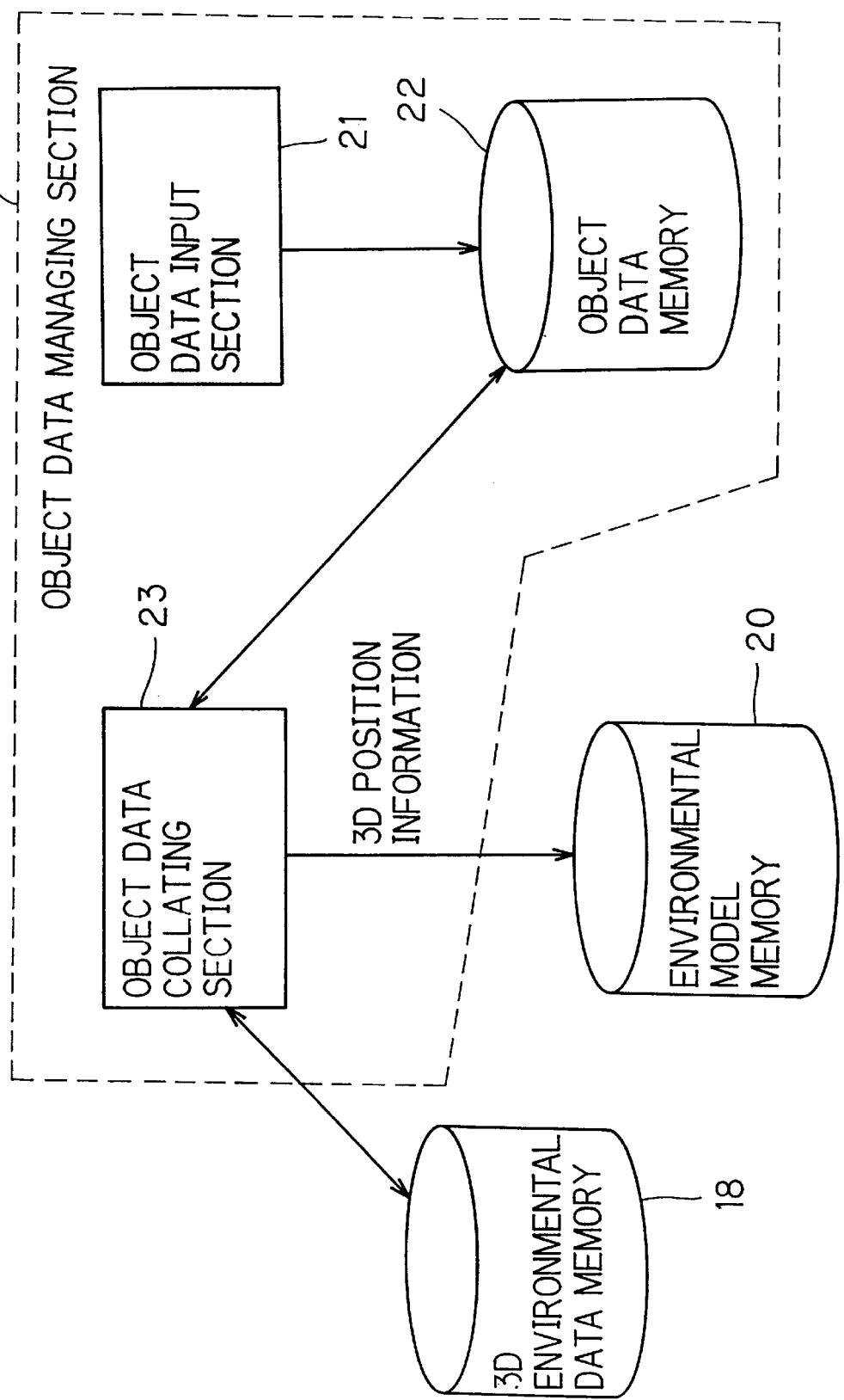
FIG. 7 is a block diagram of the object data managing unit.

FIG. 7 shows a detailed architecture of this object data managing section 19.

The shape, surface pattern and other attribute data on an object, such as a desk or a chair, in the environment are input by the object data input section 21 beforehand and stored in the object data memory 22.

By way of illustration, the attribute data on a desk are described in the form of OBJECT (DESK (type), Shape (x, y, z), Surface (x, y, z)), where (type) means a type of desk, Shape (x, y, z) stands for a 3D function representing its surface configuration, and Surface (x, y, z) stands for a 3D function representing the chromaticity of the surface.

The object data collating section 23 sequentially performs collating of the above data against the data stored in said 3D environmental data memory 18 and extracts the intra-environmental 3D position information (position of barycenter, angle of rotation), as an object description, for storage in said environmental model memory 20. Thus, as mentioned above, when the grid cells with occupancy probabilities higher than the threshold are extracted, a grid region (a cluster of cells) corresponding to the object is obtained as a spatial entity.

With respect to this grid region, the 3D function representing its surface configuration is first determined from the 3D position within the space. Since the picture information corresponding to this grid region has been obtained, the 3D function representing the surface chromaticity is also determined. Then, the 3D function relevant to the surface configuration and the 3D function of chromaticity are respectively compared with said attribute data on the object, and attribute data having the most resembling surface configuration 3D function and chromaticity 3D function are extracted.

In other words, it is highly probable that the grid region represents the object having the extracted attribute data and, therefore, these are merged to construct an environmental model of the particular object. Here, with respect to the grid region, the position of barycenter within the space and the angles of rotation about the x-, y- and z-axes of the world coordinate system are determined. By combining the determination results with the extracted attribute data, an environmental model of the object is generated. Moreover, as to the grid region not matching to the attribute data of the object and is situated on the outer periphery of the space, its attributes are recorded assuming that it is a wall region and as to the region situated within the space, attributes are recorded assuming that it is an unknown object. The part of the space where no grid region exists is an object-free region (a mere air space).

As the result of the above processing, data of the following form are stored in the environmental model memory 20.

OBJECT (type, Shape (x, y, z), Surface (x, y, z), Center (X, Y, Z), Attitude ($\alpha$, $\beta$, $\gamma$)) Here, OBJECT stands for attributes of an object, Center (x, y, z) stands for the 3D position of barycenter of the object in the environment as found by collation, and Attitude ($\alpha$, $\beta$, $\gamma$) stands for the angles of rotation along the x, y and z-axes of the object.

Figure 8:
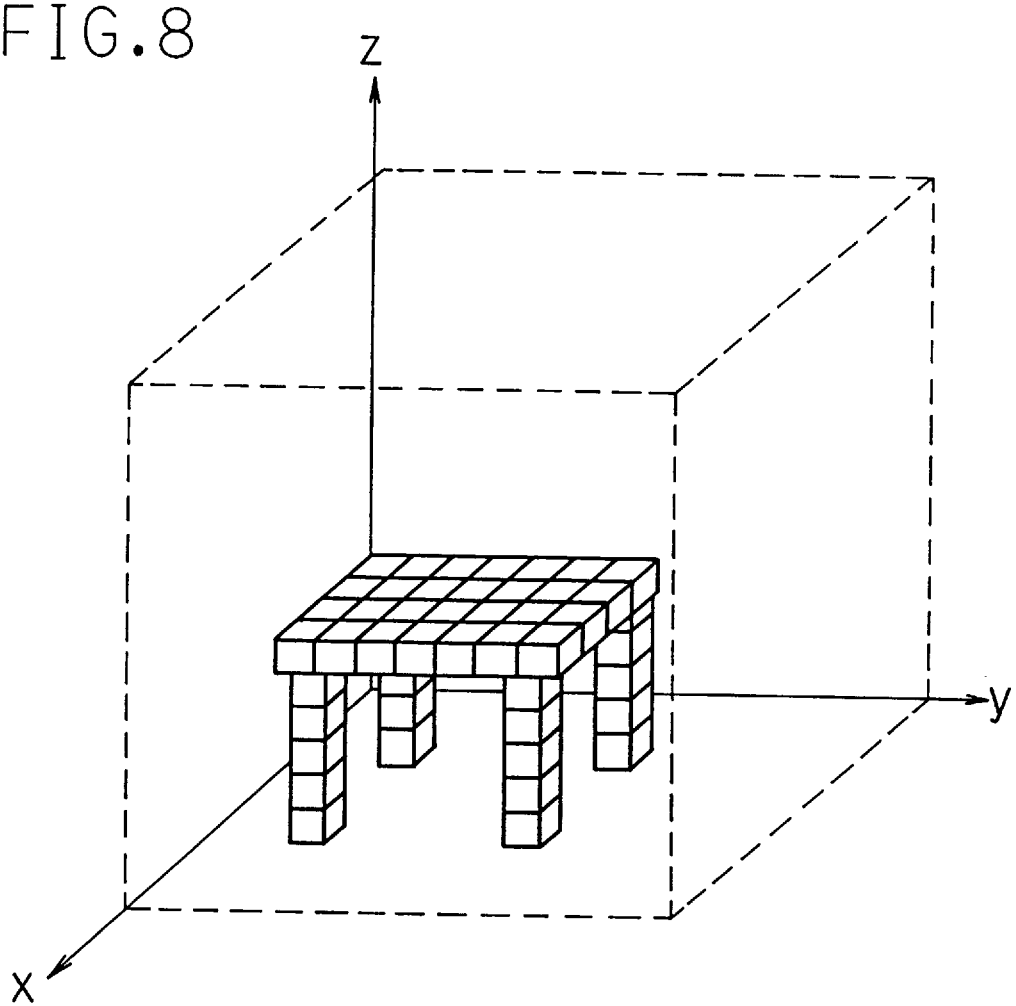
FIG. 8 is a diagrammatic view showing an example of agreement between the grid region and object data for a desk.

FIG. 8 shows an example of agreement between a grid region within the space and the attribute data for a desk. Here, the desk is expressed as a cluster of grid cells and the 3D position and picture information on the respective cells are expressed in the world coordinate system. Therefore, by using them, the surface configuration 3D function and chromaticity 3D function of the desk can be calculated.

Picture composing unit

Figure 9:
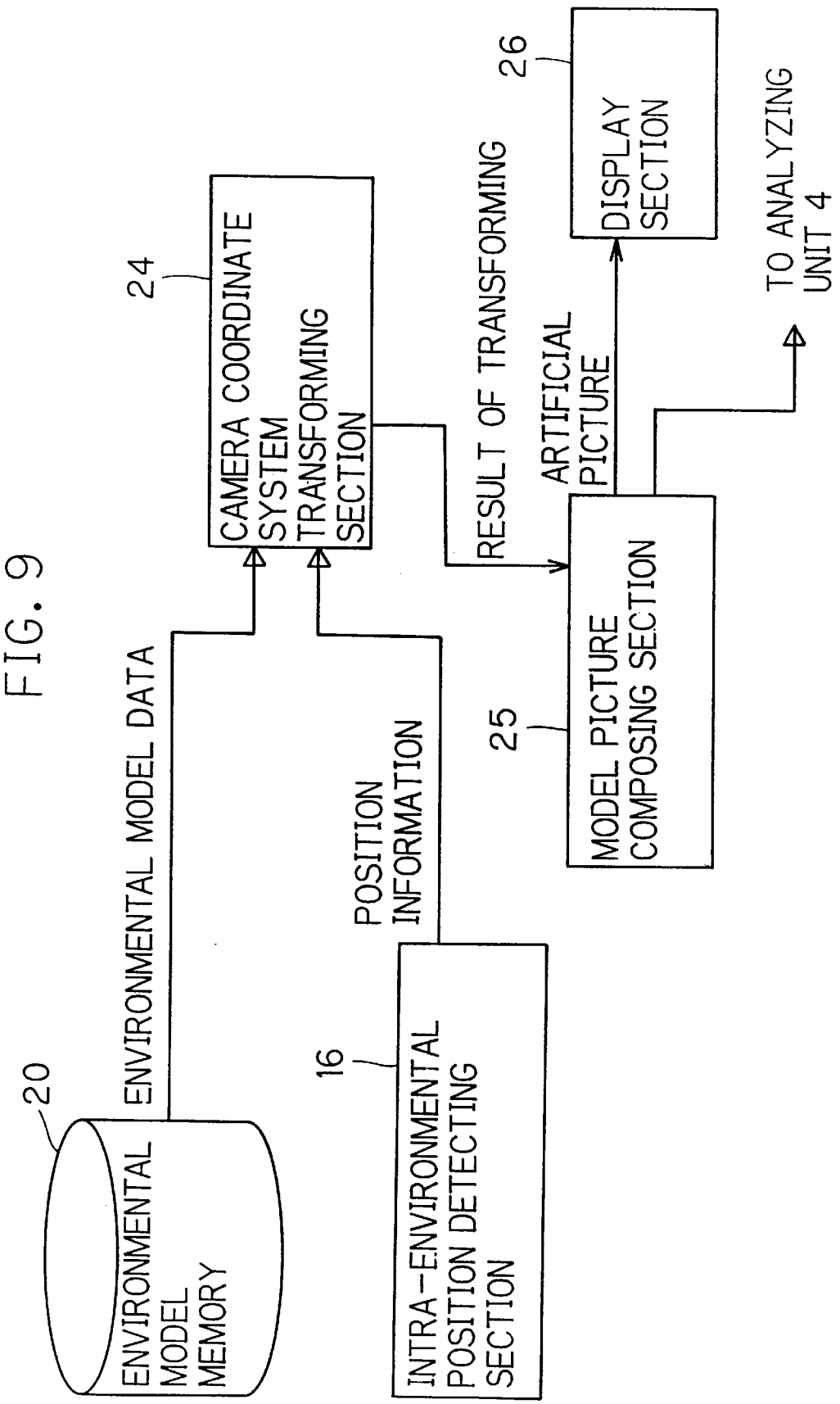
FIG. 9 is a block diagram of the picture composing unit of the first embodiment of the first invention.

FIG. 9 is an exemplary architecture of said picture composing unit 3.

This picture composing unit 3 comprises a camera coordinate system transforming section 24, a model picture composing section 25 and a display section 26.

The environmental model description stored in said environmental model memory section 20 are transmitted to the camera coordinate system transforming section 24. This camera coordinate system transforming section 24 transforms the object data, which have been transformed to world coordinate values by said 3D environmental data updating section 17, into a camera coordinate system description and feeds it to the model picture composing section 25. In the model picture composing section 25, this data is subjected to clipping for selecting only the object lying closest to the modeling apparatus and further to perspective transformation into the view of a camera, i.e the image that would be seen by a camera provided that the environmental model description be correct (this picture is called an artificial picture). The object-free region which cannot be matched against the object data is dealt with as a void in the composition of a picture. This artificial picture is displayed on the monitor screen of the display section 26 and, at the same time, sent to said analyzing unit 4. As to said clipping, the necessary selection can be made by comparing the distances of objects from the camera eye of this modeling apparatus.

Figure 10:
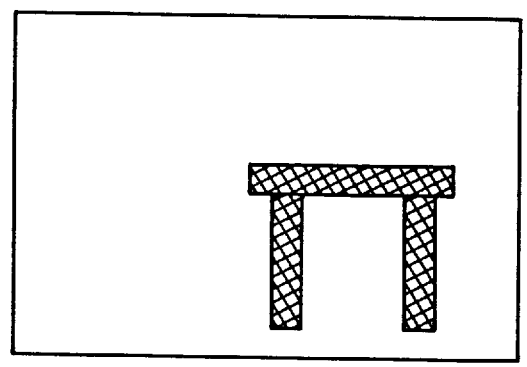
FIG. 10 is a diagrammatic view showing the monitor display of an artificial picture.

FIG. 10 is a diagrammatic view showing the monitor display of an exemplary artificial picture.

Displayed is an artificial image which should have been seen by the camera from the y-direction shown in FIG. 8. Based on said environmental model description of the desk, the shape, color and position as viewed from the y-direction are determined and an artificial picture according to the results is displayed. Thus, the shape is determined from Shape (x, y, z), the color from Surface (x, y, z), and the position from Center (x, y, z) and Attitude (x, y, z).

Analyzing unit

Figure 11:
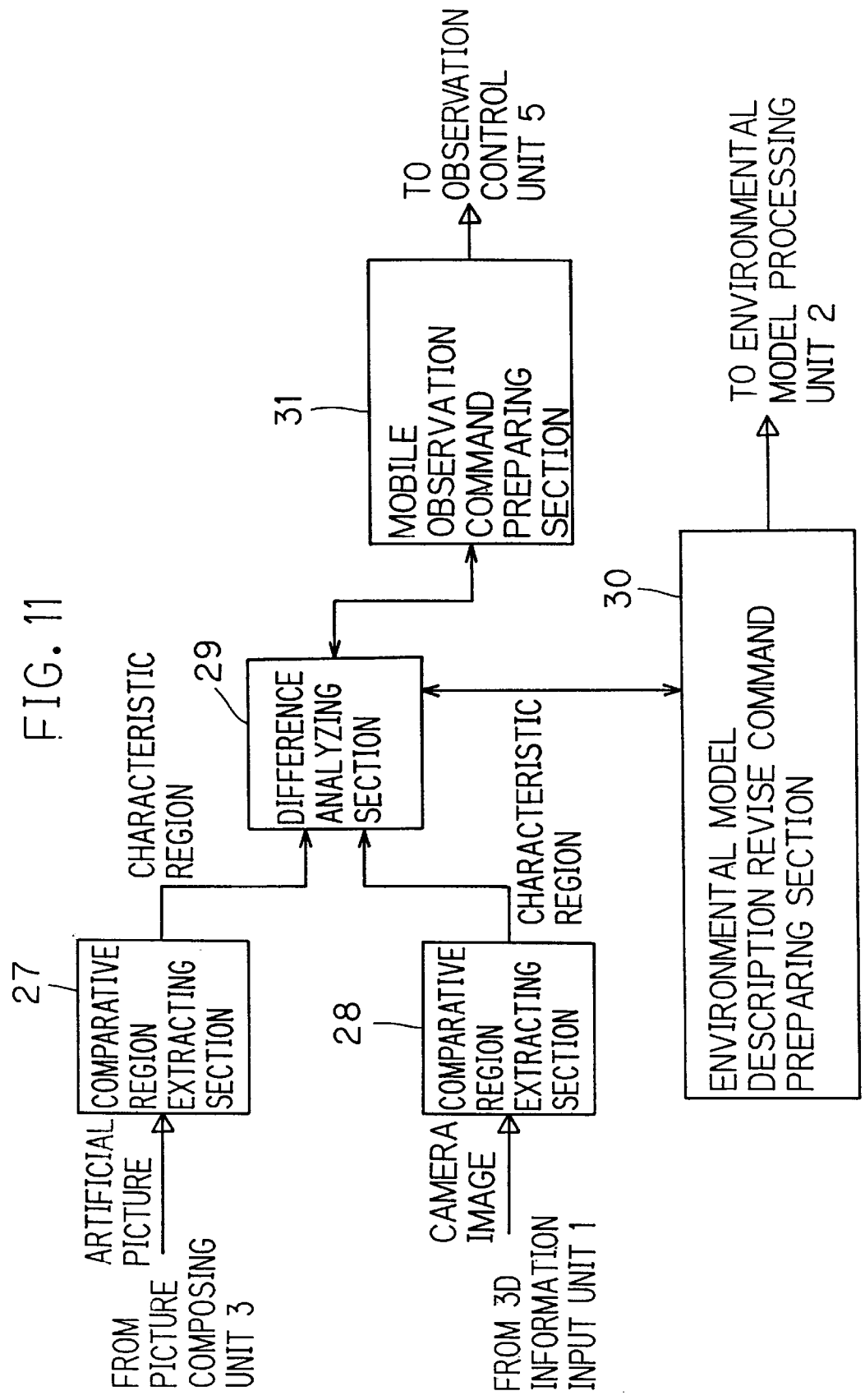
FIG. 11 is a block diagram of the analyzing unit of the first embodiment of the first invention.

FIG. 11 shows an exemplary architecture of the analyzing unit 4.

This analyzing unit 4 comprises a couple of comparative region extracting sections 27, 28, a difference analyzing section 29, an environmental model description revise command preparing section 30 and a mobile observation command preparing section 31.

From the artificial picture composed by said picture composing unit 3 and the picture photographed by said 3D information input unit 1, a characteristic region for data validation is extracted by each of the comparative region extracting sections 27 and 28. As such a characteristic region, a planar region with high visibility, for instance, is selected. Since the position of lighting within the environment cannot be directly obtained from the 3D information input unit 1 for artificial picture composition in said picture composing unit 3, the artificial picture is constructed assuming that the light source is located in a predetermined position. Moreover, because delicate influences on the environment, e.g. by the shadow of the observation device, are not taken into account, either, the difference analyzing section 29 makes a comparison using statistics such as average concentration and chromaticity to detect differences between the two pictures and performs an analysis based on result of the detection.

For example, when a region for which a surface is detected in camera view is a void in the artificial picture, it is judged that there was an error in the 3D information input. This kind of error occurs partly because a matching error tends to occur in a planar region other than the outline region in the case of stereo measurement and partly because when the target of light pattern projection is far enough, the pattern image does not reach the target, thus failing to detect a planar region.

Thus, when a difference occurs between a photographed picture and an artificial picture, the camera view is given preference and a revise command to correct the model description is transmitted to said environmental model processing unit 2, while a mobile observation command to close up and perform a reobservation is simultaneously transmitted to said observation control unit 5.

For the region where an occupancy of space occurred in both the camera view and the artificial picture, suggesting the existence of an object, no change of description is made and it is judged that the reliability of the model description is high.

On the other hand, for the following region, no change of description is performed, either, but in view of the insufficient reliability of the model description, a mobile observation command for close-up observation is transmitted to said observation control unit 5. The region mentioned just above includes the region where neither the camera view nor the artificial picture shows an occupancy of space and which is expressed as a void in the artificial picture, the region which was expressed as an unknown object in the artificial picture because of a failure of matching despite occupancy, and the region where the updating of 3D environmental data has not been done a sufficient number of times and which is expressed as a void in the artificial picture.

These environmental model description revise command and mobile observation command are generated in the environmental model description revise command preparing section 30 and mobile observation command preparing section 31, respectively, and transmitted to the 3D environmental data updating section 17 and object data managing section 19 of the environmental model processing unit 2 and to the observation control unit 5.

Observation control unit

Figure 12:
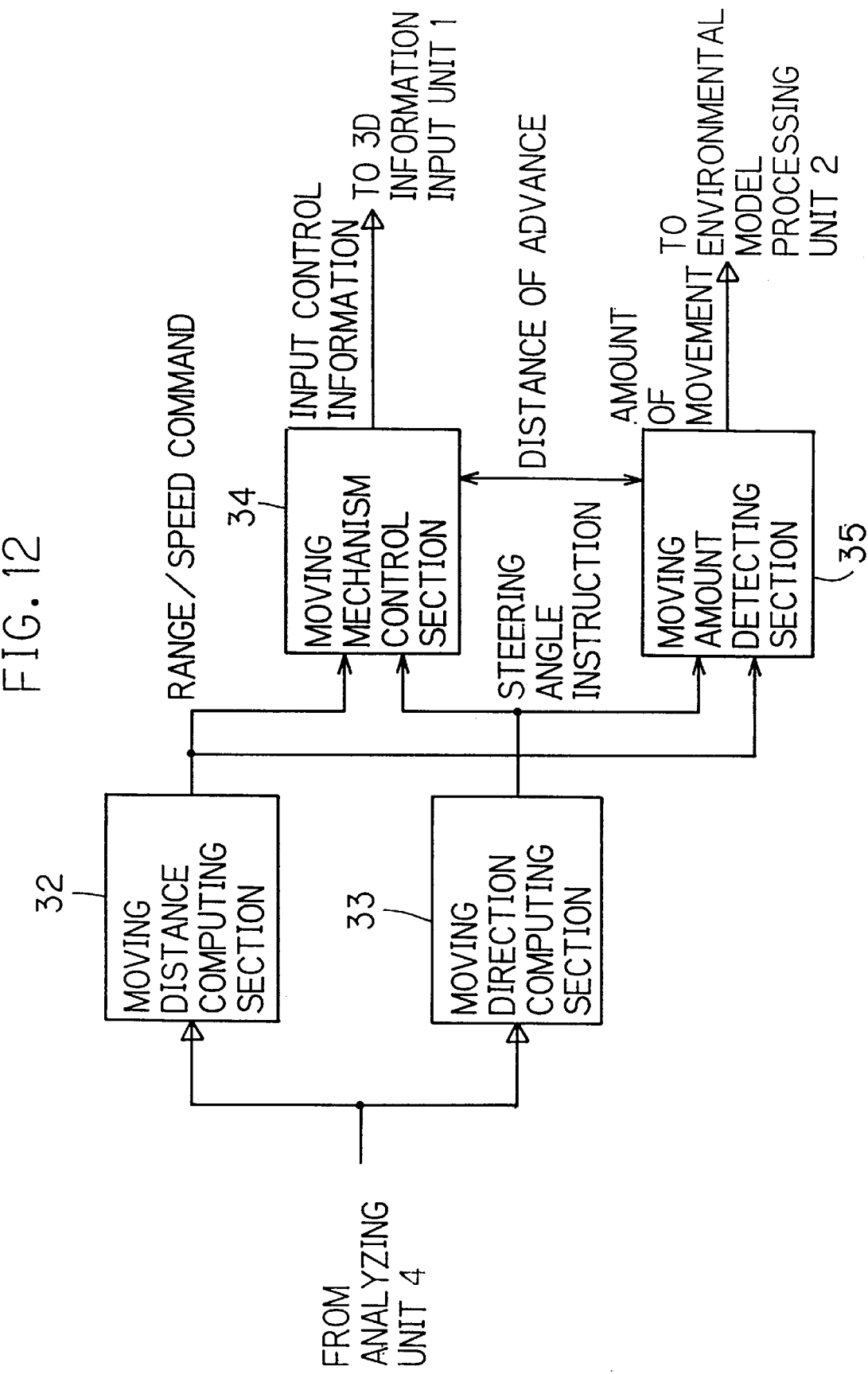
FIG. 12 is a block diagram of the observation control unit of the first embodiment of the first invention.

FIG. 12 shows an exemplary architecture of the observation control unit 5.

This observation control unit 5 comprises a moving distance computing section 32, a moving direction computing section 33, a moving mechanism control section 34 and a moving amount detecting section 35.

The mobile observation command prepared in the analyzing unit 4 is transformed into moving distance, speed and steering angle information in the moving distance computing section 32 and moving direction computing section 33 and transferred to the moving mechanism control section 34. Based on the above information, the moving mechanism control section 34 controls the steering wheel, accelerator, brake and other mechanisms not shown. When the robot has reached the destination on completion of navigation, control information for the input of 3D information is transmitted to said 3D information input unit 1. In addition, using information such as the information on the distance and direction of movement as calculated from the number of revolutions of the wheels, the amount of movement for detecting the current position is computed in the moving amount detecting section 35 and the result is transmitted to the intra-environmental position detecting section 16 of the environmental model processing unit 2.

By using the foregoing architectural examples of respective components, a typical modeling apparatus can be constructed.

It should be understood that this invention is not limited to the embodiment described hereinbefore. By way of example, whereas this embodiment comprises a triad of input means, namely a passive stereo measuring unit using two cameras, a 3D measuring unit which obtains 3D information by analyzing a series of pictures obtained by varying the focal distance of a single camera, and an active stereo measuring unit involving light pattern projection, it is possible to reduce the cost of manufacture by employing an input means comprising only the passive stereo measuring unit equipped with a couple of cameras.

Furthermore, it is possible to facilitate and increase the speed of matching by adopting an architecture using an increased number, e.g. 3 or more, of stereo cameras. Moreover, it is also possible to omit, or assist in, active stereo measurement by providing a geometric information extracting means involving the use of an ultrasound sensor additionally. Furthermore, whereas this embodiment uses a construction such that the passive stereo measuring unit and active stereo measuring unit play the roles of right and left camera view input means and stereo processing means, it is possible to increase the processing speed by providing such means independently. Moreover, the navigation control load can be reduced by providing for a variable position control of the stereo cameras or of the camera for variable focal picture processing.

In the described environmental model constructing unit 3, in view of the fact that information on the position of the light source used for the composition of an artificial picture cannot be directly obtained from the 3D information input unit 1, the picture composition is performed assuming that the light source is located in a predetermined position. However, the accuracy of the artificial picture can be improved by measuring the position and type of a light source in the environment ergonomically beforehand, selecting the lighting which exerts a known influence on the current position and composing the picture. Furthermore, the accuracy of an artificial picture can also be improved by providing the 3D information input unit 1 with a means for direct measurement of the lighting position such as a TV camera pointing upwards.

Furthermore, in said analyzing unit 4, the mobile observation command is prepared from the result of analysis by the difference analyzing section 29. However, it is possible to prepare a 3D information reinput command in parallel and thereby control the 3D information input unit 1.

Second Embodiment

Now, a modeling apparatus according to the second embodiment of the first invention is described with reference to FIG. 1 and FIGS. 13 and 14.

The gross architecture of this modeling apparatus is identical to that of the first embodiment, thus including a 3D information input unit 1, an environmental model processing unit 2, a picture composing unit 3, an analyzing unit 4, and an observation control unit 5. Presented below is only a description of differences from the first embodiment.

Environmental model processing unit

Figure 13:
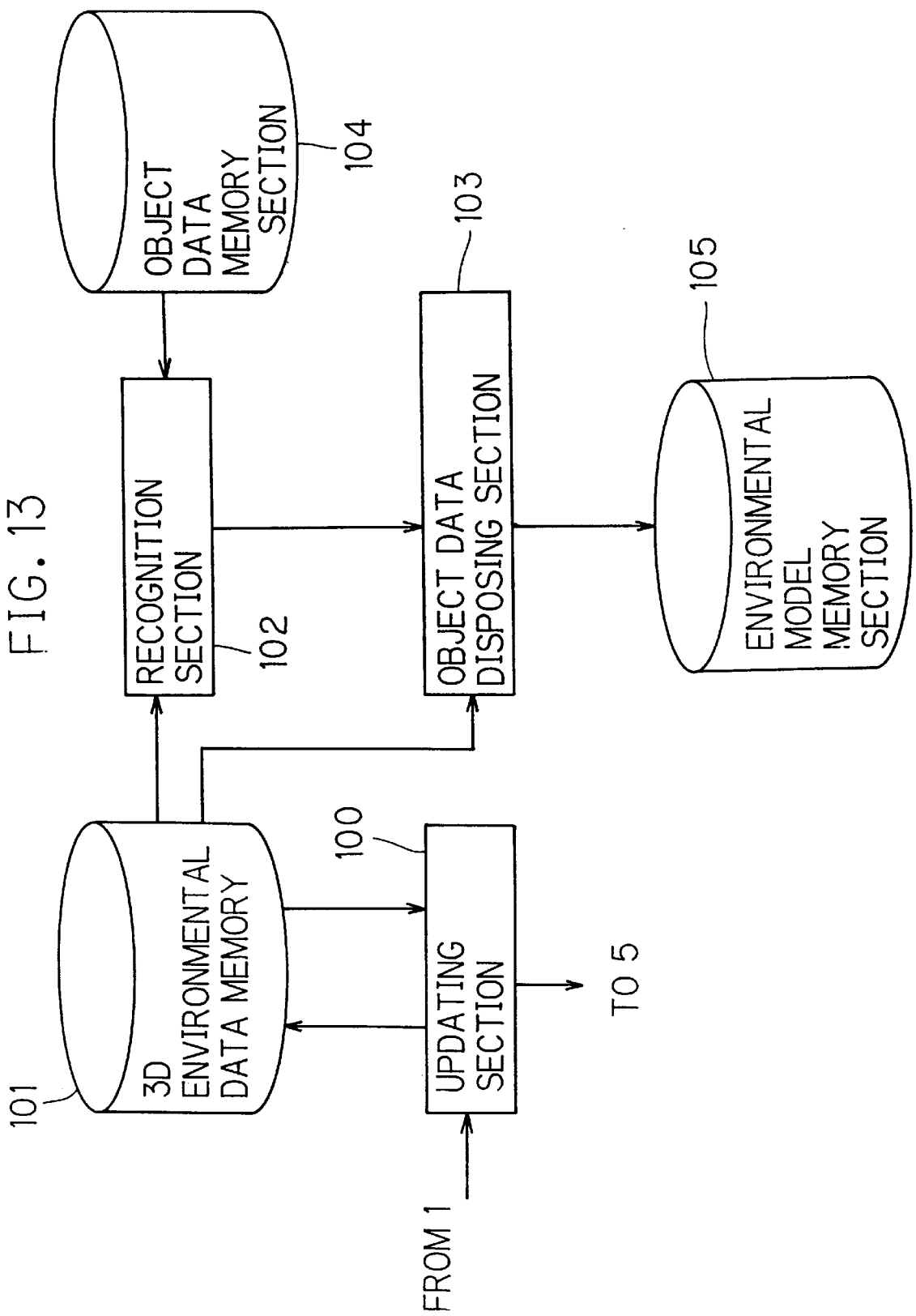
FIG. 13 is a block diagram of the environmental model processing unit of the second embodiment of the first invention.

FIG. 13 shows an exemplary architecture of the environmental model processing unit 2.

This environmental model processing unit 2 comprises an updating section 100, a 3D environmental data memory 101, a recognition section 102, an object data disposing section 103, an object data memory section 104, and an environmental model memory section 105.

Figure 14:
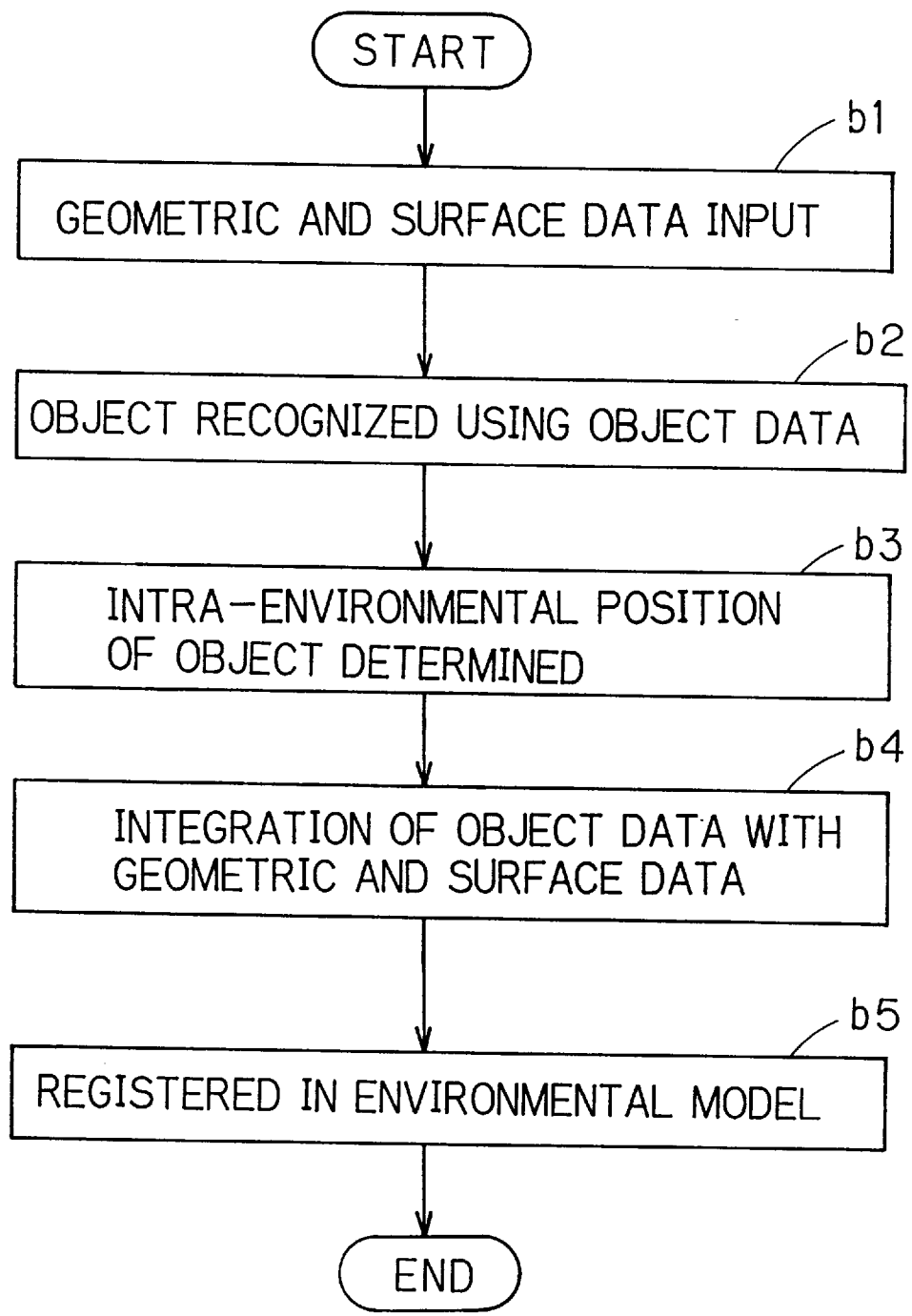
FIG. 14 is a flow diagram of the environmental model processing unit of the second embodiment of the first invention.

FIG. 14 shows the flow of processing in this environmental model processing unit 2. This flow is new described step by step in detail.

(Step b1)

(1) In the updating section 100, the 3D-coordinate environmental data in the stereo camera coordinate system as obtained by the 3D information input unit 1 is transformed into 3D-coordinate data in a world coordinate system which is fixed in the environment and these data are registered in the 3D environmental data memory section 101. The initial position of the stereo camera coordinate system in the world coordinate system at the start of observation is previously measured using a surveying instrument.

(2) The updating section 100, referring to the three-dimensional configuration of the environment as built up in the 3D environmental data memory 101, sets the next picture collecting position. As this picture collecting position, a free space position is selected from the 3D configuration of the environment as built up in the 3D environmental data memory 101. And the information on this picture collecting position in the world coordinate system is transmitted to the observation control unit 5.

(3) The observation control unit 5 controls the actuator of the modeling apparatus so that the apparatus may move to the particular position.

(4) After this movement of the modeling apparatus, a picture input signal is sent to the 3D information input unit 1.

(5) From the picture stored in the picture memory, the 3D information input unit 1 determines the 3D coordinates of the environment again from the new position.

(6) The updating section 100 transforms these coordinate values into coordinate values in the world coordinate system and integrates the surface attribute and geometric data recorded in the 3D environmental data memory 101. This integration is performed by utilizing an occupancy grid (FIG. 6) constructed by tessellating a space into cells. This method comprises discovering the cell including the position in the world coordinate system where the geometric and surface data are acquired and filling up the cells sequentially.

(7) By repeating the above movement, stereo picture input, 3D coordinate computation and integration procedures, the data accumulated in the 3D environmental data memory 101 are updated.

(Step b2)

The recognition section 102, using the object data on an intra-environmental object, e.g. a desk, a chair or a partition, as previously registered in the object data memory 104, recognizes the region relevant to the object in the geometric and surface data compilation stored in the 3D environmental data memory 101.

(1) The object data pertaining to an intra-environmental object as stored in the object data memory 104 are as follows.

1) Configuration data

The surface of the object data compilation is divided into triangular patches and the coordinates of the vertexes of each triangle and the normal vector representing the surface orientation of the plane are stored. The coordinate system can be established wherever desired near the object data.

2) Surface data

The picture of the object data surface corresponding to each triangular patch is stored as a texture map on the triangular patch.

3) Collation data

This is a data for collation which is performed in the recognition section 102. The adjacent triangular patches resembling each other in normal vector are integrated and a set of planes so determined is stored. The set of triangular patches which are not included in said set of planes is flagged to the effect that they belong to curved surfaces and is stored as such. The data includes normal vector, 3D coordinate series of polygonally approximated outline, area, and barycenter of each plane for the coordinate system of each object.

(2) The recognition section 102 subjects the occupancy grid data obtained from the 3D environmental data memory 101 to Hough transform (Matsuyama & Koshimizu: "Hough transform and pattern matching", Information Processing Vol. 30, No. 9, 1035–1046, 1990) to determine a set of planes. For the resultant set Pi of planes, the combination of planes which resemble the relevant collation data Si accumulated in the object data memory 104 is explored. In other words, for each Si, it is enquired if Pi includes a combination Qi of planes which are alike in the facial line and outline shape of the constituent individual planes Fi and in the 3D topological relationship among Fi. If the answer is affirmative, the combination is recognized as an object data.

(Step b3)

In the recognition section 102, the amount of rotational movement ($\theta x$, $\theta y$, $\theta z$) and that of parallel movement (dx, dy, dz) between a primitive coordinate system in which each Fi of Si overlaps the corresponding plane of Qi in the maximal measure and the world coordinate system are determined. The results are transmitted along with the type description of object data to the object data disposing section 103.

(Step b4)

The object data disposing section 103 replaces the 3D configuration and surface data of the recognized part with the 3D configuration and surface data accumulated in the object data memory 104.

Thus, using the amount of rotational movement and the amount of parallel movement, both received from the recognition section 102, the object data disposing section 103 incorporates the data into the object data collated against the occupancy grid data from the 3D information input unit 1. After approximation of the outer plane of the occupancy grid data with triangular patches, the configuration and surface data that could be successfully collated are coordinate-transformed for integration using the amount of rotational movement and that of parallel movement obtained from the recognition section 102.

(Step b5)

The integrated triangular patch and surface information texture-mapped on the patch are registered in the environmental model memory section 105.

Thus, by means of this modeling apparatus, prestored object data can be individually substituted for the environmental geometric and surface data compilation built up by data input means, so that access can be made independently to a registered object. Therefore, the information necessary for satisfying the fundamental processing requirements of computer graphics can be directly obtained.

Accordingly, upon mere input of visual sensor information, the environmental model processing unit constructs an environmental model so that intra-environmental position information on small objects and the configuration of a large object can be easily obtained.

It should be understood that while the recognition section 102 of this embodiment employs a combination of planes for recognition of object data from among the environmental 3D configuration and surface data obtained from the 3D environmental data memory 101, other techniques such as collation using the volume of object data can likewise be employed. Moreover, the data in the object data memory 104 is not limited to the data mentioned in the description of this embodiment but a variety of data can be employed according to the recognition technique used in the recognition section 102.

An embodiment of the modeling apparatus according to the second invention is now described with reference to FIG. 1 and FIGS. 15–29.

The gross architecture of this modeling apparatus is identical with the apparatus of the first invention, thus comprising a 3D information input unit 1, an environmental model possessing unit 2, a picture composing unit 3, an analyzing unit 4, and an observation control unit 5. Presented below is a description of differences in construction only.

3D information input unit

Figure 15:
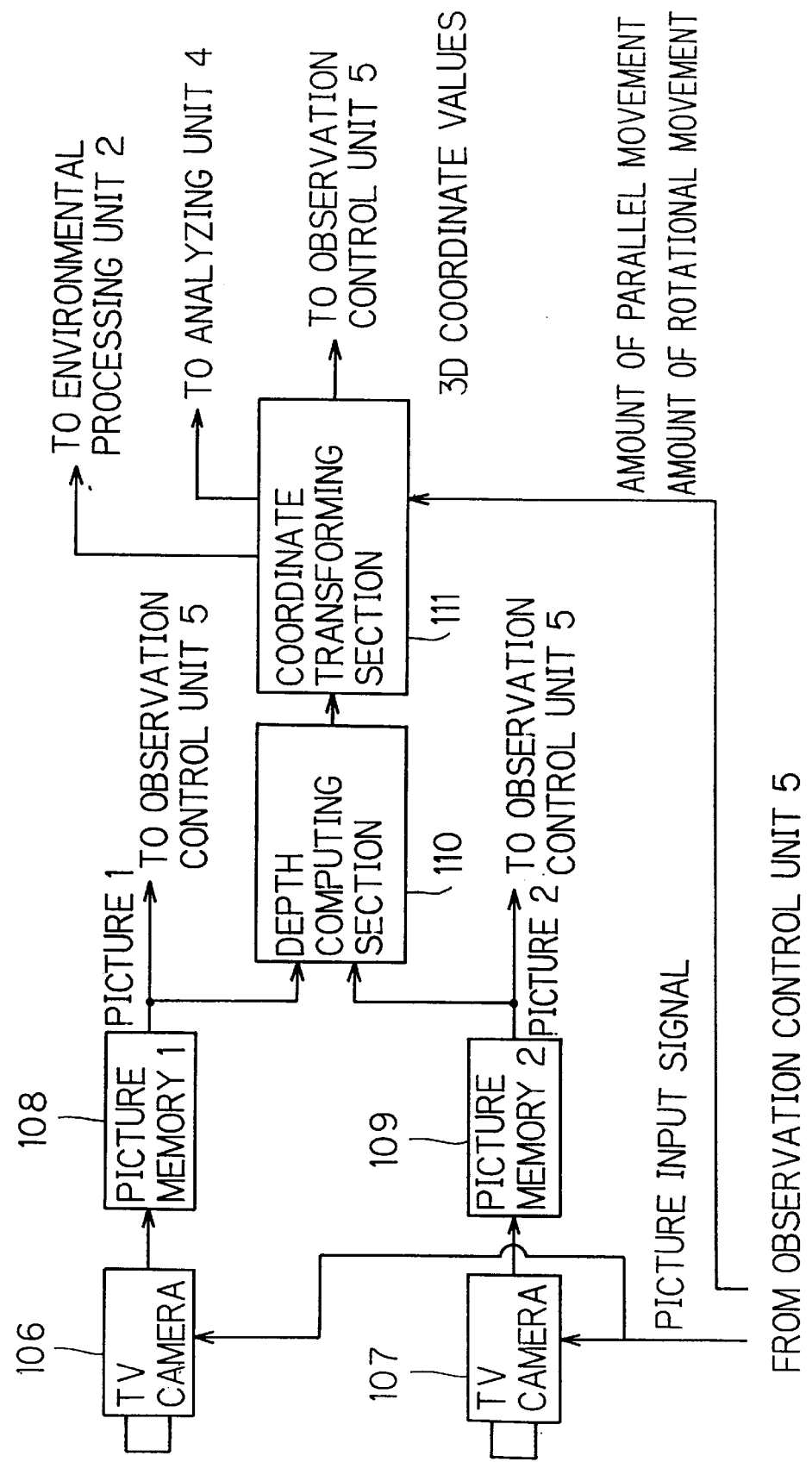
FIG. 15 is a block diagram of the 3D information input unit of the second invention.

FIG. 15 is an exemplary architecture of the 3D information input unit 1 for acquiring depth data by stereo viewing.

A couple of cameras 106, 107 concurrently input pictures according to a picture input signal from the observation control unit 5 and these pictures are stored in picture memories 108, 109, respectively. A depth computing section 110 computes the depth by stereo view from the two pictures input from said picture memories 108, 109.

Prior to observation with this apparatus, the user establishes a world coordinate system serving as a reference within the environment. The initial position and direction of the apparatus in this world coordinate system are first measured and registered in the observation control unit 5.

Figure 17:
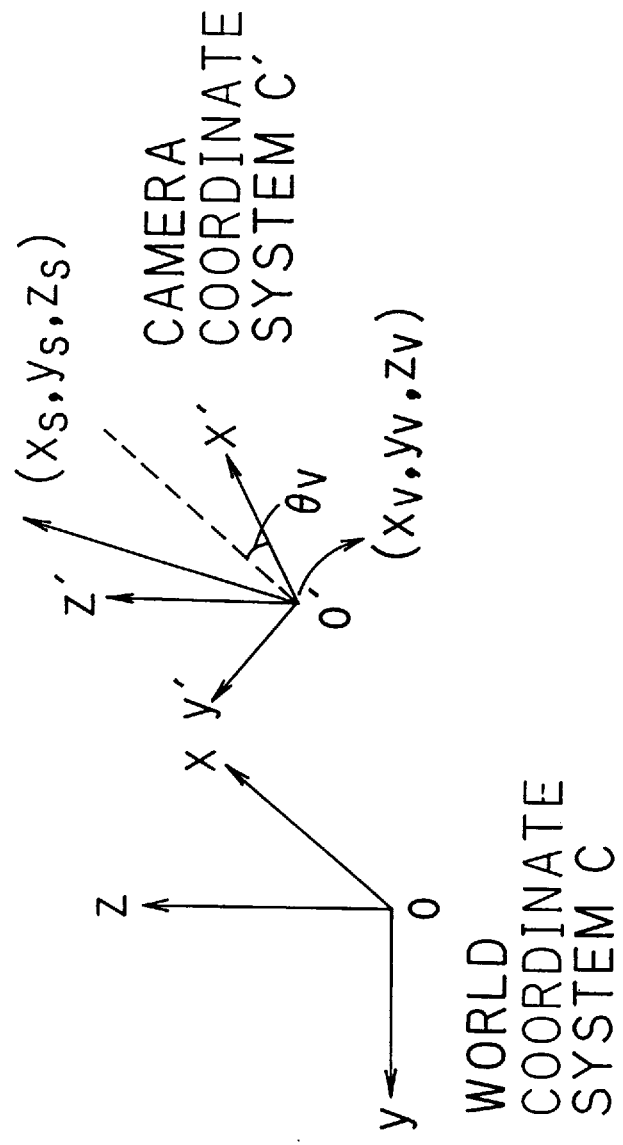
FIG. 17 is a diagrammatic representation of the world coordinate system and stereo camera coordinate system according to the invention.

Using the position and direction (attitude) data of the apparatus in the world coordinate system as received from the observation control unit 5, the coordinate transforming section 111 performs a coordinate transformation of the depth data computed by the depth computing section 110. As illustrated in FIG. 17, the position and direction of the apparatus in the world coordinate system C are written as (xv, yv, zv) and θv, respectively, and the depth data obtained by the depth computing section 110 as (xs, ys, zs). Then, the 3D data (x, y, z) based on the world coordinate system can be found by means of the equations given below. It should be understood that the position and direction data of the apparatus which have been obtained using the coordinate system C' of the stereo cameras as a reference employs the origin and the angle with respect to the x-axis of this coordinate system C'. It should also be understood that the floor surface on which the apparatus moves about is flat so that the rotation of the x- and y-axes is disregarded.

$x = xs \cos\theta v - ys \sin\theta v - xv$ $y = xs \sin\theta v + ys \cos\theta v - yv$ $z = -zv$ Environmental model processing unit The environmental model processing unit 2 constructs an environmental model using the three-dimensional data and picture data from the 3D information input unit 1.

Observation control unit

Figure 16:
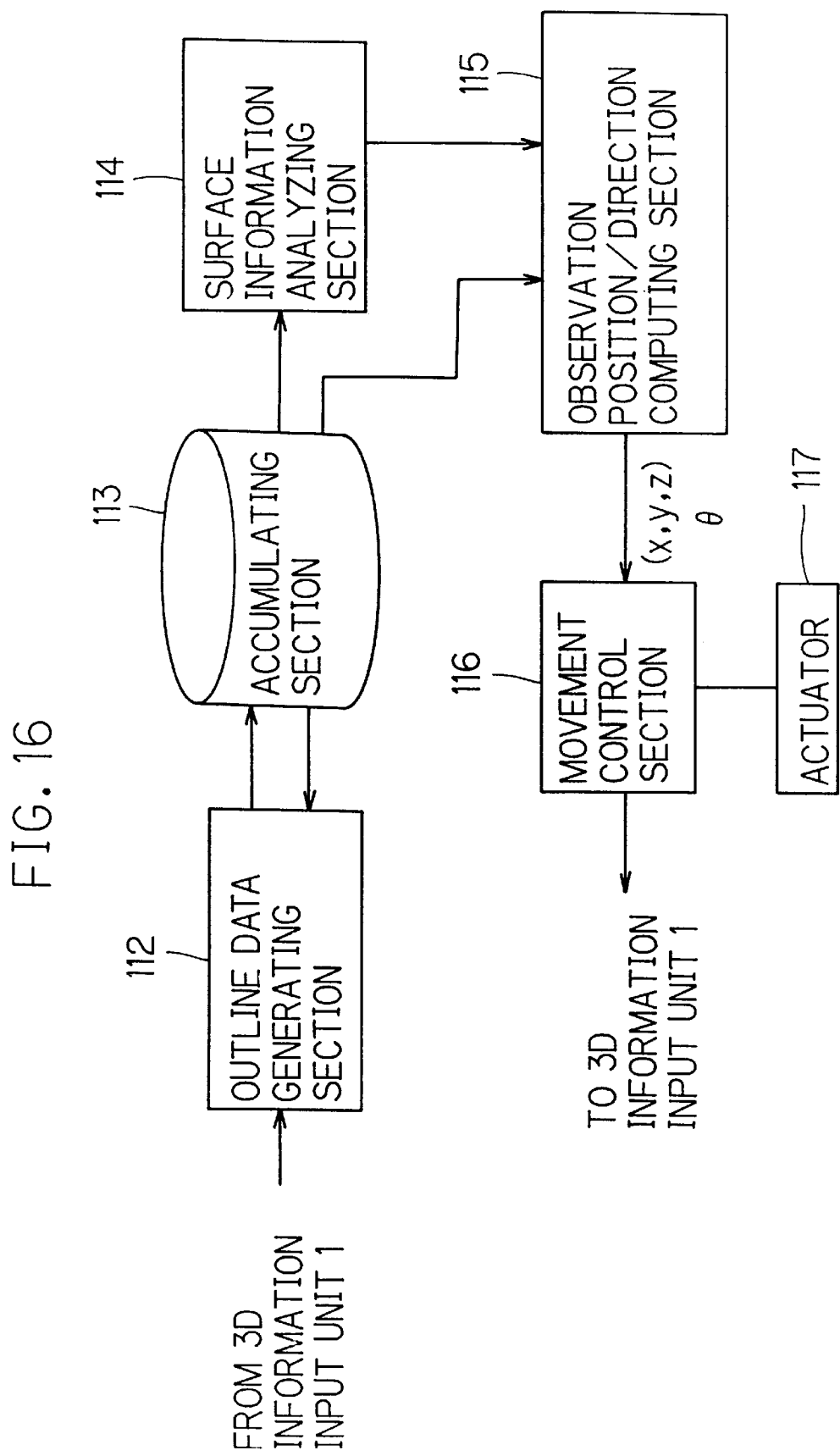
FIG. 16 is a block diagram of the observation control unit of the second invention.

FIG. 16 shows an exemplary architecture of the observation control unit 5. This observation control unit 5 comprises an outer region data generating section 112, an accumulating section 113, a surface information analyzing section 114, an observation position/direction computing section 115, a navigation or movement control section 116, and an actuator 117. The respective components are now described.

Figure 19:
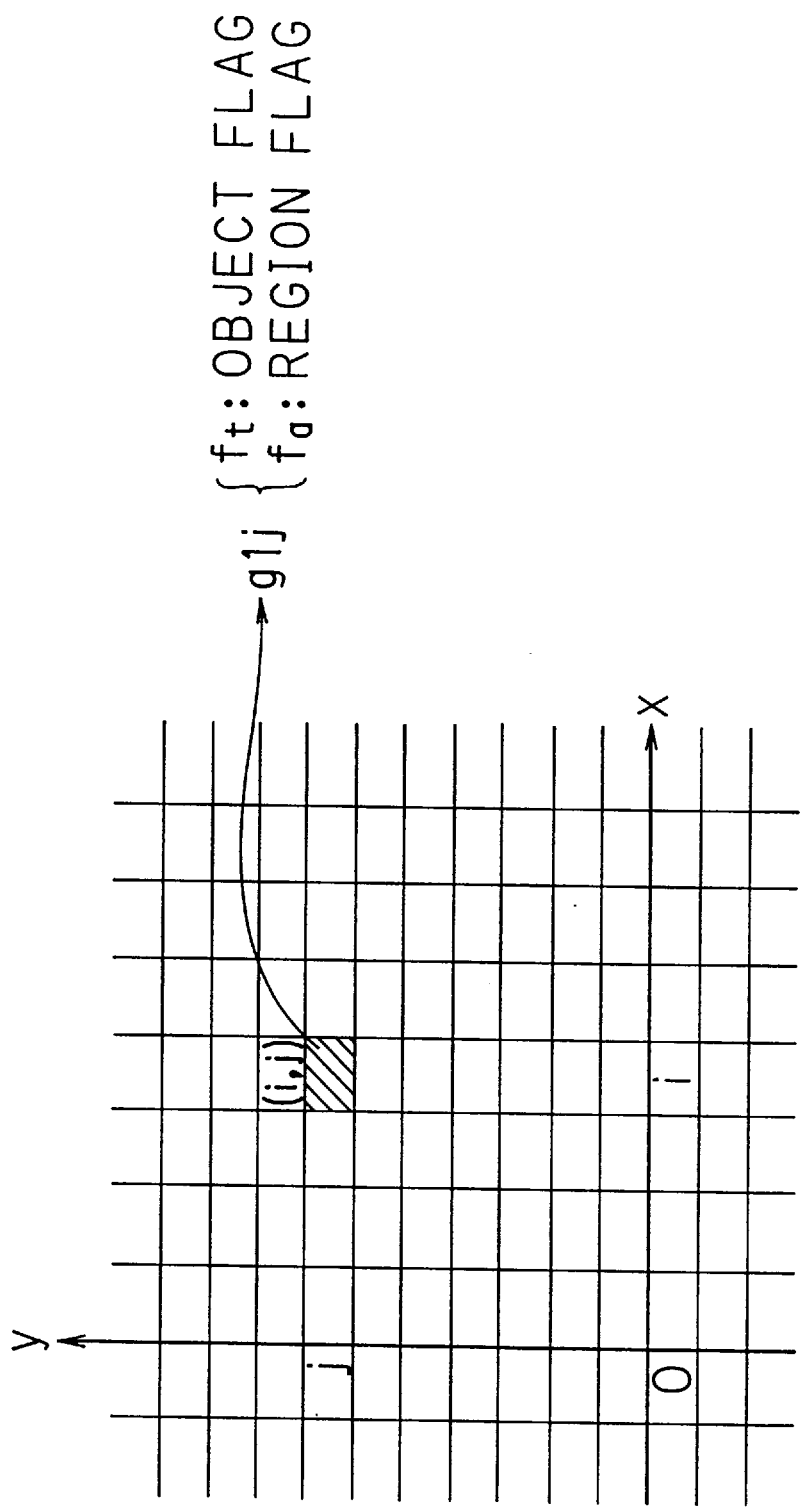
FIG. 19 is a diagram illustrating the occupancy grid of the outline data generating unit.

The accumulating section 113 carries, as accumulated therein, an occupancy grid G obtained by projecting an observation space on an x-y plane and dividing this plane into cells of uniform size (FIG. 19). The (i, j)th cell of this occupancy grid G is written as $g_{ij}$. The $g_{ij}$ has two state flags ft, fa. Here, ft means an area flag which describes whether the cell $g_{ij}$ represents an outer region or not, while fa is a region flag which describes whether $g_{ij}$ is an outer region or not. This relation is explained below.

The flag ft determines whether the cell $g_{ij}$ is a complete outline or not. This flag is 1 when $g_{ij}$ is not a complete outline or 2 when it is a complete outline.

The flag fa establishes whether $g_{ij}$ is an outer region or not. This flag is 0 when $g_{ij}$ is not an outer region or 1 when it is an outer region.

The case of ft=2 or a complete outline means that it is recognized that an outline exists in $g_{ij}$ and no 3D data is present in the region above $g_{ij}$. And the region just mentioned is an outer region which, when present, is designated as fa=1.

The case in which ft=1 or there is not a complete outline means that it is recognized that an outline exists in $g_{ij}$ and a 3D data exists in the region above $g_{ij}$. And this region is regarded as being not an outer region or fa=0.

Figure 18:
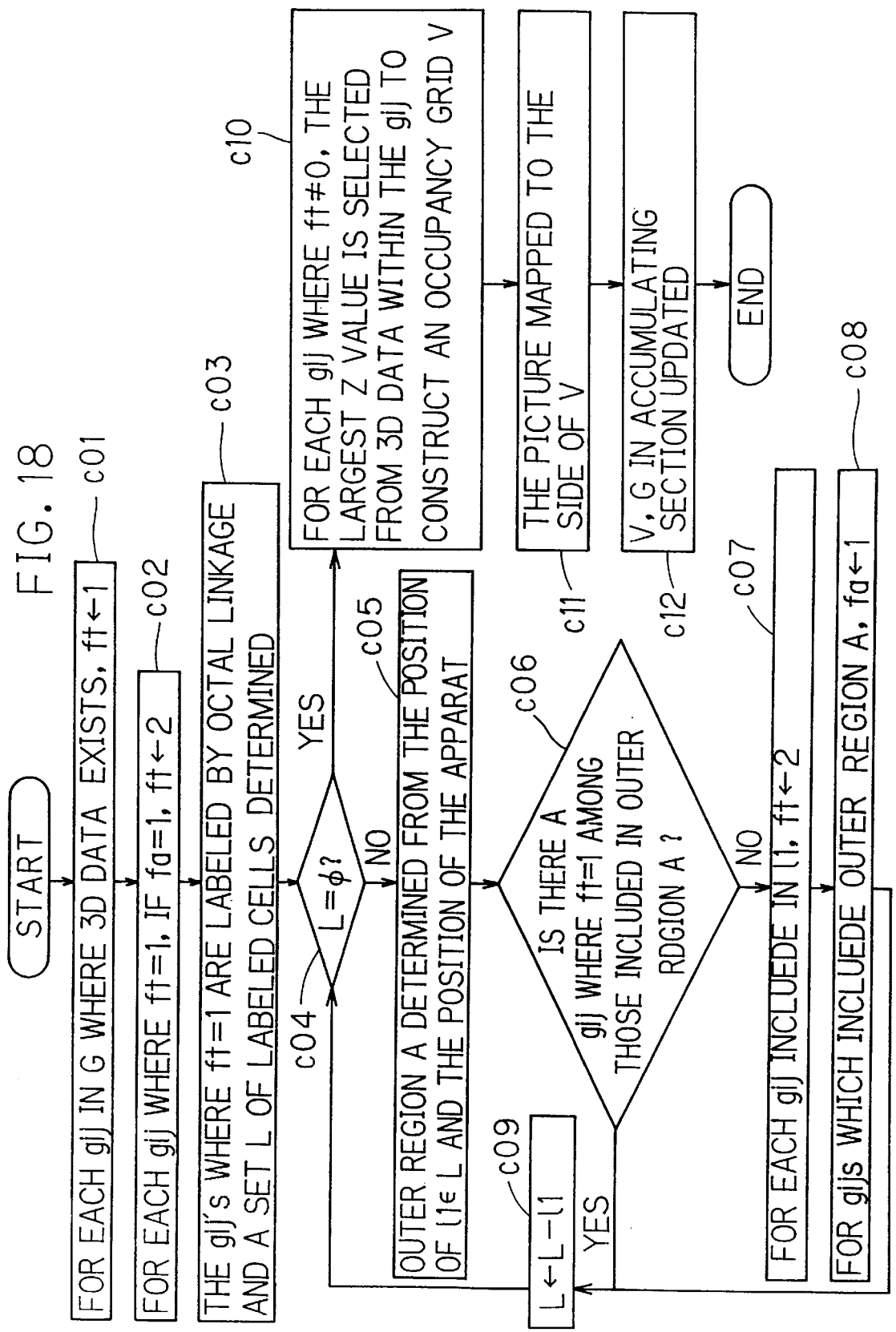
FIG. 18 is a flow diagram of the outline data generating unit.

The outline data generating section 112 selects outline data, non-outline data and picture data from the world coordinate system-based 3D data obtained from the 3D information input unit 1 according to the processing routine shown in FIG. 18 and integrates these data with the data in the accumulating section 113.

The processing flow in this outline data generating section 112 is now explained with reference to FIG. 18.

First, as prerequisites, the ft and fa of each $g_{ij}$ are initialized to 0 at the starting of the apparatus. The occupancy grid G registered in the accumulating section 113 is then loaded.

(Step c01)

For each 3D data (x, y, z) obtained from the 3D information input unit 1, the object flag ft of $g_{ij}$ including (x, y) values is set to 1.

(Step c02)

For each $g_{ij}$ where ft=1, it is enquired if fa=1 and when the answer is affirmative, ft is set to 2.

(Step c03)

Figure 20:
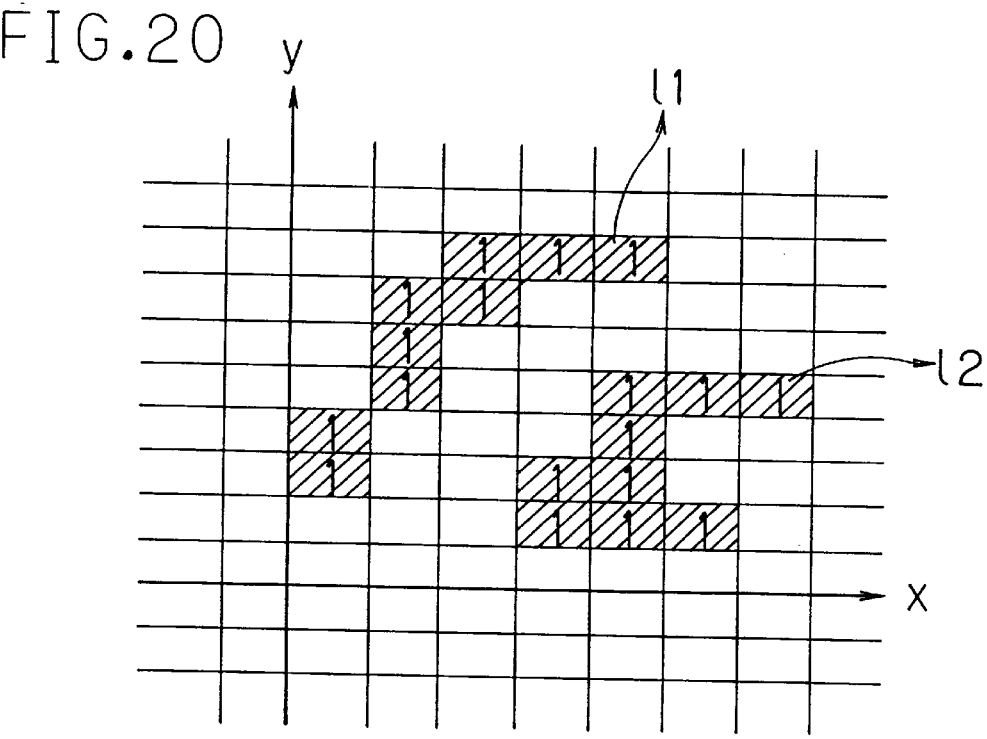
FIG. 20 is a diagram illustrating the labeling done in the outline data generating unit.

The respective $g_{ij}$ where ft=1 are labeled in an octally adjoining fashion as illustrated in FIG. 20 and a set L of labeled cells is determined. In the case of FIG. 20, the labeling is made as 11, 12E L (Step c04)

It is enquired if L is an empty set or not and if it is not an empty set, the processing sequence proceeds to step c05. If it is an empty set, the sequence skips to step c10.

(Step c05)

Figure 21:
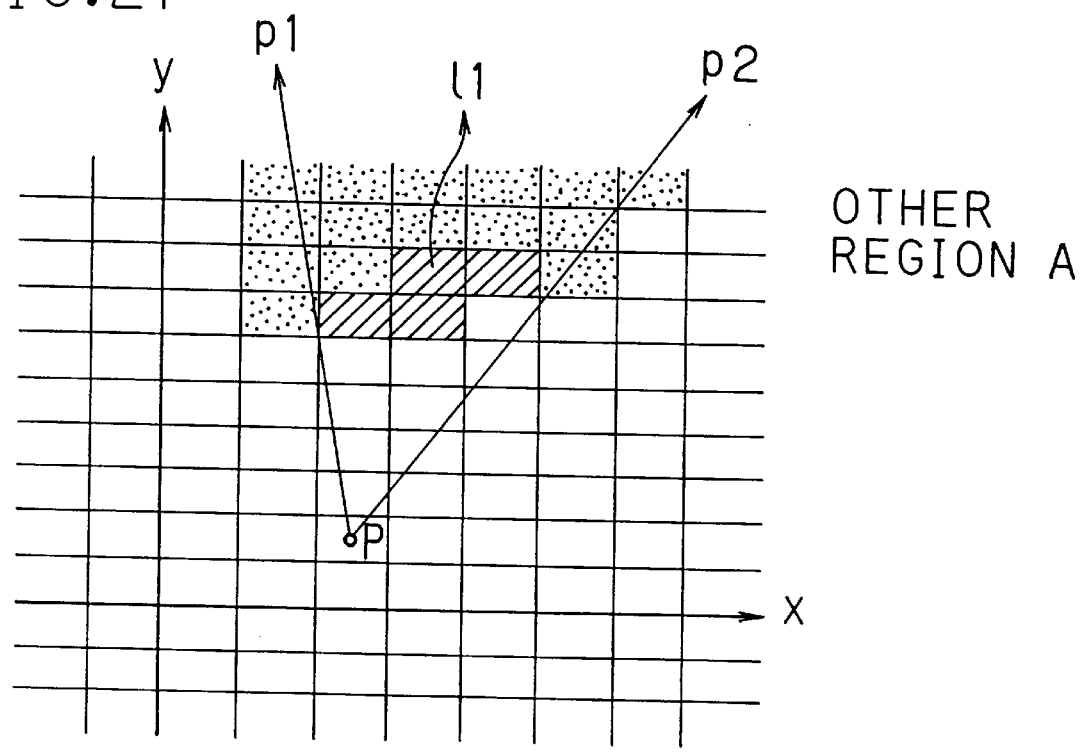
FIG. 21 is a diagram illustrating the outline region in the outline data generating unit.
Figure 22:
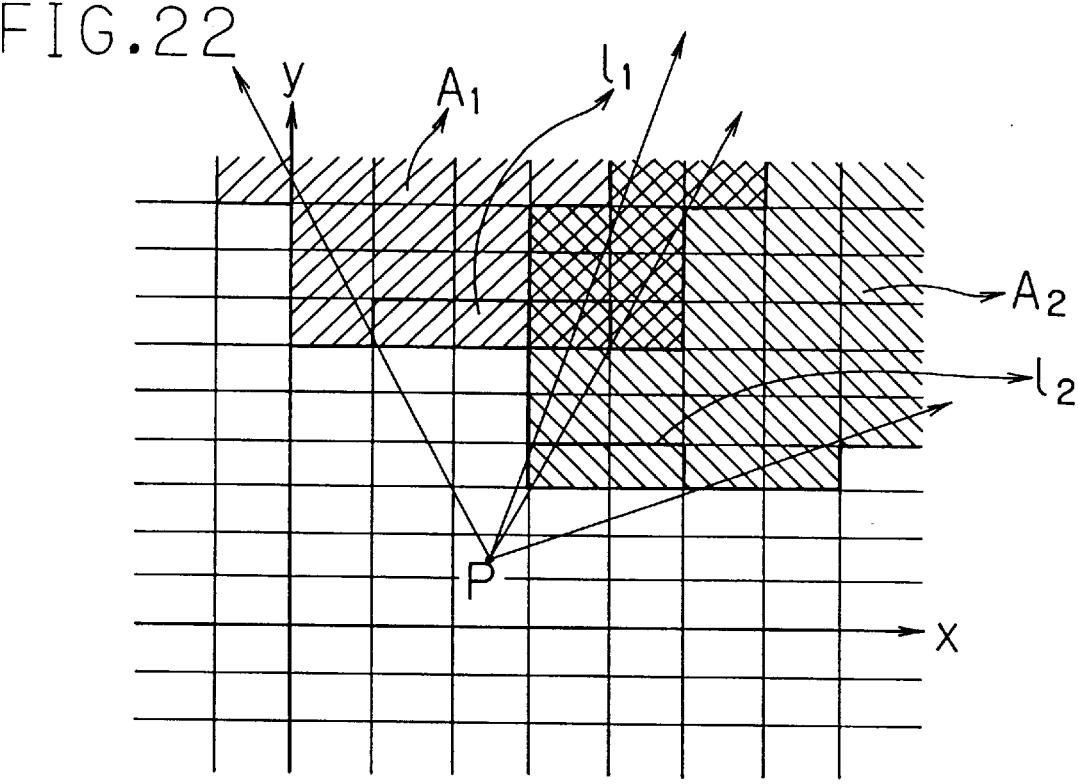
FIG. 22 is a diagram illustrating the procedure of determining the outer region in the outline data generating unit.
Figure 23:
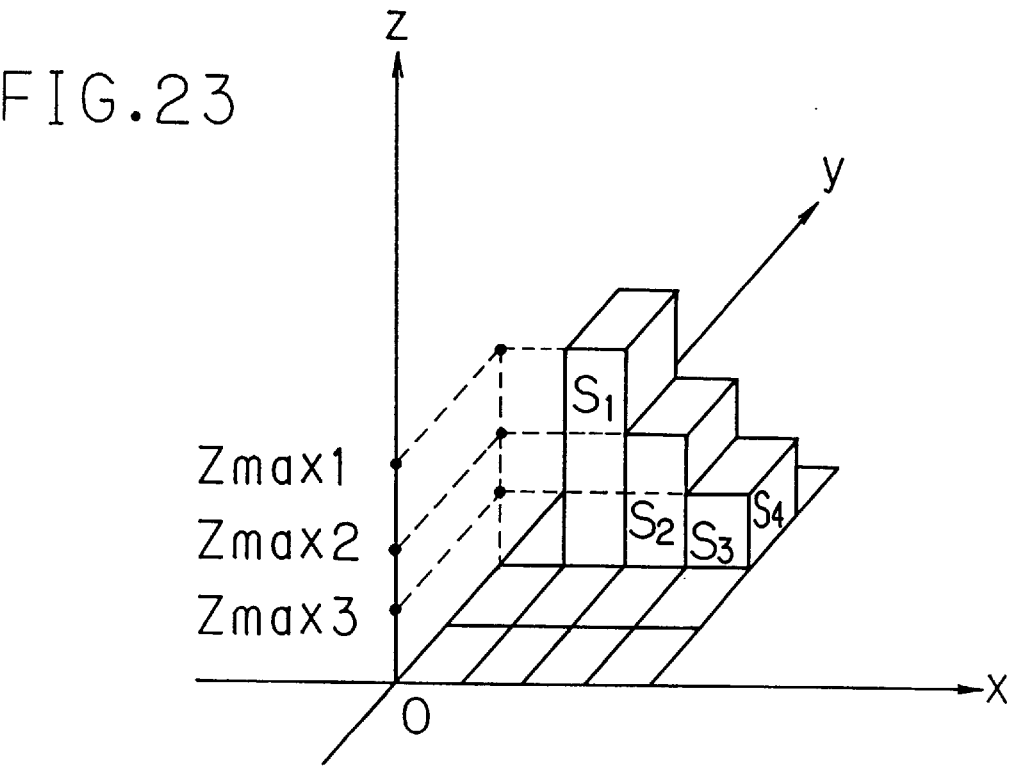
FIG. 23 is a diagram illustrating the occupancy grid of the outline data generating unit.

When L is not an empty set, one region li is randomly taken from among the labeled regions included in L. Then, within the region surrounded by the two tangential lines p1, p2 constructed from the position P of the apparatus to the labeled region li as shown in FIG. 21, the region further away from P than li is determined. The set of all occupancy grid cells $g_{ij}$ including this region is designated as the outer region A. In the case of FIG. 22, the outer region of labeled region 11 is A1 and the outer region of labeled region 12 is A2.

(Step c06)

It is enquired whether, among the cells $g_{ij}$ included in the outer region A, there is a cell where ft=1, that is to say a region in which 3D data exists. If there is such a region, the sequence proceeds to step c09. If not, the sequence proceeds to step c07.

(Step c07)

When, among the cells $g_{ij}$ included in the outer region A, there is no cell where ft=1 (no region where 3D data exists) (in the case of FIG. 22, the outer region A1), the $g_{ij}$ included in the labeled region is regarded as an outline and 2 is substituted for ft.

(Step c08)

The fa of the $g_{ij}$ containing an outer region is set to 1. In the example of FIG. 22, the ft of the $g_{ij}$ included in 11 is set to 2. The fa of the $g_{ij}$ included in A1 is set to 1. However, since the $g_{ij}$ where ft=1 exists in the A2 region, the ft of the $g_{ij}$ included in 12 remains to be 1 and the fa of the $g_{ij}$ included in A2 also remains to be 0.

(Step c09)

Excepting the labeled region li selected from the set L, the sequence returns to step c04, one labeled region is chosen again and the above processing is repeated until L becomes an empty set.

(Step c10)

With L being an empty set now, one of the occupancy grid cells $g_{ij}$ where ft is 1 or 2 which has the largest z coordinate, Zmax, of 3D data is selected. Then, a solid occupancy grid V (FIG. 23) comprising Zmax added to occupancy grid G is constructed.
(Step c11)

Figure 24:
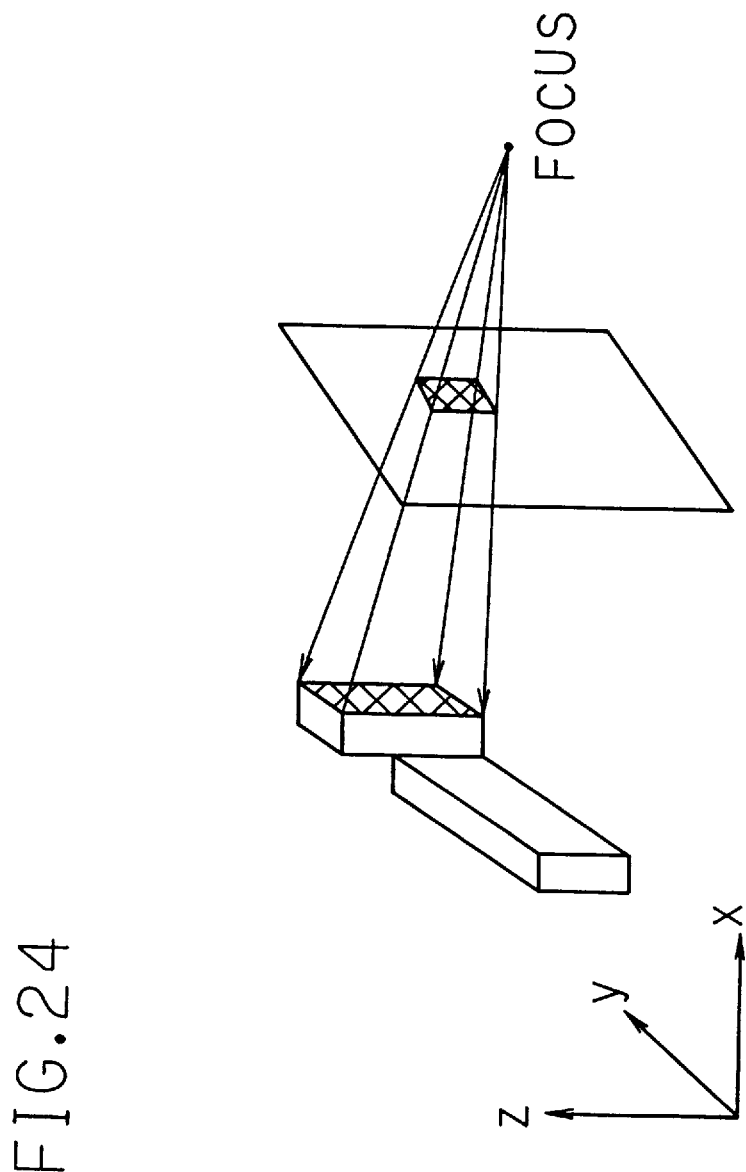
FIG. 24 is a diagram illustrating the picture mapping operation in the outline data generating unit.
Figure 25:
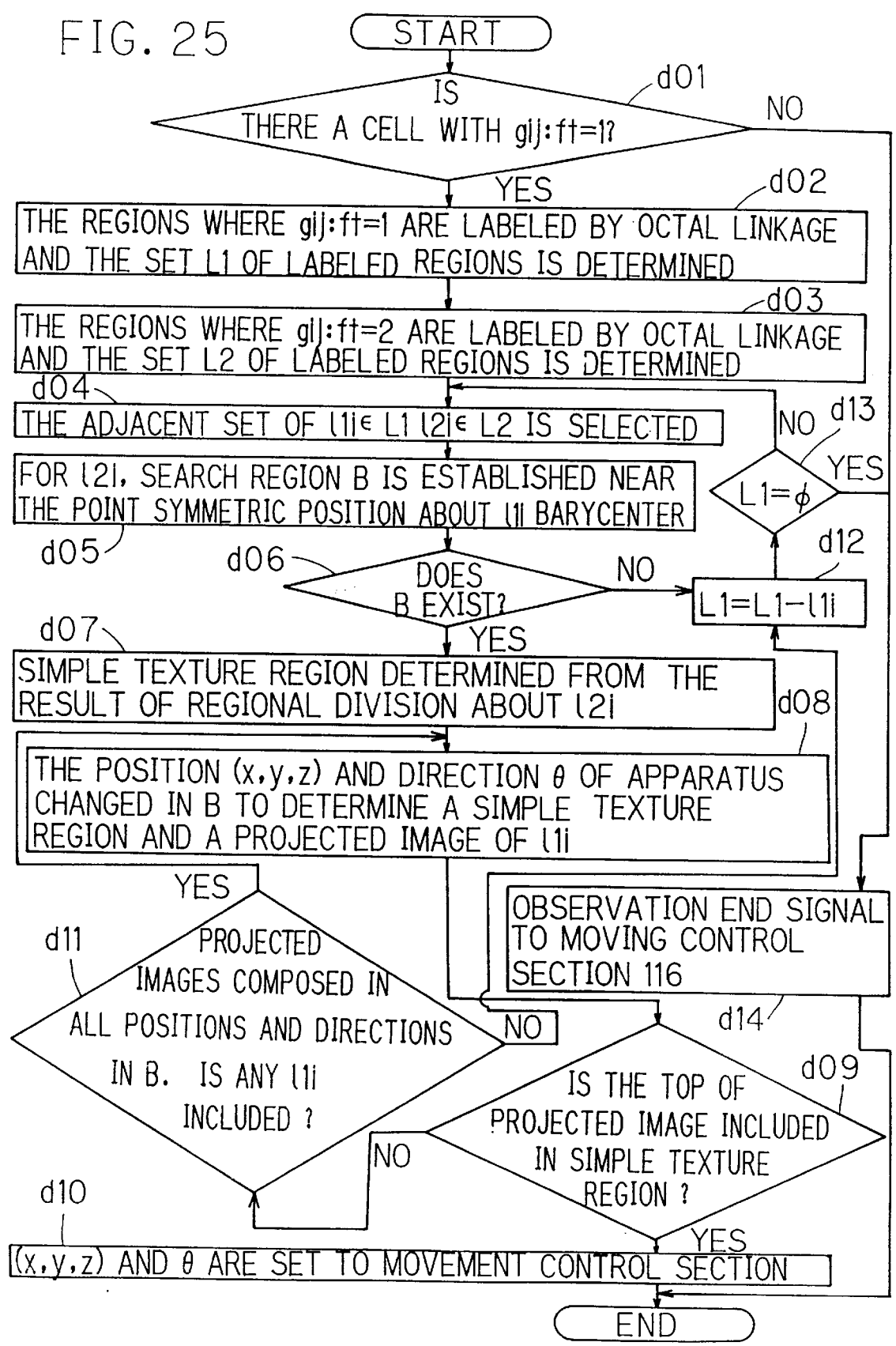
FIG. 25 is a flow diagram showing the flow of processing in the observation position/direction computing unit.

By the technique of texture mapping in computer graphics, the picture information obtained from the picture information input means is pasted to the side of the solid occupancy grid. Here, the side of the solid occupancy grid means the side of a columnar cuboid obtainable by extending the individual cells of the occupancy grid G by Zmax upwards and in the case of the solid occupancy grid shown in FIG. 23, it means S1, S2, S3 and S4. Since the position of the apparatus in the world coordinate system is known, the image portion projected on this side of the solid occupancy grid can be cut out if the position/posture and position of focus of the camera with respect to the apparatus have been gained by calibration as shown in FIG. 24. Therefore, the clipped picture is added to each side of the cubic occupancy grid as a picture file.
(Step c12)

After the above processing, the outline data generating section 112 updates the data in the accumulating section 113 to the new solid occupancy grid V and occupancy grid G.
[Surface information analyzing section]

The surface information analyzing section 114 performs the regional division, by edge density, of the picture added to each side of the solid occupancy grid V in the accumulating section 113.
[Observation position/direction computing section]

In the observation position/direction computing section 115, the observation position and direction that will give a background picture having a simple texture region for the object to be observed are computed. The flow of processing in this observation position/direction computing section 115 is now described with reference to FIG. 25.
(Step d01)

It is enquired if there exists a cell where ft=1 in the occupancy grid G and if it does, the sequence proceeds to step d02. If not, the sequence proceeds to step d14 and ends with the transmission of an observation end signal to the navigation control section 116.
(Step d02)

Since a cell where ft=1 exists in the occupancy grid G and this is not an outline, a remeasurement is made for improved measuring accuracy. The cells gij where ft=1 in the occupancy grid G are labeled in an octal contiguous fashion and the set of these cells is designated as L1.
(Step d03)

Among the cells gij of the occupancy grid G. the cells where ft=2 are labeled in an octal contiguous fashion and the set of these cells is designated as L2. L2 is an outline region.
(Step d04)

The adjacent regions of L1 and L2 are designated as 11i and 12i, respectively. The term "adjacent" is used herein to mean that no gij where ft=1 exists between 11i and 12i.
(Step d05)

Figure 26:
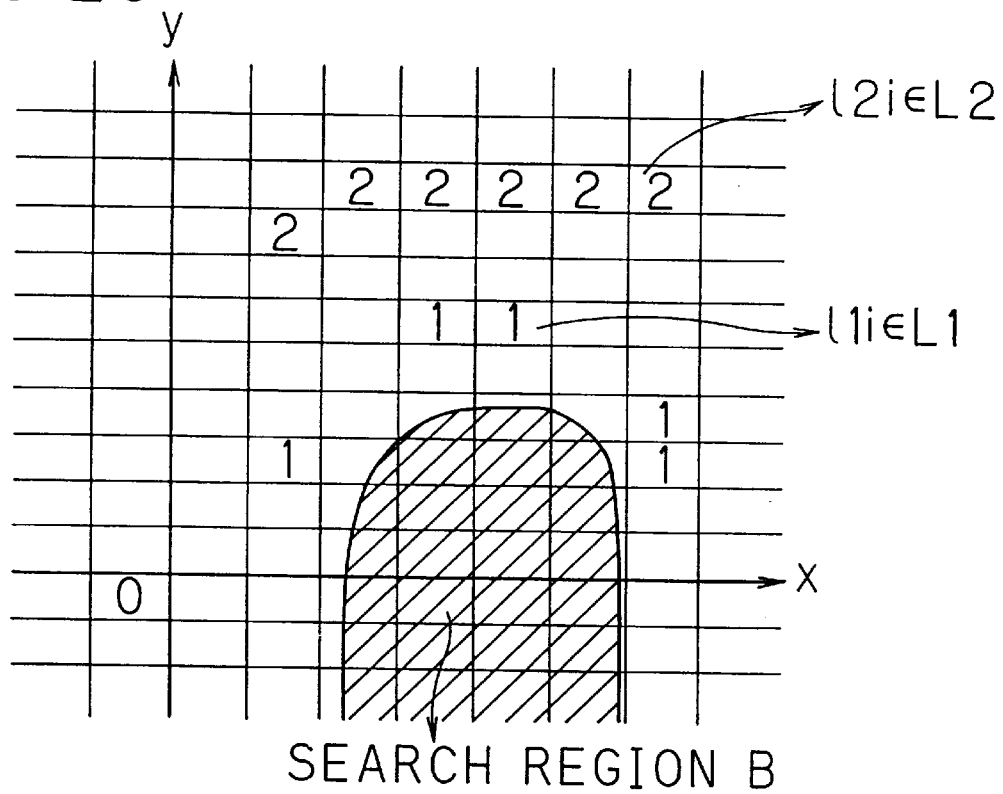
FIG. 26 is a diagram illustrating the procedure of establishing a search region for the observation position/direction computing unit.
Figure 27:
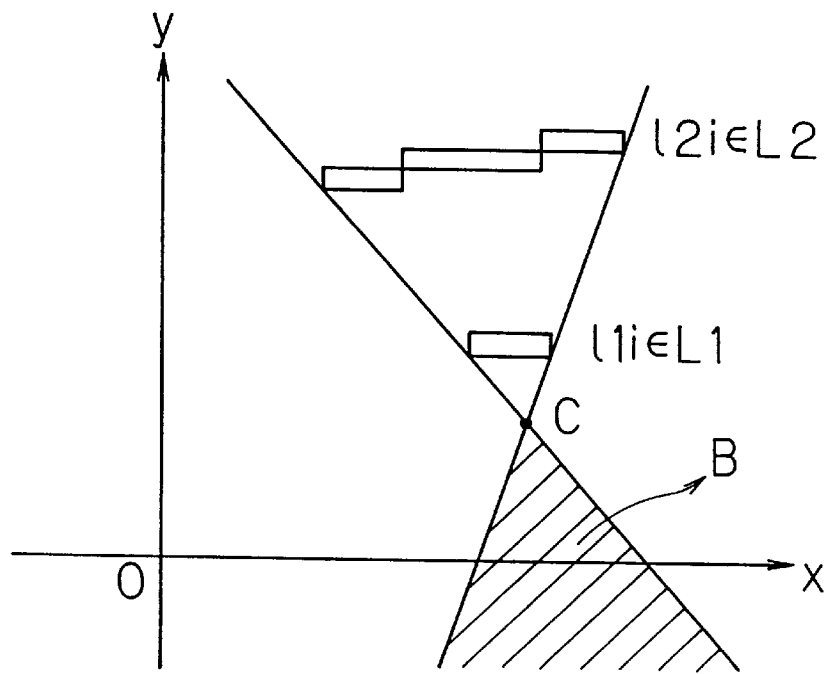
FIG. 27 is another diagram illustrating the procedure of establishing a search region for the observation position/direction computing unit.

As shown in FIG. 26, a search region B is established as a region symmetric with respect to the 12i region about the barycenter of 11i. For example, B is established as a delta below the point of intersection C of extensions of the straight lines interconnecting the ends of 11i with the corresponding ends of 12i as shown in FIG. 27.
(Step d06)

When the search region B has been established, the sequence proceeds to step d07. If it cannot be established, the sequence proceeds to step d12.
(Step d07)

After establishment of the search region B, based on the result of regional division of the picture on the side surface of the solid occupancy grid which corresponds to 12i by the surface information analyzing section 114, a region of low edge density is determined as a simple texture region.
(Step d08)

Figure 28:
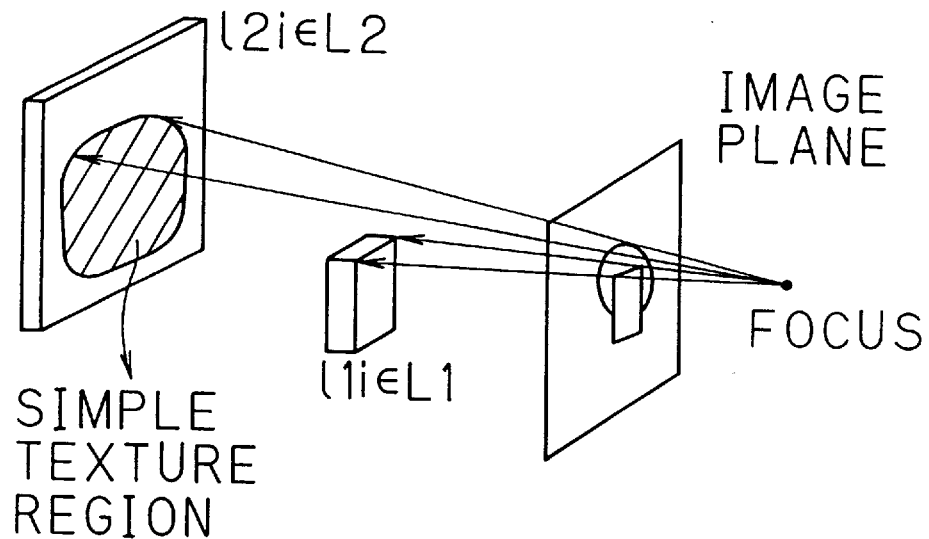
FIG. 28 is a diagram illustrating the projection on the picture plane in the observation position/direction computing unit.

By varying the position and direction of the apparatus in the search region B, a picture is generated by projection on the simple texture region and 11i on the image plane of this apparatus (FIG. 28).
(Step d09)

Figure 29:
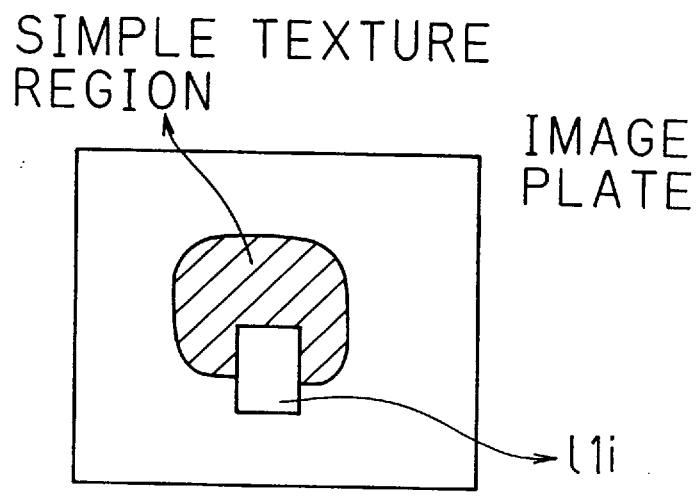
FIG. 29 is a diagram illustrating the relation of inclusion with a simple texture region in the observation position/direction computing unit.

On this picture, it is enquired if the top of the projected image of 11i is included in the simple texture region (FIG. 29). If it is included, the sequence proceeds to step d10. If not, the sequence proceeds to step d11.
(Step d10)

With the space in which 11i occurs being taken as a reobserving space, the (x, y, z) and θ data are sent to the navigation control section 116 to complete the processing sequence.
(Step d11)

If the top of the projected image of 11i is not included in the simple texture region, preparation of the projected image is performed in all locations within the search region B to enquire if the top of the projected image of 11i is included in the simple texture region. If it is included, the sequence returns to step d08. If not, the sequence proceeds to step d12.
(Step d12)

When the top of the projected image is not included in the simple texture region for any 11i even if the preparation of a projected image is performed in any location within the search region B, the 11i is excluded from the L1 set.
(Step d13)

It is enquired whether L1 is an empty set or not. If L1 is an empty set, an observation end signal is transmitted to the navigation control section 116 to terminate the sequence. If L1 is not an empty set, adjacent clusters of 11i and 12i are selected again, a search region is established and the sequence returns to step d04.
[Navigation control section]

In the navigation control section 116, the actuator 117 is controlled so that the apparatus may move according to the position (x, y, z) and direction (θ) input from the observation position/direction computing section 115. After the movement, a picture input signal is transmitted to the 3D attribute information input unit 1. Moreover, as the current position and direction of the apparatus in the world coordinate system, (x, y, z) and (θ) data are sent to the 3D attribute information input unit 1. When an observation end signal is input from the observation position/direction computing section 115, the navigation control is stopped to terminate the observation.

In this embodiment, the picture is subjected to division according to edge density in the surface information analyzing section 114. However, the regional division can likewise be performed by texture analysis using color hue or Fourier transformation. Furthermore, the technique of establishing the search region B and the manner of determining the position and direction of projected image generation in the observation position/direction computing section 115 are not limited to those described in this specification, either, and any other appropriate techniques or modes can be utilized.

The modeling apparatus according to one embodiment of the third invention is now described with reference to FIG. 1 and FIGS. 30–42.

Figure 30:
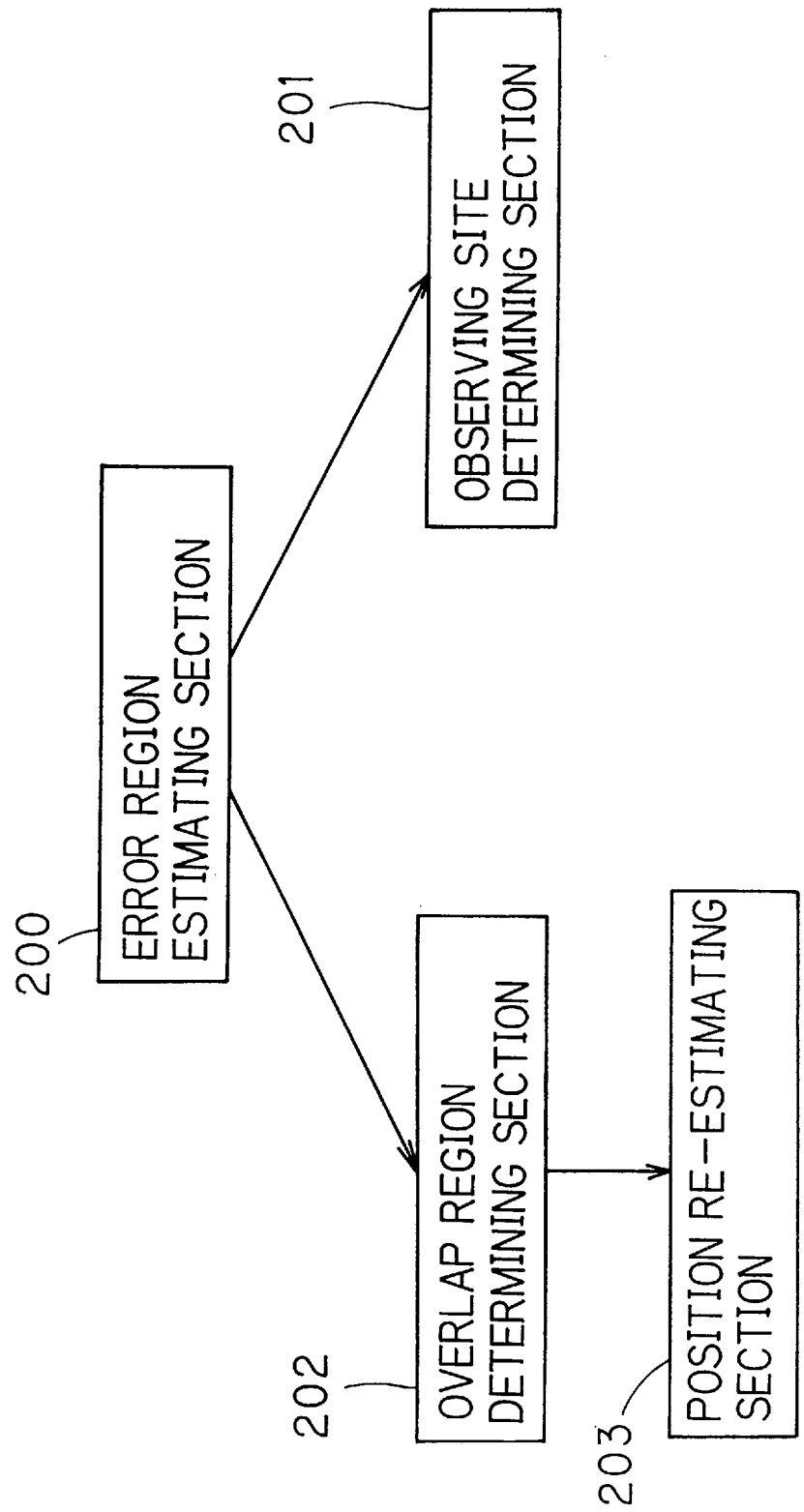
FIG. 30 is a block diagram of the observation control unit of the third invention.
Figure 31:
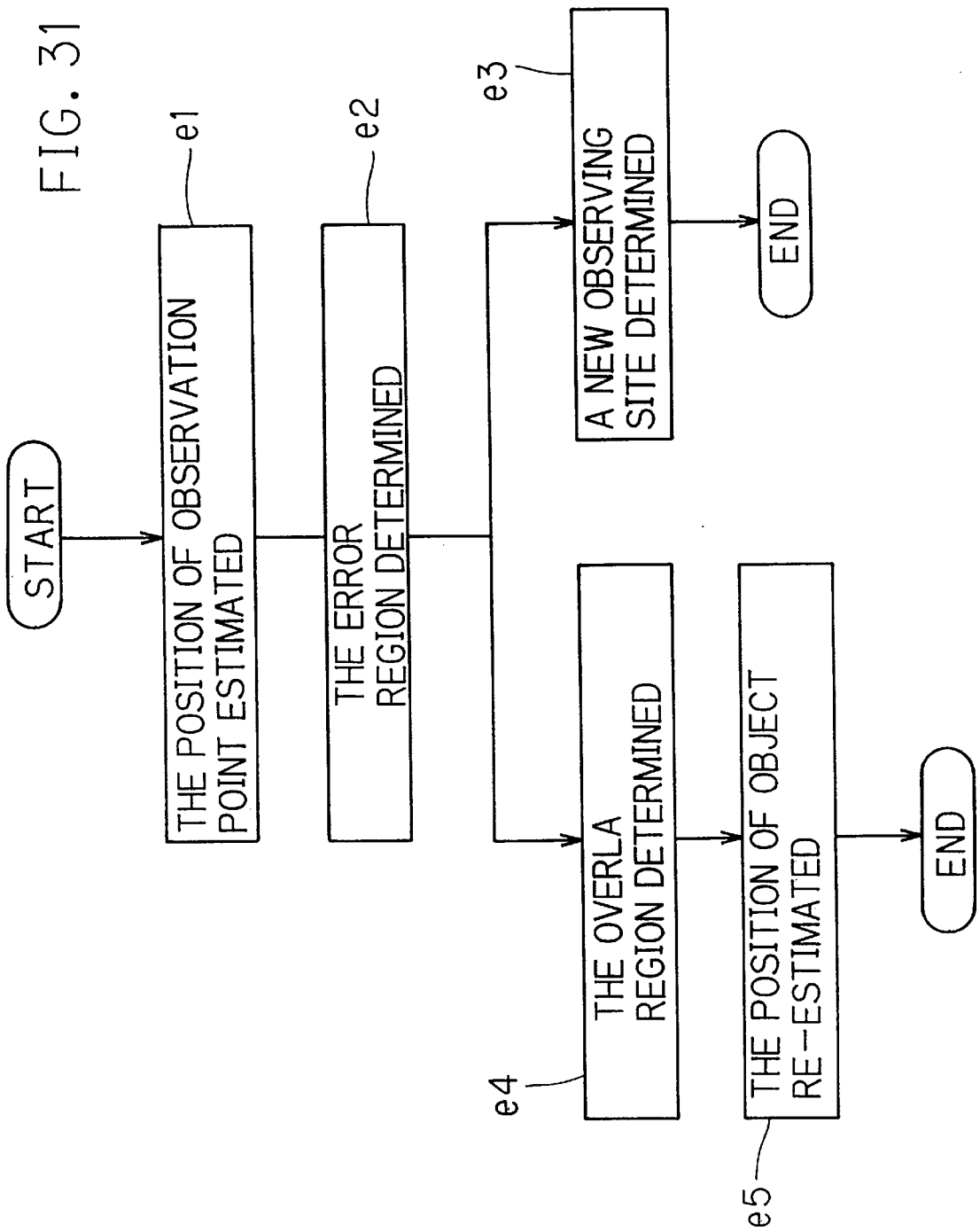
FIG. 31 is a flow diagram of the observation control unit of the third invention.

The gross architecture of this modeling apparatus is identical with that of the first invention, thus comprising a 3D attribute information input unit 1, a environmental model processing unit 2, a picture composing unit 3, an analyzing unit 4, and an observation control unit 5. In the following description, only the differences in structure from the apparatus of the first invention are pointed out and explained. Observation control unit FIG. 30 shows an exemplary architecture of the observation control unit 5 of this embodiment and FIG. 31 is a flow diagram of processing in this observation control unit 5.

The observation control unit 5 comprises an error region estimating section 200 for estimating an error region with respect to the position of observation point estimated by the 3D attribute information input unit 1, an observing site determining section 201 for determining a new observing site, an overlap region determining section 202 for determining an overlap region of the error regions, and a position re-estimating section 203 for re-estimating a position from said overlap region.

The action state of the observation control unit 5 is now explained. It should be understood that for the determination of a new observing site, steps e1, e2 and e3 are executed. Moreover, for re-estimation of the estimated position on the basis of observation from the new observing site, steps e1, e2, e4 and e5 are executed.

In step e1, the 3D attribute information unit 1 estimates the position of observation point.

In step e2, the error region estimating section 200 estimates an error region for said estimated position.

In step e3, the observing site determining section 202 determines a new observing site.

In step e4, the overlap region determining section 202 determines an overlap region from a plurality of error regions.

In step e5, the position re-estimating section 203 re-estimates the position based on said overlap region.

The respective steps are now described in detail.
(Step e1)

The method of estimating the position of observation point by the 3D attribute information input unit 1 is explained.

Figure 39:
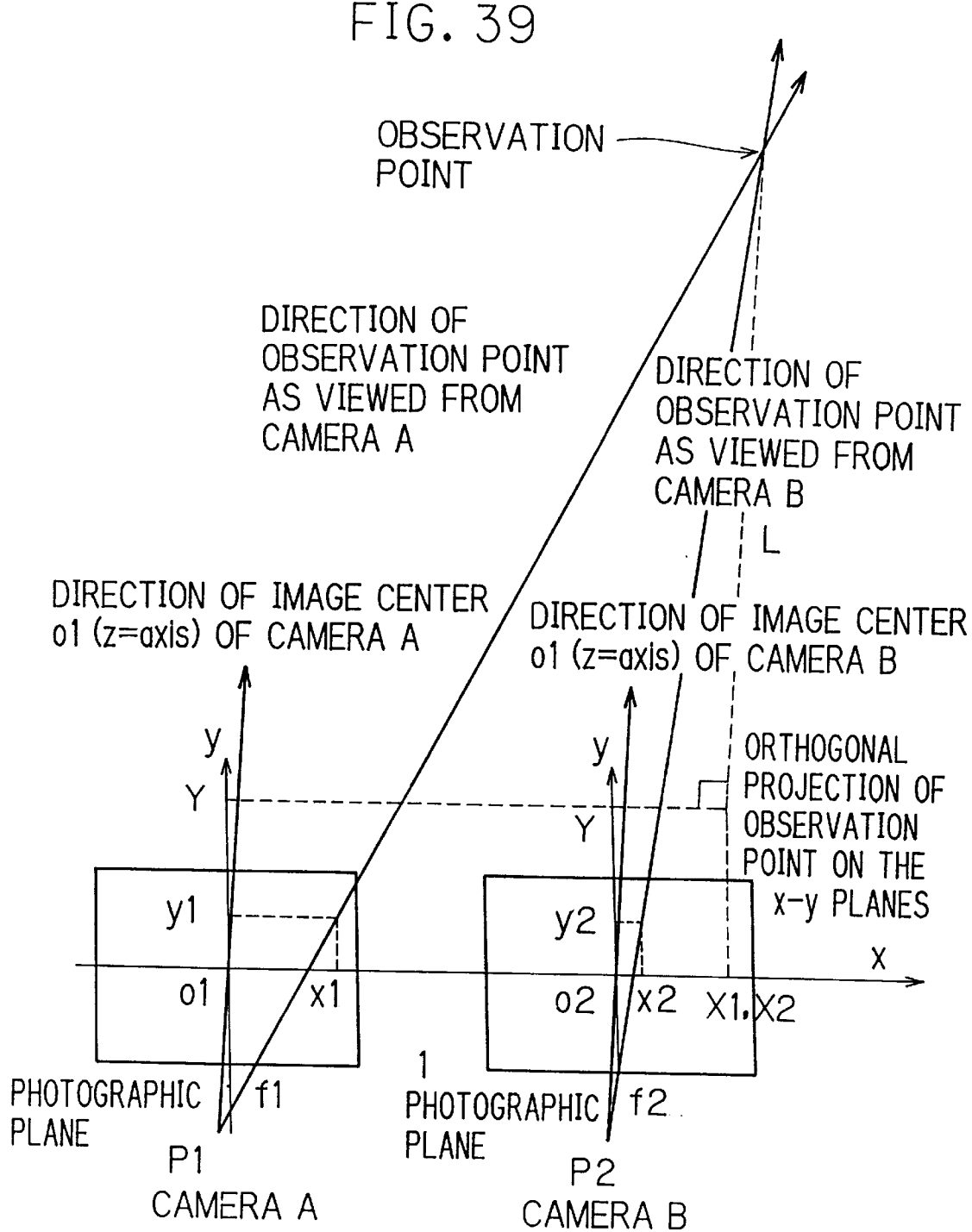
FIG. 39 is a diagram showing the positional relationship between two cameras.

The 3D information input unit 1 observes the object with a couple of cameras a, b. FIG. 39 shows the topological relationship of these cameras a, b with the observation point. This topological relationship is an follows.

(1) The cameras a, b are disposed with their photographic planes lying on the same plane.

(2) An x-y-z orthogonal coordinate system is established in a space containing the modeling apparatus. This system is hereinafter referred to as the space coordinate system.

(3) The space coordinates of cameras a, b are now written as (cx[1], cy[1], cz[1]), and (cx[2], cy[2], cz[2]), respectively.

(4) An x-y-z orthogonal coordinate system is established with its origin at the center o1, o2 of the image plane of each of cameras a, b. These coordinate systems are referred to as the camera a coordinate system and the camera b coordinate system, respectively.

(5) The z-axes of the two camera coordinate systems pass through the centers o1, o2 of the respective image planes and are parallel to each other.

(6) The x-, y- and z-axes of each camera coordinate system are parallel to the longitudinal and transverse rows, respectively, of picture elements and are parallel to the x-, y- and z-axes, respectively, of the space coordinate system.

(7) The x-axes of the two camera coordinate systems lie on the same straight line and the distance between o1 and o2 is assumed to be 1.

(8) The positions of observation point on the photographic planes of cameras a, b are expressed as (x1, y1, 0) and (x2, y2, 0) in the respective camera coordinate systems.

(9) The focal distances of cameras a, b are expressed as f1 and f2, respectively, and the positions of focus are expressed as P1 and P2, respectively.

The distance between the observation point and the photographic plane is expressed as L.

The positions of the point obtained by orthogonal projection of the observation point on the x-y planes of the respective camera coordinate systems are expressed as (X1, Y, 0) and (X2, Y, 0) in the respective camera coordinate systems.

According to (1) through (9), the following equations hold among x1, x2, y1, y2, f1, f2, 1, X1, X2, Y and L $$X1 = \left(1 + \frac{L}{f1}\right) x1 \quad (1)$$

$$X2 = \left(1 + \frac{L}{f2}\right) x2 \quad (2)$$

$$l = X1 - X2 \quad (3)$$

$$Y = \left(1 + \frac{L}{f1}\right) y1 = \left(1 + \frac{L}{f2}\right) y2 \quad (4)$$

X1, X2, Y and L are determined by solving the above equations (1) through (4).

The estimated position of the observation point as expressed in the space coordinate is (cx[1]+X1, cy[1]+f1+L, cz[1]+Y1) or (cx[2]+X1, cy[2]+f1+L, cz([2]+Y1). The same value is obtained by whichever of the above expressions. In the following explanation, the space coordinates of the estimated position are expressed as (tx, ty, tz).
(Step e2)

Figure 32:
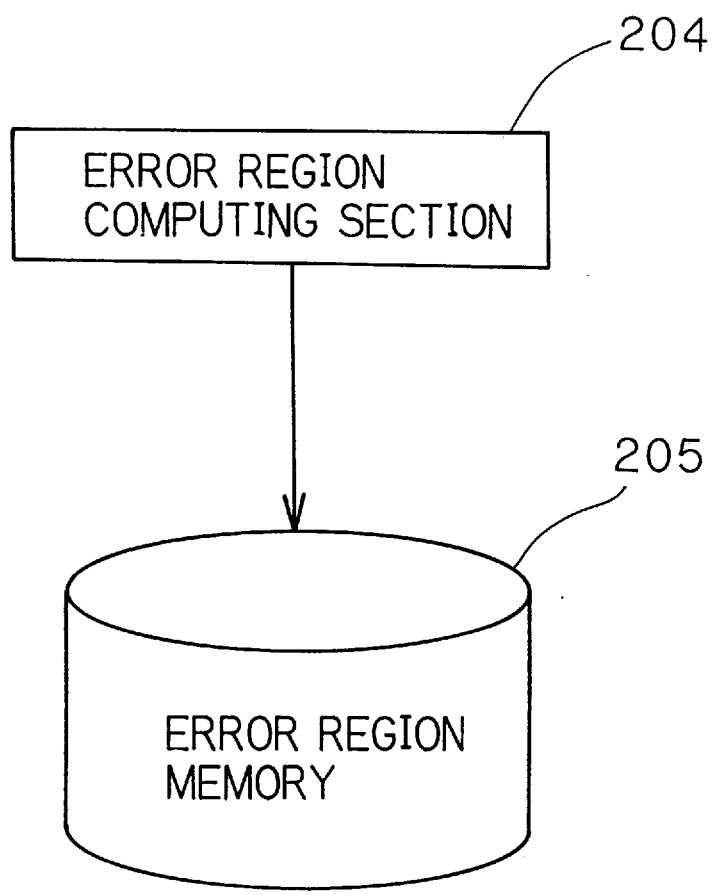
FIG. 32 is a block diagram of the error region estimating unit.
Figure 33:
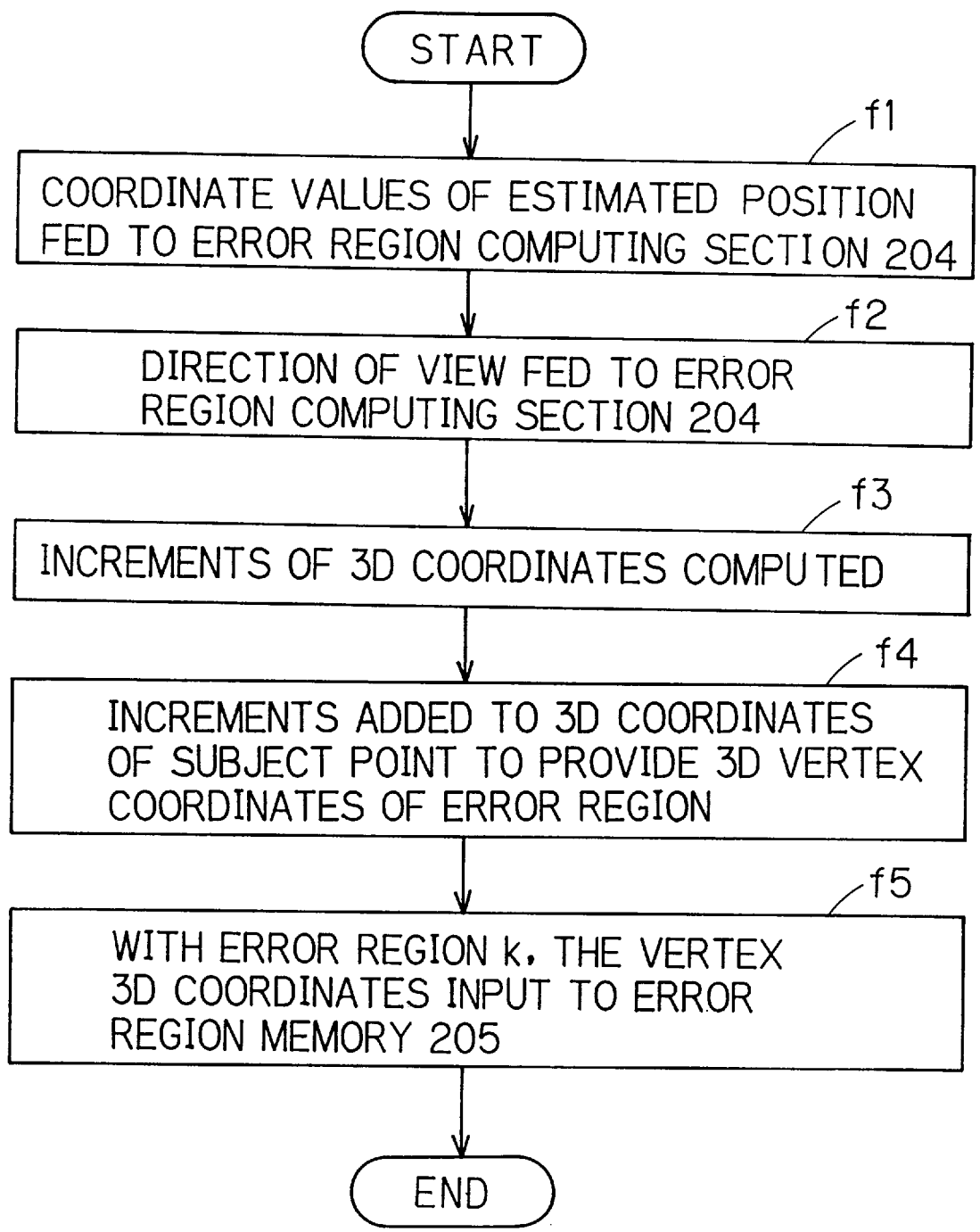
FIG. 33 is a flow diagram of the error region estimating unit.

FIG. 32 is a block diagram of the error region estimating section 200 and FIG. 33 is a flow diagram of processing in the section 200. The error region estimating section 200 comprises an error region computing means 204 and an error region memory 205.

The operational state of this error region estimating section 200 is now described.

In step f1, the coordinate values (tx, ty, tz) of the estimated position are fed to the error region computing means 204.

In step f2, the direction of vision at the estimation of the estimated position is fed to the error region computing means 204.

In step f3, the increment of the 3D coordinates with respect to the estimated position for the computation of the coordinates of the corner (point of intersection) of the error region is calculated. For the calculation of the increment, the following method is used.

The calculation method is now explained with reference to FIGS. 40 and 41.

Figure 40:
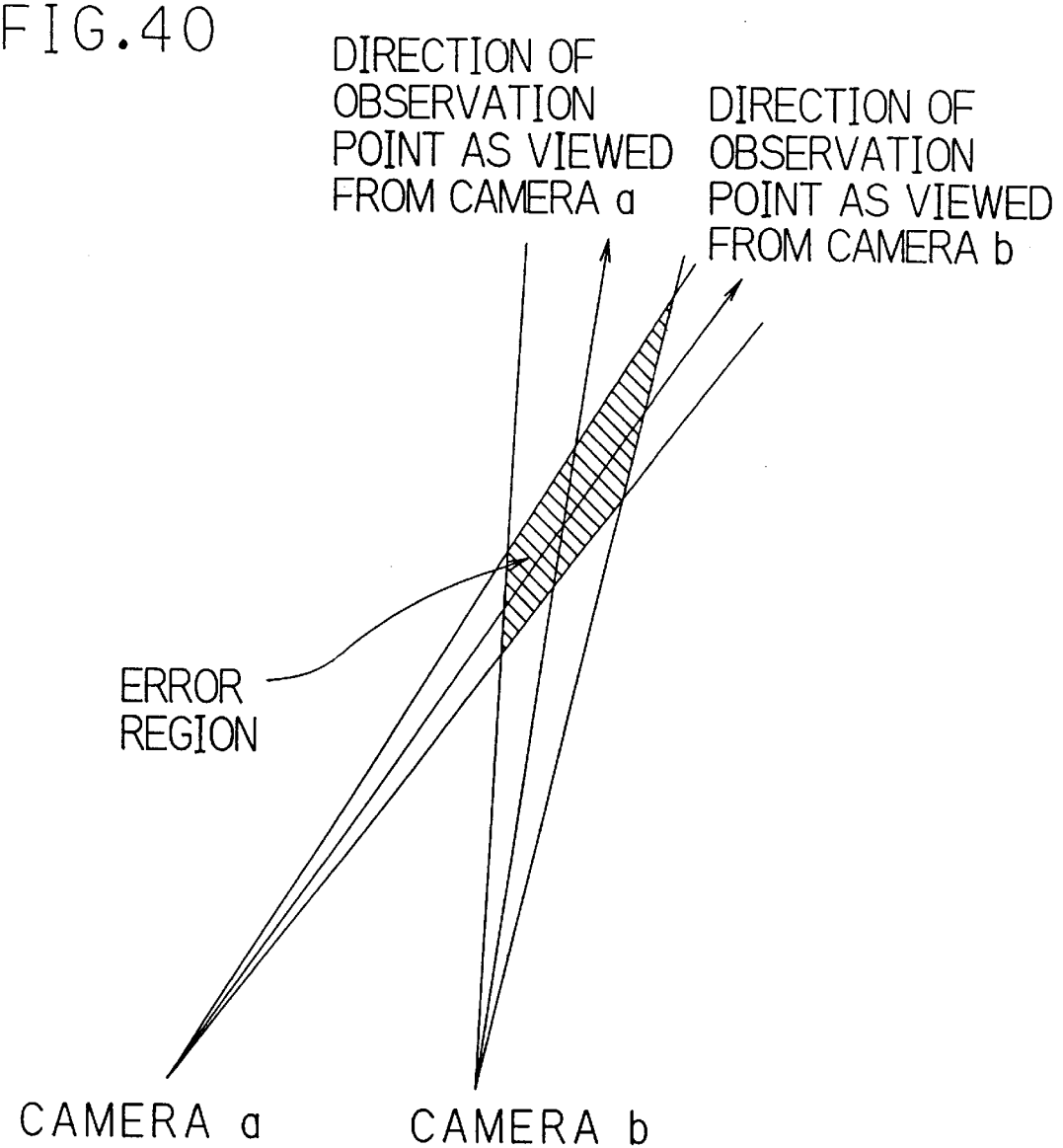
FIG. 40 is a diagram showing the error region in photographing with the two cameras.

FIG. 40 shows the state in which the cameras a and b are pointing to the observation point as viewed from the normal direction of the z-axis of the space coordinate system and the normal direction of the y-axis of the camera coordinate systems.

The coordinates on the images photographed by the cameras are determined in units of pixel. Therefore, the coordinate values on the picture contain errors of about 0.5 times the interpixel span.

As illustrated in FIG. 40, the pyramidal region corresponding to 0.5 times the interpixel span with the direction of the observation point as a center line is the error of estimated position corresponding to the error on the picture. Therefore, the estimated position as estimated by measurements with camera a and camera b is always accompanied by an error and, as shown by shading in FIG. 40, the region of this error is the overlap zone of the pyramidal regions of errors with camera a and camera b.

The amount of change in the coordinate values on the picture which correspond to 0.5 times the interpixel span is expressed as (dx, dy) and the amounts of change in the coordinate values in the camera a and b coordinate systems are expressed as (dx1, dy1) and (dx2, dy2), respectively. Now, dx1, dx2 are ±dx and dy1, dy2 are ±dy.

The amounts of change in L, X1 and X2 for dx1 and dx2 are expressed as dLx, dX1 and dX2, respectively, and the amounts of change in Y for dy1 and dy2 are expressed as dY1 and dY2, respectively. Then, the following equations hold.

$$dLx = \frac{-\left(\frac{x1}{f1} - \frac{x2}{f2}\right) - \frac{1 - x1 + x2}{f1}}{\left(\frac{x1}{f1} - \frac{x2}{f2}\right)^2} dx1 + \quad (5)$$

$$\frac{-\left(\frac{x1}{f1} - \frac{x2}{f2}\right) + \frac{1 - x1 + x2}{f2}}{\left(\frac{x1}{f1} - \frac{x2}{f2}\right)^2} dx2$$

$$dX1 = \frac{dLx}{f1} x1 + \left(1 + \frac{L}{f1}\right) dx1 \quad (6)$$

$$dX2 = \frac{dLx}{f2} x2 + \left(1 + \frac{L}{f2}\right) dx2 \quad (7)$$

$$dY1 = \left(1 + \frac{L + dLx}{f1}\right) dy1 \quad (8)$$

$$dY2 = \left(1 + \frac{L + dLx}{f2}\right) dy2 \quad (9)$$

For dx1=±dx, dx2=±dx, the amounts of change dX1, dX2, dLx are calculated by means of equations (5)–(7).

For dy1=±dy, dy2=±dy, the amounts of change dY1, dY2 are calculated by means of equations (8) and (9).

Figure 41:
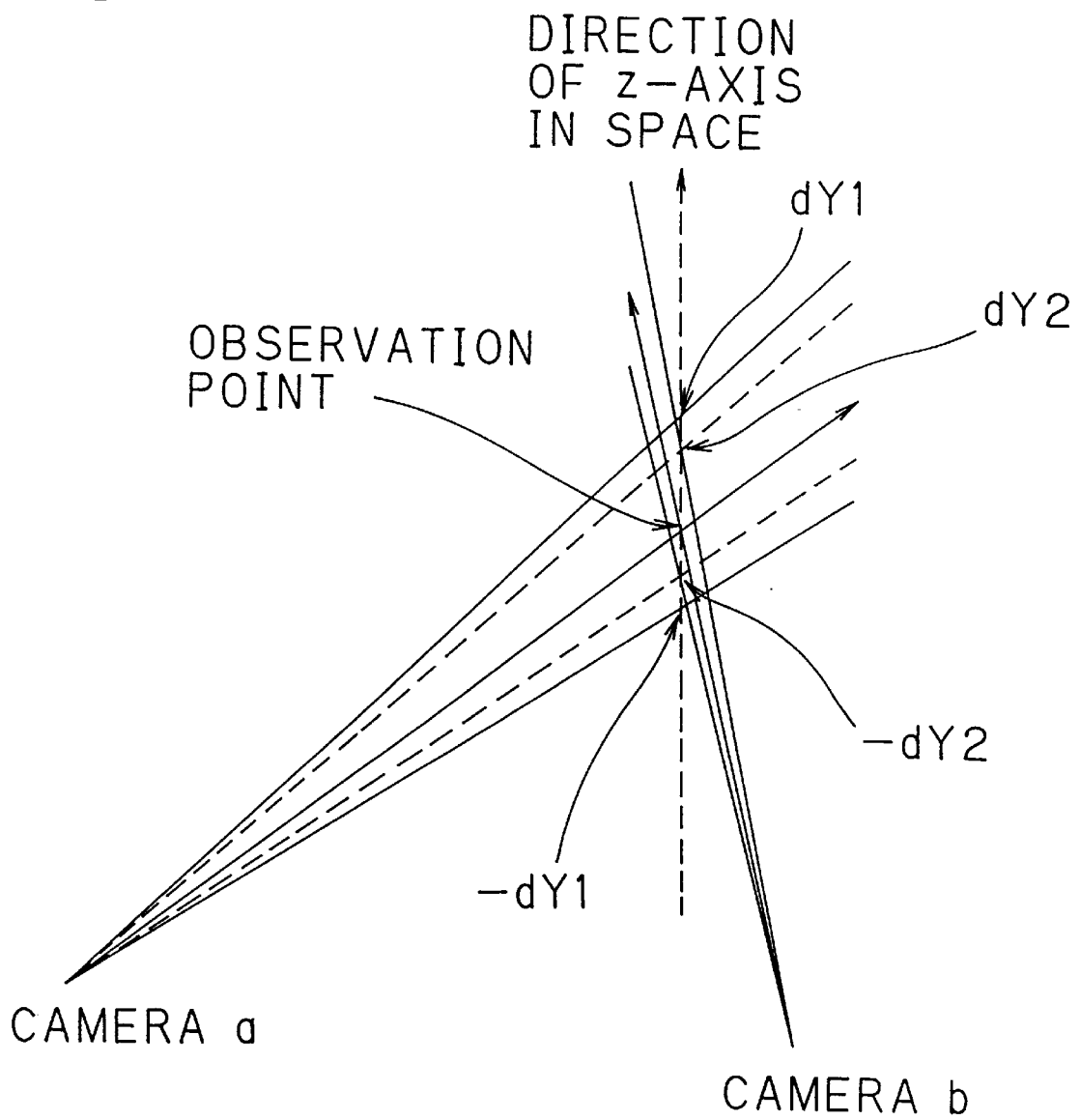
FIG. 41 is a diagram showing the z-axis increment corresponding to the amount of change in photographing with the two cameras.
Figure 42:
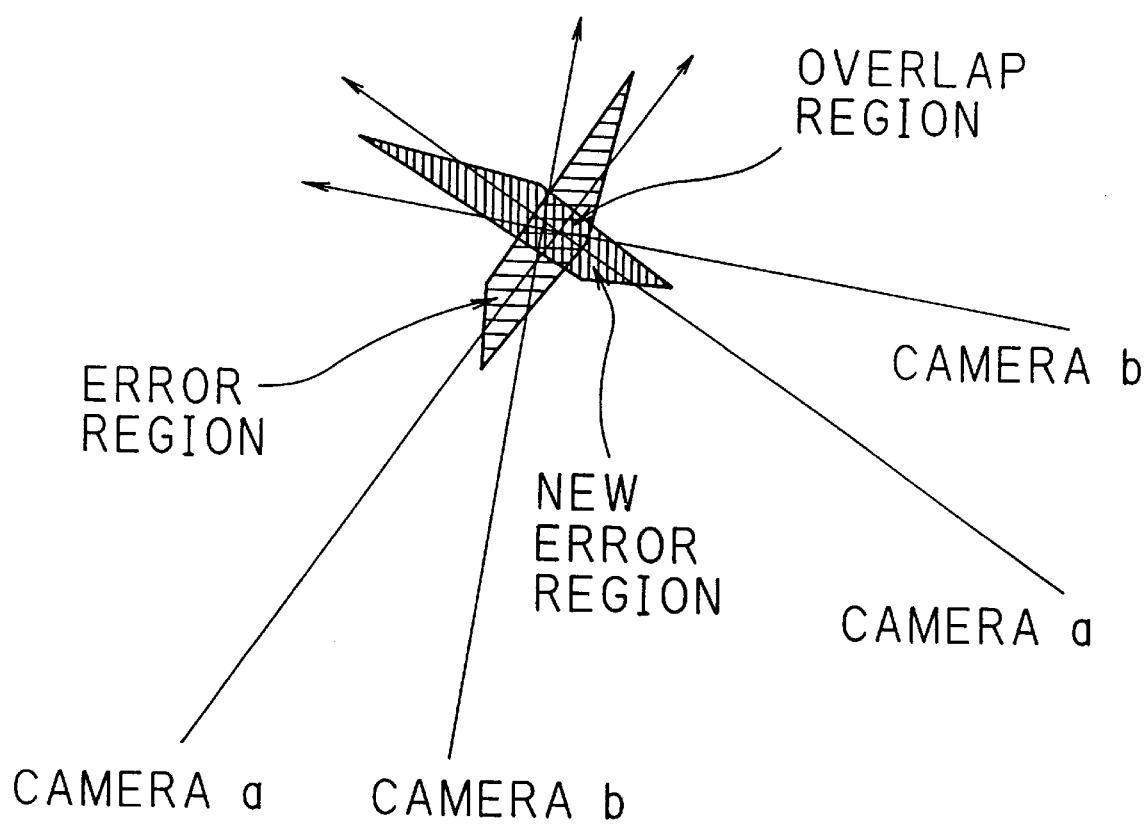
FIG. 42 is a diagram showing the overlap region between the error region and the new error region.

FIG. 41 shows the state of the pyramidal regions of error as viewed in the y-direction of the camera coordinate systems.

As illustrated in FIG. 41, there are two sets, positive and negative, of solutions of (dY1, dY2) for the same (dx1, dx2). Therefore, dY1 and dY2 are compared with each other for positive (dY1, dY2) and the smaller one is taken as the positive increment of the y coordinate. As it is the case shown in FIG. 41, for instance, where dY1>dY2, the positive increment of y coordinate is expressed as dY2. The negative increment is expressed as –dY2. For 4 sets of (dx1, dx2), there are positive and negative increments of y coordinate and these are taken as the increments of coordinate values for the vertices of the error region.

In step f4, the increment is added to the estimated position of observation point and the coordinates of vertices of the error region k are calculated.

In step f5, the error region memory 205 stores said coordinate values of vertices as the error region.
(Step e3)

Figure 34:
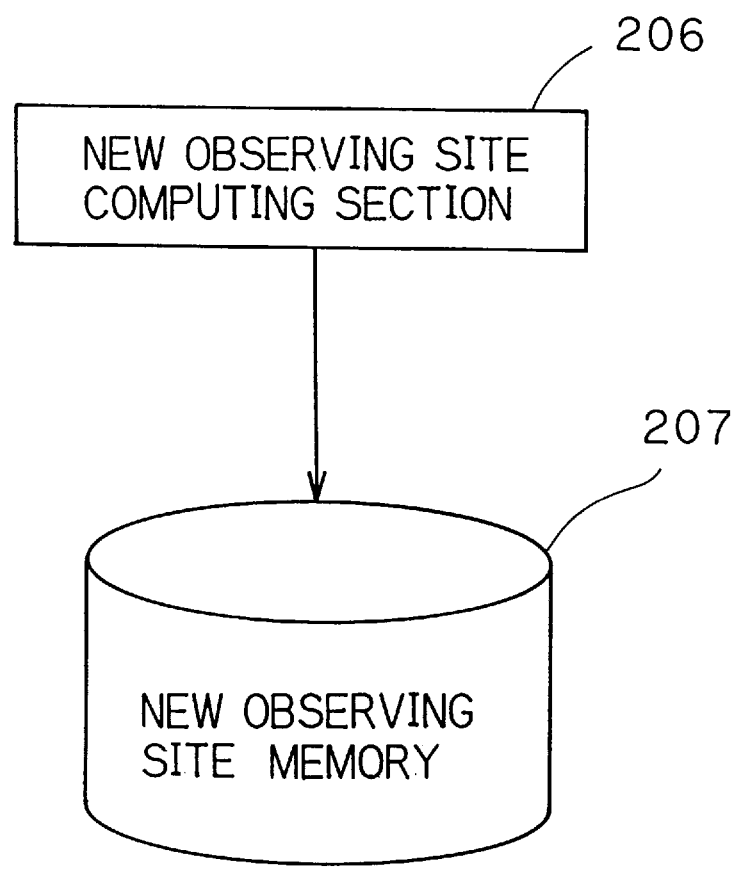
FIG. 34 is a block diagram of the observing site determining unit.
Figure 35:
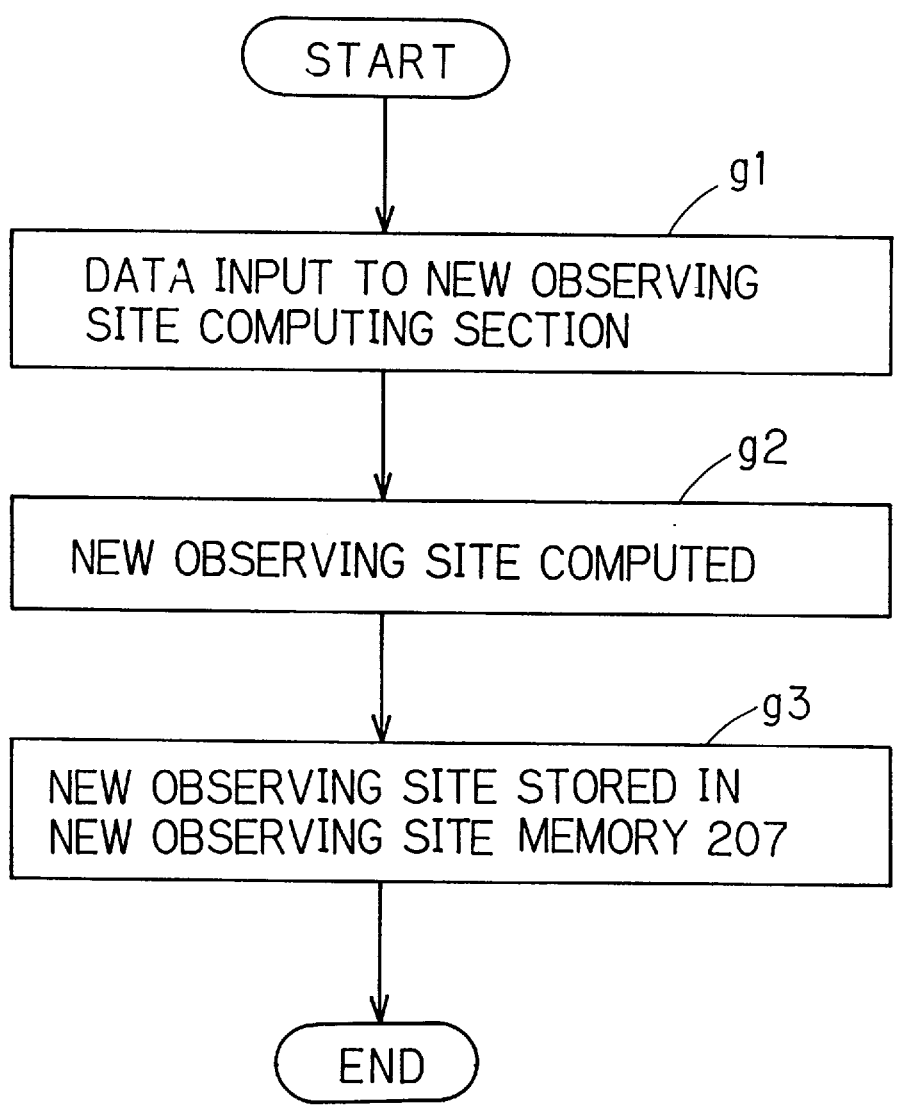
FIG. 35 is a flow diagram of the observing site determining unit.

FIG. 34 shows an exemplary architecture of the observing site determining section 201 and FIG. 35 is a flow chart of processing in 201. The observing site determining section 201 comprises a new observing site computing means 206 and a new observing site memory 207.

The operational state of this observing site determining section 201 is now described.

In step g1, either the estimated position or the error region are fed to the new observing site computing means 206.

In step g2, the new observing site computing means 206 calculates the coordinates of the new observing site.

As the calculation method, one of the following methods 1–8 is employed on the basis of FIG. 39. It should be understood that the position of the topological measuring device is the mid-point between P1 and P2 in FIG. 39, that the ground surface is used as a reference of horizontal surface, and that any plane parallel to the horizontal surface is called a parallel plane.

[Method 1]

(1) The distance between said estimated position and the modeling apparatus and the straight line passing through both are computed.

(2) The line of intersection of a plane perpendicular to said straight line (i.e. a plane in the normal direction of said straight line) with a parallel plane passing through said estimated position is computed.

(3) The coordinates of two points situated at equal distances to said distance from said estimated position on said line of intersection are computed.

(4) The distances of said two points from the modeling apparatus are computed.

(5) Of said two points, the point giving the smaller one of the two distances is selected and the coordinates of this points are taken as the coordinates of the new observing site.

[Method 2]

(1) The distance between said estimated position and the modeling apparatus and the straight line m passing through both are computed.

(2) Based on the coordinates of vertices of the error region, two straight lines including the respective diagonals are computed.

(3) For each of said straight lines, the angle with the straight line m is determined.

(4) Of the angles determined for each of the straight lines, the smaller value is compared between the straight lines and the straight line giving the smallest value is selected.

(5) The line of intersection between a plane perpendicular to said straight line with a parallel plane passing through the estimated position is computed.

(6) The coordinates of two points situated at distances equal to the distance from said estimated position on said line of intersection are computed.

(7) The distances of said two points to the modeling apparatus are computed.

(8) Of said two points, the point giving the smaller of said two distances is selected and the coordinates of this point are taken as the coordinates of the new observing site.

[Method 3]

(1) The distance between the estimated position and the modeling apparatus and the straight line m passing through both are computed.

(2) Based on the coordinates of vertices of the error region, two straight lines including the respective diagonals are computed.

(3) For each of said straight lines, its angle with said straight line m is computed.

(4) The said angles determined for the straight lines are compared between the straight lines and the straight line giving a value closest to 90° is selected.

(5) The coordinates of two points situated at distances equal to the distance from the estimated position on the straight line are computed.

(6) The distances of the two points from the modeling apparatus are computed.

(7) Of the two points, the point giving the smaller of the two distances is selected and the coordinates of this point are taken as the coordinates of the new observing site.

[Method 4]

(1) The distance between the estimated position and the modeling apparatus and the straight line m passing through both are computed.

(2) A point in said error region is subjected to principal component analysis and the first principal axis, second principal axis and third principal axis are computed.
(3) For each of the principal axes, its angle with the straight line m is computed.
(4) Of the angles determined for each of the principal axes, the smaller value is compared among the principal axes and the straight line giving the smallest value is selected.
(5) The line of intersection of a plane perpendicular to the straight line with a parallel plane passing through the estimated position is computed.
(6) The coordinates of two points situated at distances equal to the distance from said estimated position on the line of intersection are computed.
(7) The distances of the two points to the modeling apparatus are computed.
(8) Of the two points, the point giving the smaller of the two distances is selected and the coordinates of this point are taken as the coordinates of the new observing site.

[Method 5]
(1) The distance between said estimated position and the modeling apparatus and the straight line m passing through both are computed.
(2) A point in the error region is subjected to principal component analysis and the first principal axis, second principal axis and third principal axis are computed.
(3) For each of the principal axes, its angle with said straight line m is computed.
(4) Of the angles determined for each of the principal axes, the smaller value is compared among the principal axes and the straight line giving the smallest value is selected.
(5) Excluding the straight line, the principal axis with the smallest variance is selected from among said principal axes.
(6) The coordinates of two points situated at distances equal to the distance from said estimated position on the principal axis are computed.
(7) The distances of the two points to the modeling apparatus are computed.
(8) Of the two points, the point giving the smaller of the two distances is selected and the coordinates of this point are taken as the coordinates of the new observing site.

[Method 6]
(1) The distance between the estimated position and the modeling apparatus and the straight line m passing through both are computed.
(2) A point in the error region is subjected to principal component analysis and the first principal axis, second principal axis and third principal axis are computed.
(3) For each of the principal axes, its angle with said straight line m is computed.
(4) The angles determined for the principal axes are compared among said principal axes and the straight line giving a value closest to 90° is selected.
(5) The coordinates of two points situated at distances equal to said distance from the estimated position on said principal axis are computed.
(6) The distances of the two points to the modeling apparatus are computed.
(7) Of the two points, the point giving the smaller of the two distances is selected and the coordinates of this point are taken as the coordinates of the new observing site.

[Method 7]
(1) The distance between the estimated position and the modeling apparatus and the straight line m passing through both are computed.
(2) The straight lines interconnecting the observation point with o1 and o2 (FIG. 39), respectively, are computed.
(3) For each of the straight lines, its angle with said straight line m is determined.
(4) Of the angles determined for the respective straight lines, the smaller value is compared between said straight lines and the straight line giving the smallest value is selected.
(5) The line of intersection of a plane perpendicular to the straight line with a parallel plane passing through the estimated position is computed.
(6) The coordinates of two points situated at distances equal to the distance from said estimated position on said line of intersection are computed.
(7) The distances of the two points to the modeling apparatus are computed.
(8) Of the two points, the point giving the smaller of the two distances is selected and the coordinates of this point are taken as the coordinates of the new observing site.

[Method 8]
(1) The distance between the estimated position and the modeling apparatus and the straight line m passing through both are computed.
(2) The straight lines interconnecting the observation point with o1 and o2 (FIG. 39), respectively, are computed.
(3) For each of the straight lines, its angle with said straight line m is determined.
(4) The angles determined for the respective straight lines are compared between said straight lines and the straight line giving a value closest to 90° is selected.
(5) The coordinates of two points situated at distances equal to said distance from said estimated position on said straight line are computed. ps (6) The distances of the two points to the modeling apparatus are computed.
(7) Of the two points, the point giving the smaller of the two distances is selected and the coordinates of this point are taken as the coordinates of the new observing site.

The term 'principal component analysis' as used in the description of Methods 4, 5 and 6 has the following meaning.

The 3D coordinates of N points $P_i$ ($i=1, 2, \ldots N$) in the error region being expressed as $\vec{x}_i = (x_{i1}, \bar{x}_{i2}, \bar{x}_{i3})^T$, the mean vector $<\vec{x}> = \sum_{i=1}^{N} \vec{x}_i/N = (\bar{x}_{i1}, \bar{x}_{i2}, \bar{x}_{i3})^T$ is used to calculate the matrix $X' = (\vec{x}_1 - <\vec{x}>, \vec{x}_2 - <\vec{x}>, \ldots, \vec{x}_N - <\vec{x}>)$, covariance matrix $S = X'X'^T/N = [s_{ij}]$ ($i=1, 2, 3; j=1, 2, \ldots N$), and correlation matrix $R = [r_{ij}]$ ($r_{ij} = s_{ij}/\sqrt{s_{ii}s_{jj}}$: $i=1, 2, 3; j=1, 2, \ldots N$). The proper values and proper vectors of the correlation matrix are calculated and the straight lines having the directions shown by 3 proper vectors and passing through the mean vector are designated, in the descending order, as the first principal axis, the second principal axis and the third principal axis. The point in the error region which is used is a grid point of tesselation of the error region. Alternatively, it may be randomly selected so as to show a uniform distribution within the error region.

Referring back to the flow diagram of FIG. 35, the subsequent sequence is now described.

In step g3, the new observing site memory 207 stores the coordinates of the new observing site.

(Step e4)

Figure 36:
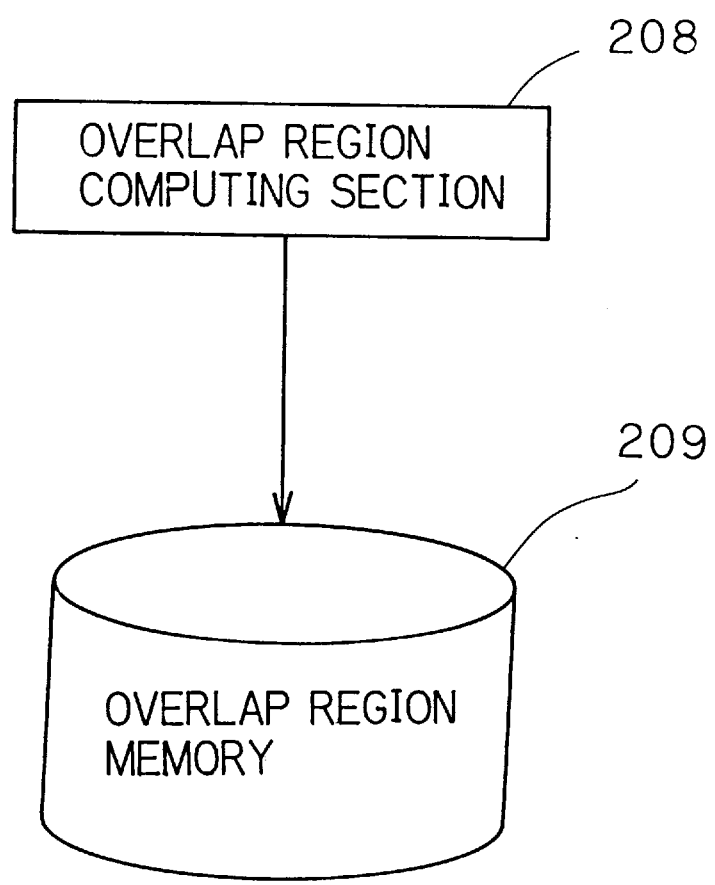
FIG. 36 is a block diagram of the overlap region determining unit.
Figure 37:
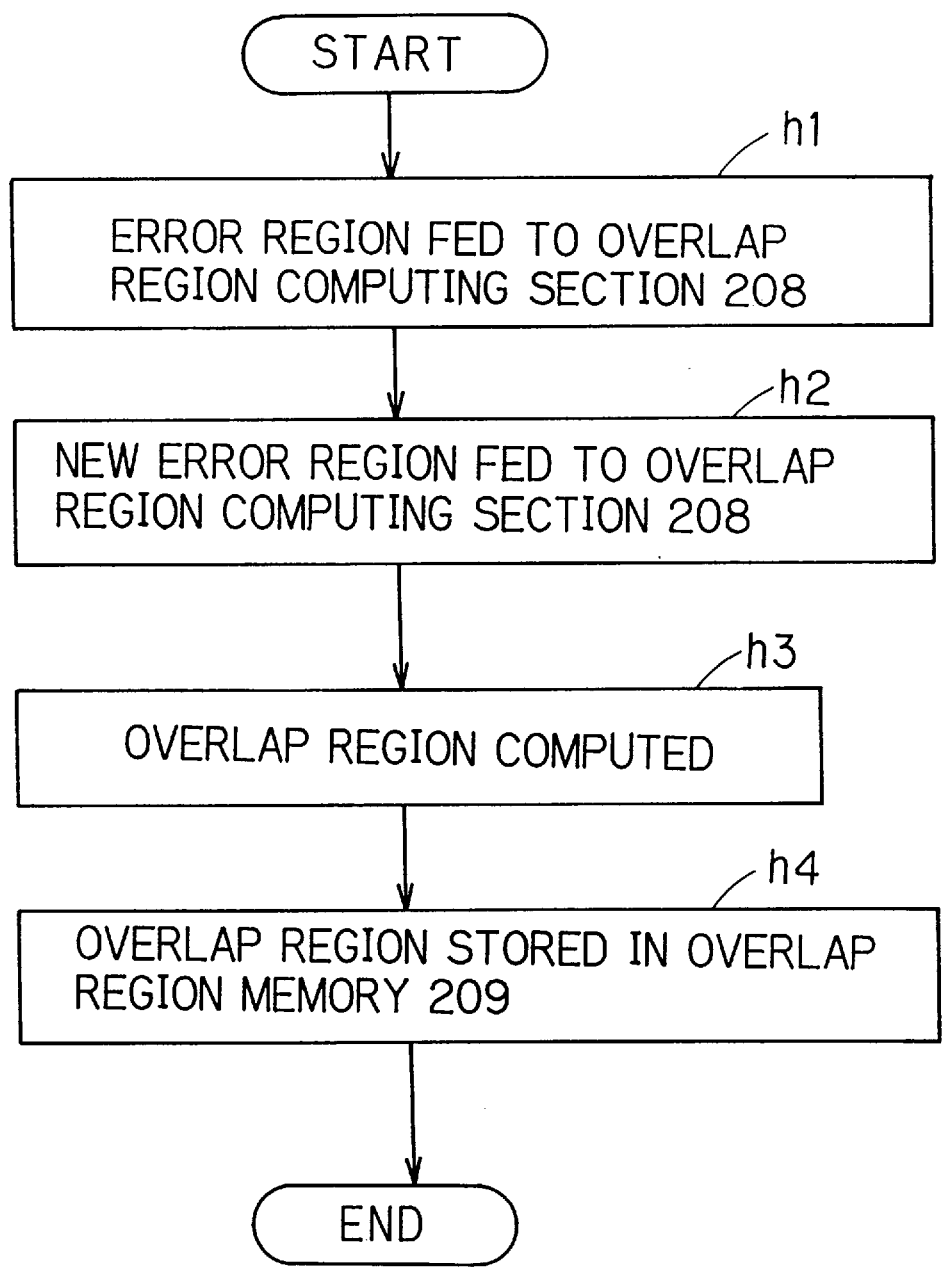
FIG. 37 is a flow diagram of the overlap region determining unit.

FIG. 36 shows an exemplary architecture of the overlap region determining section 202 and FIG. 37 is a flow diagram of its processing routine. This overlap region determining section 202 comprises and overlap region computing means 208 and an overlap region memory 209.

The operational state of this overlap region determining section 202 is now described. In the following description, the error region obtained by observation from the new observing site is referred to as the new error region.

In step h1, the coordinates of vertices of the error region are fed to the overlap region computing means 208.

In step h2, the coordinates of vertices of the new error region are fed to the overlap region computing means 208.

In step h3, the overlap zone between the error region and the new error region is computed. The method for this computation is explained with reference to FIG. 42.

The maximum and minimum values of the x coordinate of vertices of the error region and new error region are calculated and two planes perpendicular to the x-axis with points of their intersection with the x-axis coinciding with the maximum and minimum values are assumed. Similarly, using the maximum and minimum values of y- and z-coordinates, planes perpendicular to the y- and z-axes, respectively, are assumed. The domain S enclosed by these 6 planes contains the error region and new error region. The domain S is tesselated into grids parallel to the respective axes. The grid span is determined according to the required accuracy of distances. Values are assigned to the respective grid points according to the following procedure.
(1) To every grid point, the value of 0 is assigned.
(2) For each grid point, if included in the error region, 1 is added.
(3) For each grid point, when it is included in the new error region, the logical product of the value of the grid point and 1 is calculated and the result is taken as the value of the grid point.

As the result of this assignment, the value of 1 is assigned to grid points in the overlap region and the value of 0 is assigned to the other grid points.

In step h4, the overlap region memory 209 stores the coordinate values of grid points in said overlap region as the overlap region.

Figure 38:
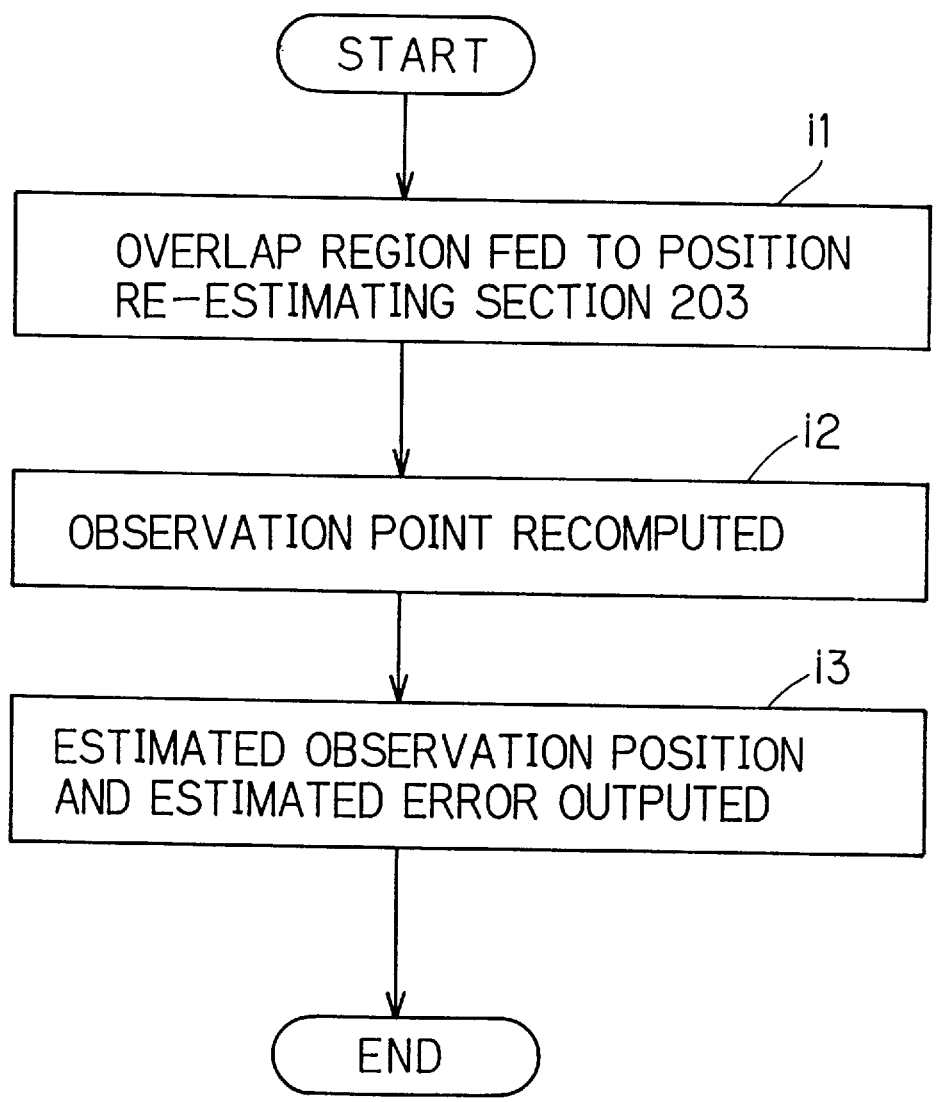
FIG. 38 is a flow diagram of the position-re-estimating unit.

(Step e5) Based on the flow diagram of FIG. 38, the operational state of the position reestimating section 203 is now described.

In step i1, the coordinate values of grid points in the overlap region are fed to the position reestimating section 203.

In step i2, the position of observation point is recalculated. The method for this recalculation comprises calculating the mean and mean square error for each coordinate of the coordinate values and using the results as the estimated position and estimated error of observation point.

In step i3, the estimated position and estimated error are outputted.

In the above manner, the estimated position of observing site and its estimated error can be ascertained.

It should be understood that while two observing sites are described for the above embodiment, this principle can be applied to 3 or more observing sites by repeating the sequence of step e1 to step e5 using the overlap region as the error region.

(Fourth Invention)

The modeling apparatus according to one embodiment of the fourth invention is now described with reference to FIG. 1 and FIGS. 43–52.

In this embodiment, an observation apparatus 251 equipped with two TV cameras 252, 254 and adapted to navigate on wheels on the flat floor constructs a environmental model within a cuboid space.

Figure 43:
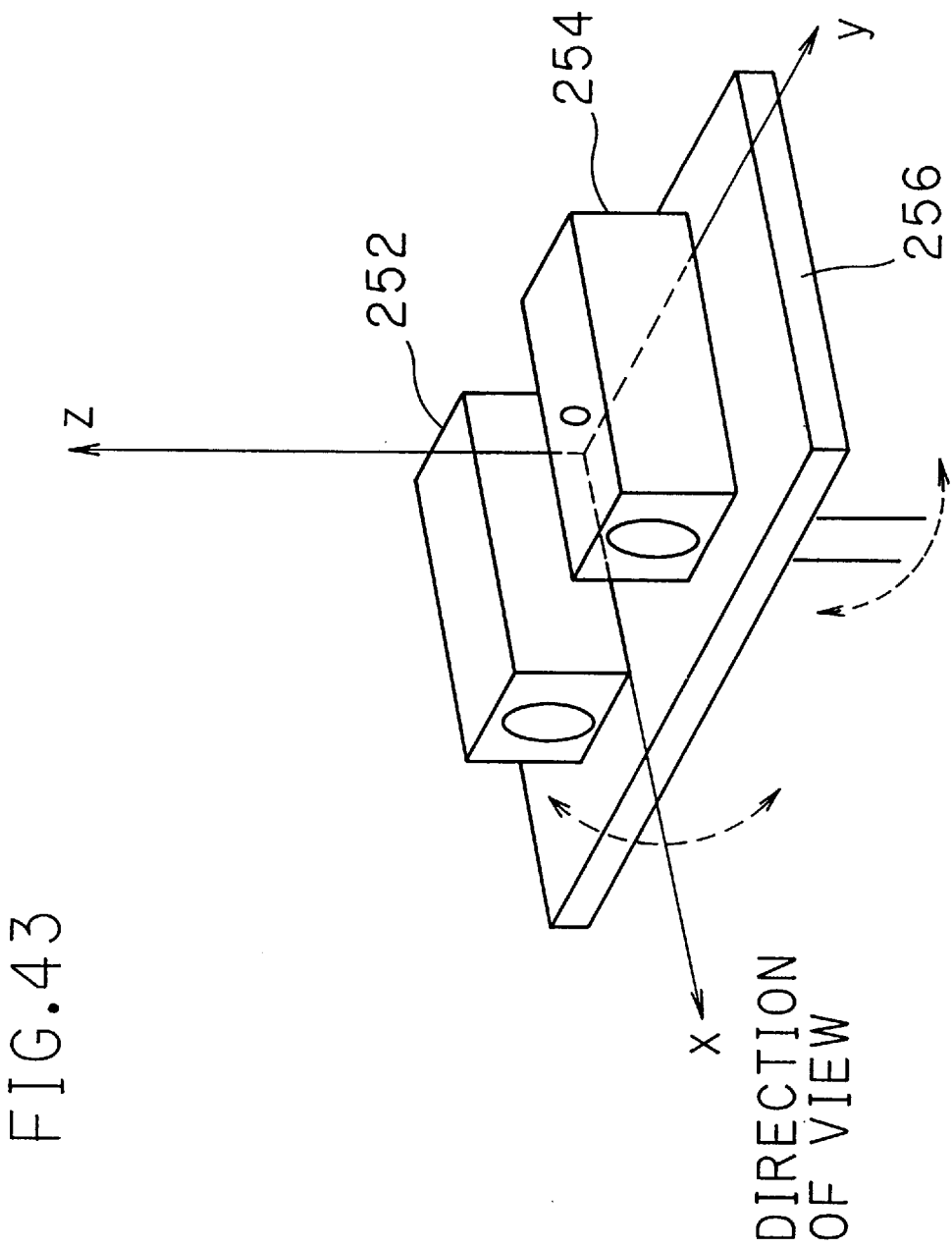
FIG. 43 is a diagram showing the direction of rotation of the camera swivel.

The directions of view of the TV cameras 252, 254 can be freely varied up and down or right and left by controlling a camera swivel 256 (FIG. 43). It is assumed that this camera swivel 256 can be controlled with high precision. The amount of movement of the observation apparatus 251 can be estimated from the information provided by an encoder attached to the wheel but it is assumed that this information includes a large error due to wheel slippage.

[Establishing the camera coordinate system and the world coordinate system]

Figure 44:
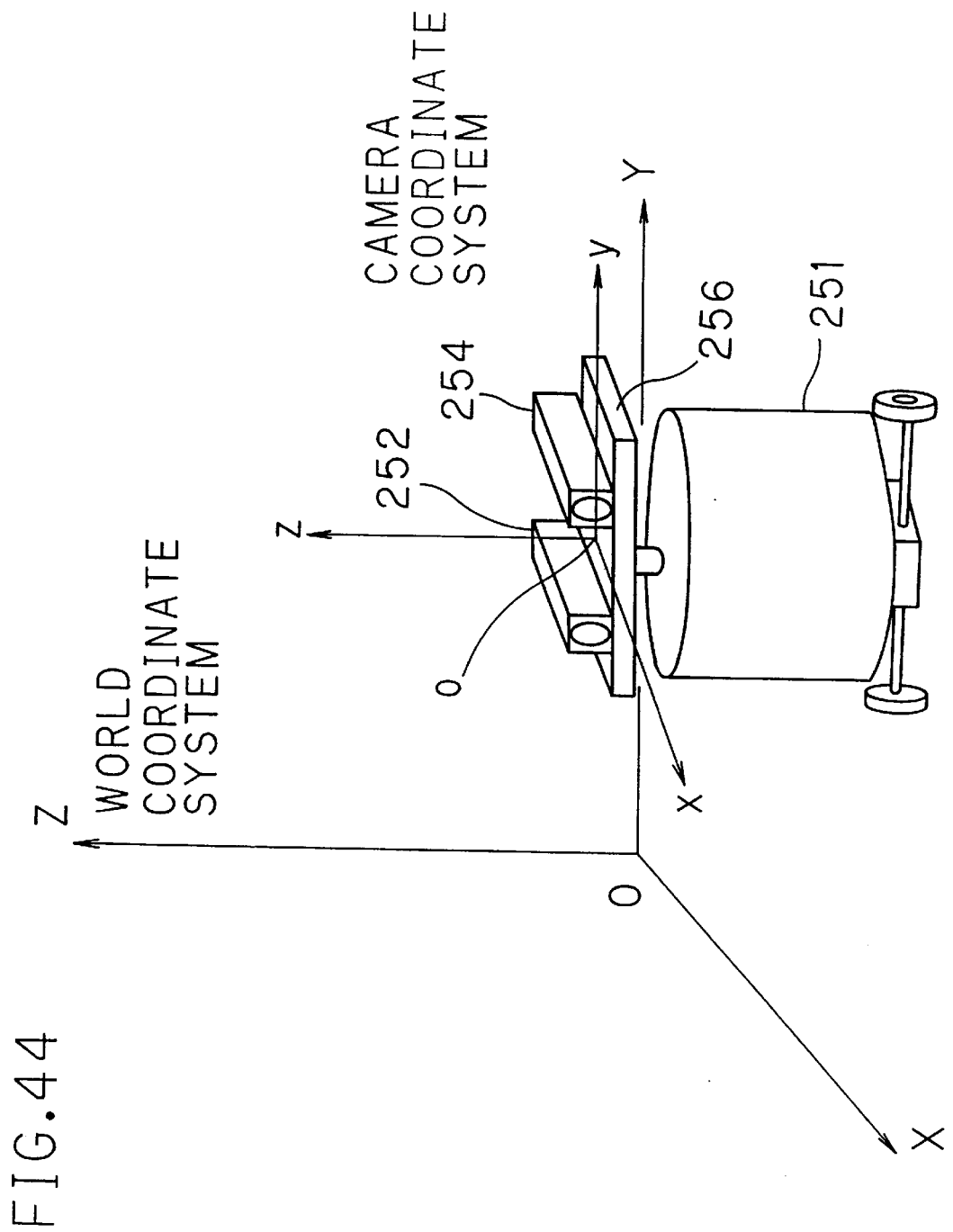
FIG. 44 is a diagram showing the relationship between the camera coordinate system and the world coordinate system.
Figure 45:
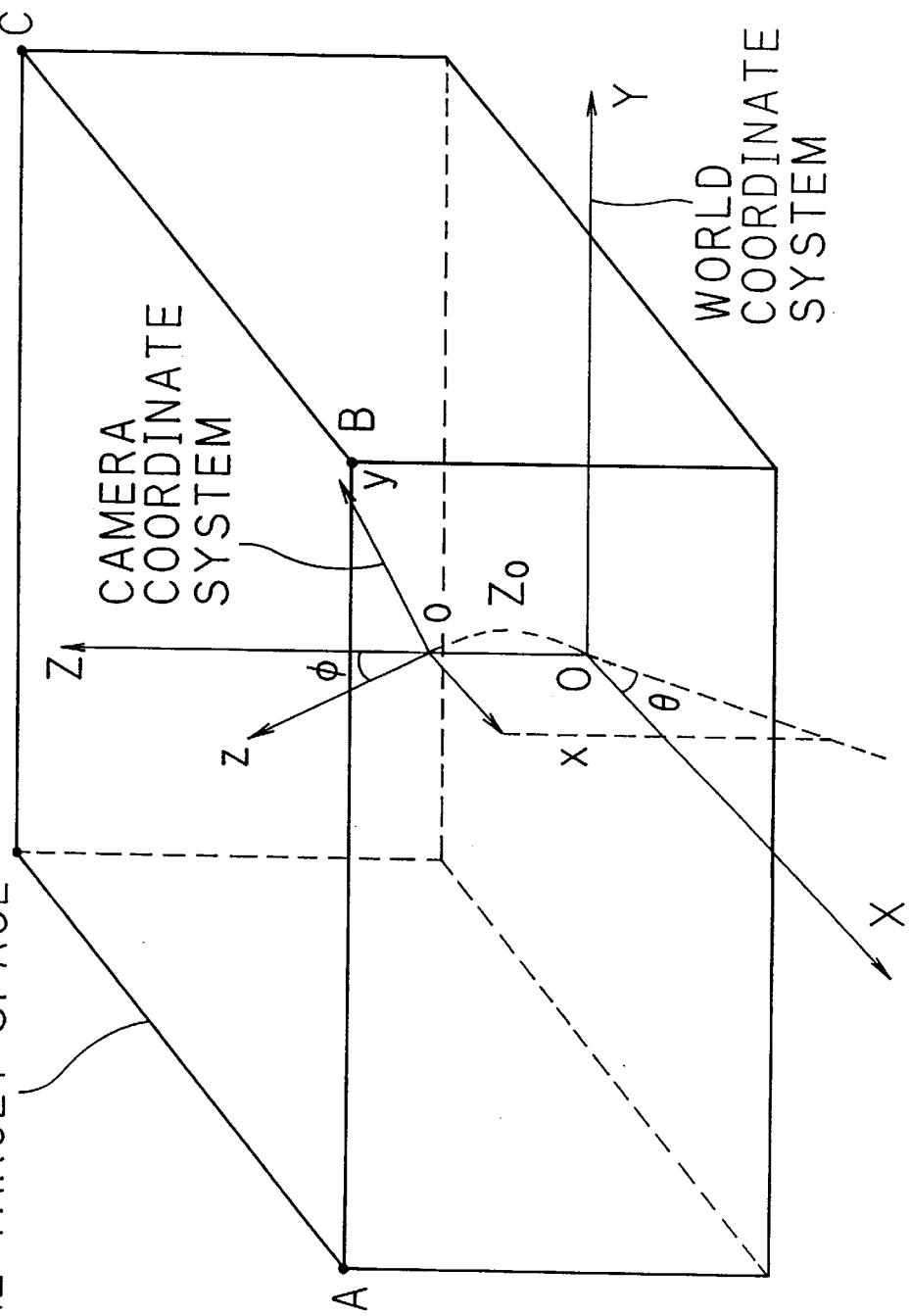
FIG. 45 is another diagram showing the relationship between the camera coordinate system and the world coordinate system.

In the following description, the coordinate system centered around the visual point is referred to as the camera coordinate system and the coordinate system established within a subject space and not dependent on the position of visual point is referred to as the world coordinate system. The camera coordinate system and the world coordinate system are established as illustrated in FIGS. 44 and 45. The procedures for their establishment are now described in detail.

The world coordinate system (O-XYZ) is established as follows.

The initial position of the observation apparatus 251 is used as the origin.

The flat floor surface is expressed as the XY plane.

The initial direction of view of the observation apparatus 251 is expressed as X-axis.

On the other hand, the camera coordinate system (o-xyz) is established as follows.

The center of the focal points of the two TV cameras 252, 254 is used as the origin.

The plane where the optical axes of the two TV cameras 252, 254 are located is expressed as xy plane.

The direction of view of the two TV cameras 252, 254 is expressed as x-axis.

It is assumed that the optical axes of the two TV cameras 252, 254 are parallel to each other.

The origin of the camera coordinate system is expressed as (0, 0, Z0) in the world coordinate system and the angle (azimuth) between x-axis and X-axis is expressed as $\theta$, while the angle (angle of elevation) between z-axis and Z-axis is expressed as $\phi$. Therefore, a transformation from the camera coordinate system to the world coordinate system can be expressed by the following equations (10), (11) and (12).

$$X = x\cos\theta - y\sin\theta \tag{10}$$

$$Y = x\cos\phi\sin\theta + y\cos\phi\cos\theta + z\sin\phi \tag{11}$$

$$Z = Z_0 - x\sin\phi\sin\theta - y\sin\phi\cos\theta + z\cos\phi \tag{12}$$

[Global construction]

The gross architecture of the modeling apparatus according to this embodiment is identical with that of the first invention and comprises a 3D attribute information input unit 1, a environmental model processing unit 2, a picture composing unit 3, an analyzing unit 4, and an observation control unit 5.

The 3D information input unit 1 measures 3D information, such as range, configuration, surface pattern and reflectance, etc., using visual sensors such as stereoview TV cameras 252, 254, ultrasonic and other sensors to input the 3D information.

The environmental model processing unit 2 manages the input 3D information and prepares an environmental model description. Thus, it manages the 3D information input in the camera coordinate system and prepares a environmental model description. when the observation system has moved, it becomes necessary to calculate the observation position and direction. This is done by generating gross estimates from encoder information and correcting them by collation with the 3D information input from the 3D information input unit 1 and the outline 3D information accumulated in the environmental model processing unit 2. By this procedure, the exact observation position and direction are computed.

The picture composing section 3 composes an artificial picture of the environment based on the model description stored in the environmental model processing unit 2.

The analyzing unit 4 validates the environmental model description by comparing the result of composition of an artificial picture with the camera view in the current position.

The observation control unit 5 controls the observation system so that after input of the outline 3D information on the 3D information input control target space the system will make an observation of the internal region of the target space.

Figure 46:
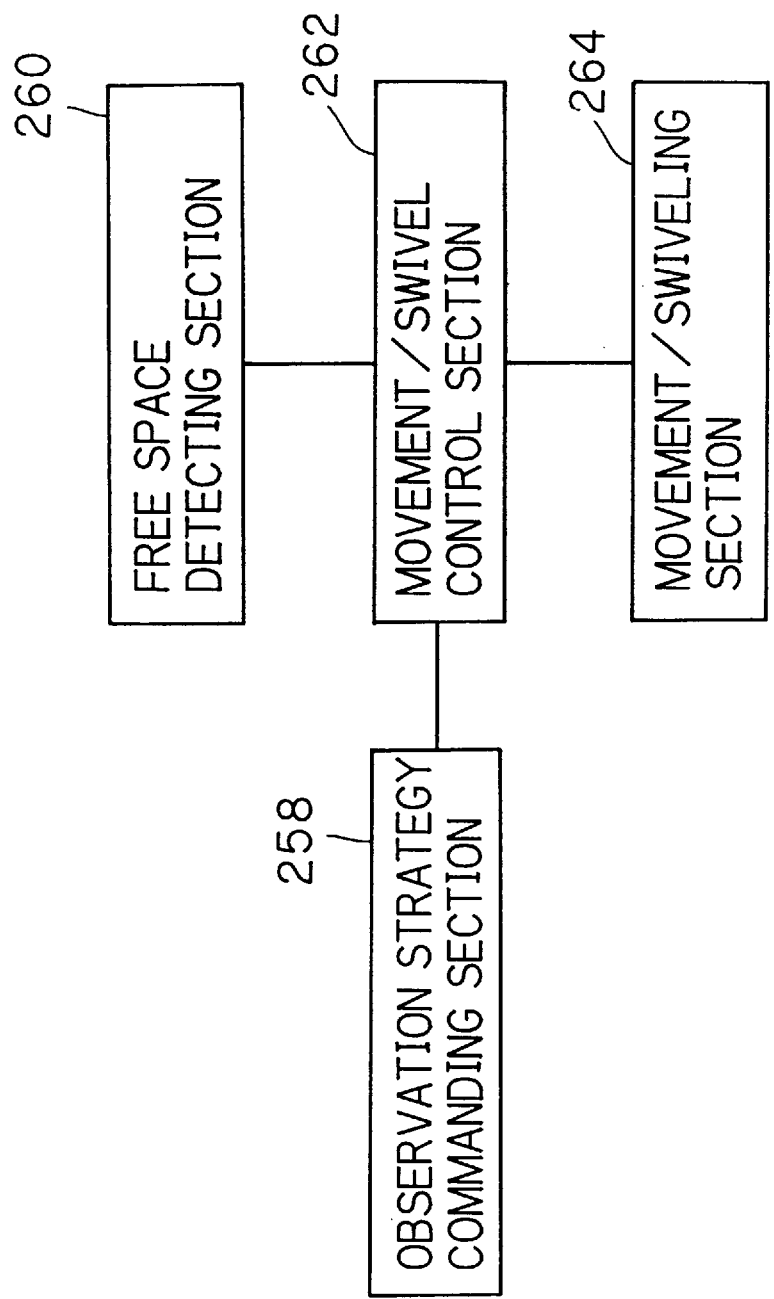
FIG. 46 is a block diagram of the observation control unit of the fourth invention.

FIG. 46 shows an exemplary architecture of the observation control unit 5, which comprises an observation strategy commanding section 258, a free space detecting section 260, a movement/swivel control section 262 and a movement/swiveling section 264.

The movement/swiveling section 264 moves the observation apparatus 251 and rotates the camera swivel 256 and its actions are controlled by the movement/swivel control section 262.

The observation strategy commanding section 258 transmits, upon completion of observation of the outline of the target space, a command to observe the internal zone of the target space to the navigation/swivel control section 262. Thus, the total observation of the target space consists of a stage of observing the outline of the target space and a stage of observing the interior zone of the target space.

The observation procedures in the respective stages are now described in detail.

Figure 47:
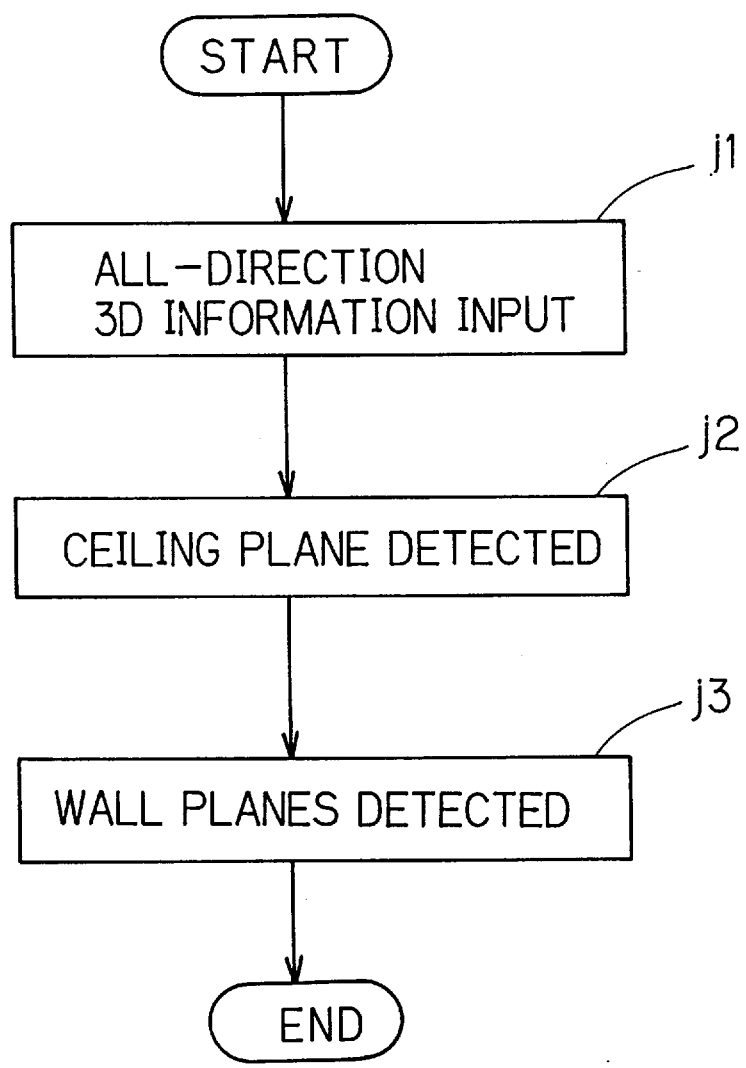
FIG. 47 is a flow diagram of outline observation.

FIG. 47 shows a processing flow for the outline observation method. The respective steps involved are now described.

(Step j1)

Locating the observation apparatus 251 near the center of a target space and rotating the camera swivel 256 through one full turn at a certain pitch, $\Delta\theta$, the 3D information in all directions from one point of view is input. The 3D information obtained in every direction in the camera coordinate system is transformed into the world coordinate system.

(Step j2)

The equation for the flat ceiling surface is computed.

The ceiling surface is parallel to the floor surface, i.e. XY plane. Therefore, if the measurement error is disregarded, the plane passing through the point of maximal Z-coordinate in the world coordinate system and parallel to XY plane can be taken as the ceiling surface. However, taking the measurement error into consideration, among the planes having a number of characteristic points (points where range data could be obtained by stereo view) over a certain threshold and perpendicular to the Z-axis, the plane with the maximal Z-coordinate is used as the ceiling plane.

(Step j3)

The equation for wall planes is computed.

The rectangle enclosing all characteristic points on the ceiling plane is calculated by Hough transform. The four planes passing through the corresponding sides of the quadrangle and perpendicular to the ceiling plane are taken as wall planes.

The outline observation of the target space ends upon detection of the wall planes.

[Internal observation]

Then, using the outline model input by the above outline observation, the interior of the target space is serially observed while the observation position and direction are checked.

Figure 48:
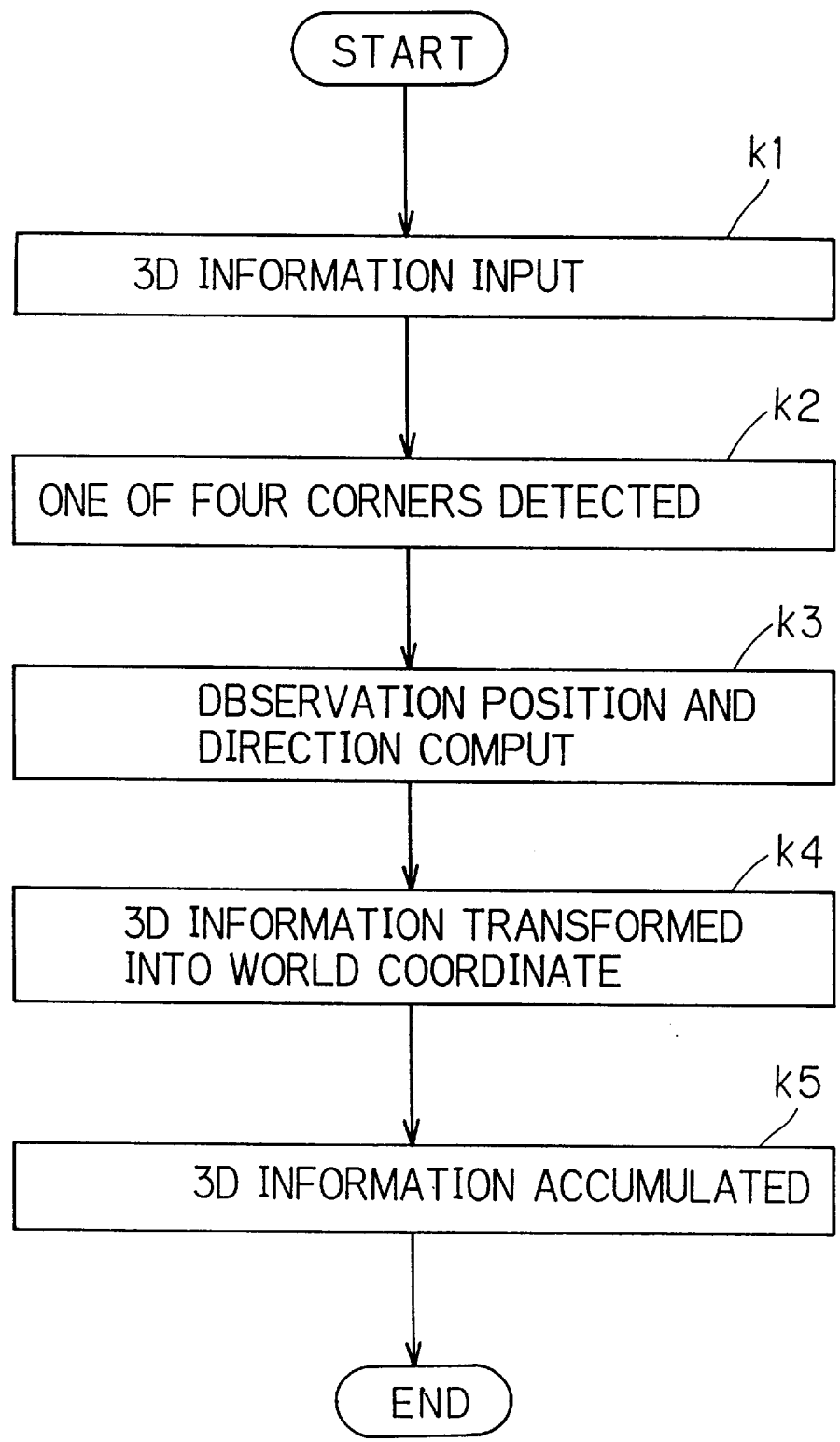
FIG. 48 is a flow diagram of internal observation.
Figure 49:
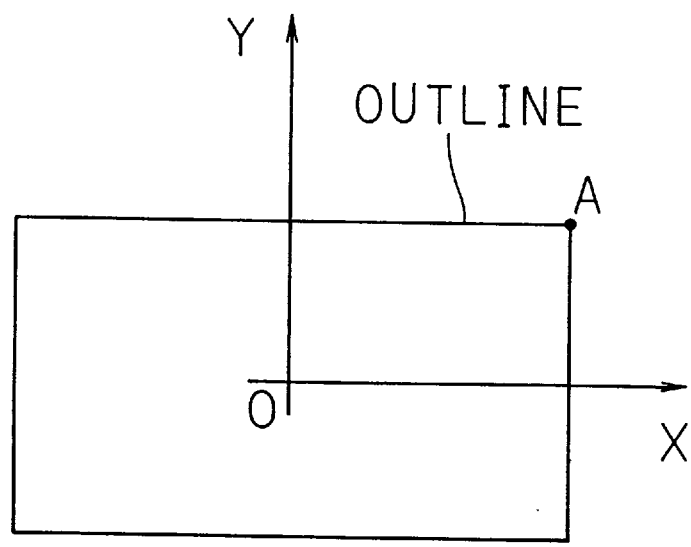
FIG. 49 is a diagram describing the method for detecting the observation position/direction and showing the outer frame structure obtained by outline observation.

FIG. 48 shows a processing flow for this internal observation method at each visual point. The respective steps involved are explained below.

(Step k1)

By means of the free space detecting section 260, the surrounding free space is detected and this is done by changing the position of visual point.

(Step k2)

From the 3D information observed in the camera coordinate system, one of the four corners of the outline (the points A, B, C and D and the 3 planes meeting at each of the points in FIG. 45) is detected and while the observation position and direction are checked from the resultant information, the internal domain of the target space is observed.

Thus, the free space around the observation apparatus 251 is first detected. Then, the apparatus is moved to change the observation position and the 3D information is input in the camera coordinate system. Thereafter, an optional one of the four corner points A, B, C and D of the outline is searched. Two straight lines lying on the ceiling plane and intersecting with each other at right angles in the 3D space are detected. The point of intersection of two straight lines with the distance between the point of intersection and the visual point being maximal is the vertex of the corner.

(Step k3)

Once one of the 4 corners of the outline is detected, the point of view and its direction can be calculated from the position and direction of the corner. Assuming that the observation apparatus 251 moves on XY plane and the angle of elevation φ can be set with high precision by exact control of the camera swivel 256, the influence of an error due to the movement is on the observation position (X0, Y0) and azimuth θ on XY plane. Therefore, all that is necessary is to accurately determine these 3 parameters using the outline information. The procedures for calculation are described below.

(1) A two-dimensional plane obtainable by projecting the 3D space on XY plane is now considered. It is assumed that the outline shown in FIG. 49 was obtained by outline observation.

Figure 50:
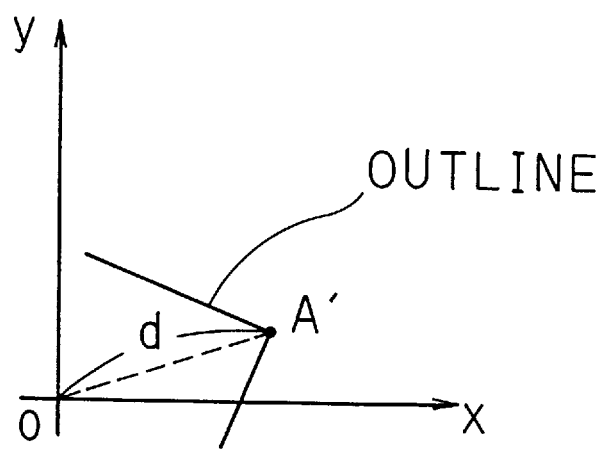
FIG. 50 is a diagram describing the method for detecting the observation position/direction and showing the frame structure obtained by internal observation.

(2) It is also assumed that the 3D information in the camera coordinate system as shown in FIG. 50 was obtained by internal observation.

Figure 51:
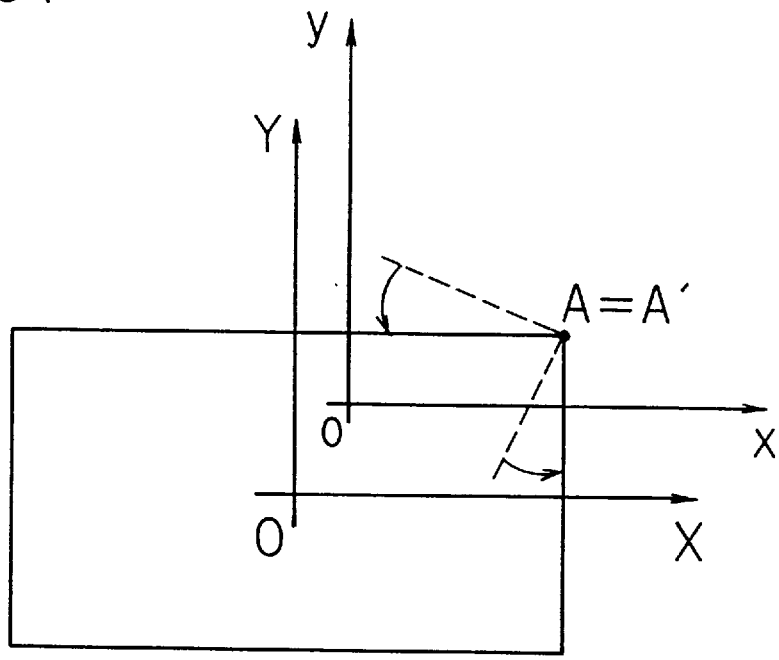
FIG. 51 is a diagram describing the method for detecting the observation position/direction and showing the superimposition of frames.

(3) As illustrated in FIG. 51, the points of intersection A and A' of two wall planes are overlapped and, then, the two wall planes are overlapped by rotating about point A.

Figure 52:
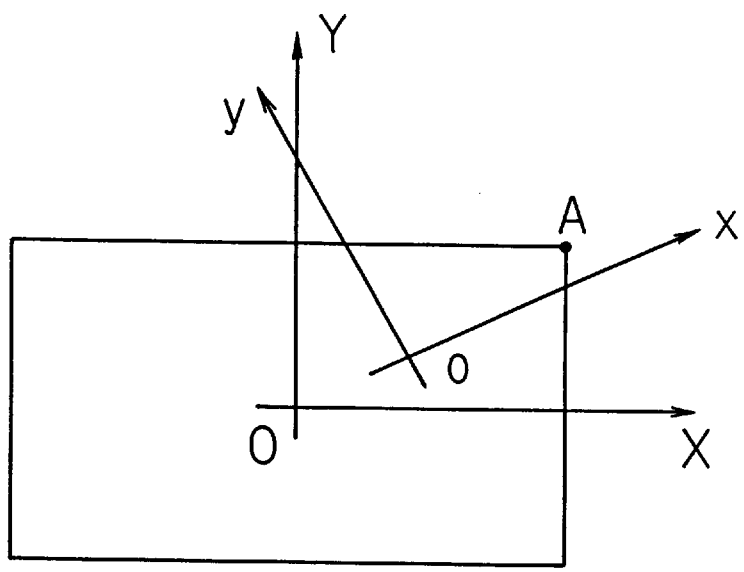
FIG. 52 is a diagram of the method for detecting the observation position/direction, showing the result of computation.

(4) Then, as shown in FIG. 52, the position of visual point and the direction of view can be obtained using the outline model with high precision.

It is assumed, here, that it is already known which of the 4 corners of the outline is the vertex observed from a given visual point from encoder information.

However, depending on the position and direction of view, the following situations may be encountered. (a) Although the vertex was detected, the distance involved is long.

In this case, the position of visual point and the direction of view can be calculated. However, since the distance to the vertex is long, the range computation error is large. Therefore, the observation position and direction of view cannot be computed using this vertex.

(b) No vertex can be detected.

In this case, the position of visual point and the direction of view cannot be computed from the input information.

In the cases of (a) and (b), the camera swivel 256 is rotated in a given direction by angular units of Δθ to vary the direction of view, and using 3D information, the vertices of four corners such that the distance to the vertex is not greater than a certain value d0 are searched.

(Step k4)

Using the computed position of visual point and direction of view, a transformation from the camera coordinate system to the world coordinate system is performed by means of equations (10), (11) and (12).

(Step k5)

By repeating the above processing series of free space detection around the observation apparatus 251 and observation from varied visual points, a sequentially detailed environmental model can be obtained.

Thus, with the present apparatus, interior environmental model can be input with high precision.

It should be understood that while the stereo image measurement technique is used in this embodiment for input of range information in the 3D information input unit 1, the same result can be obtained by using other range measuring techniques such as pattern light projection, range finder method, and so on.

(Fifth Invention)

The modeling apparatus according to one embodiment of the fifth invention is now described with reference to FIGS. 53–68.

The term 'model' as used in connection with this invention means a set of polygonal small planes for expressing the shape of an object plus the color, pattern and other attributes of the small planes. It is also assumed that the picture has been obtained by photographing beforehand.

Figure 53:
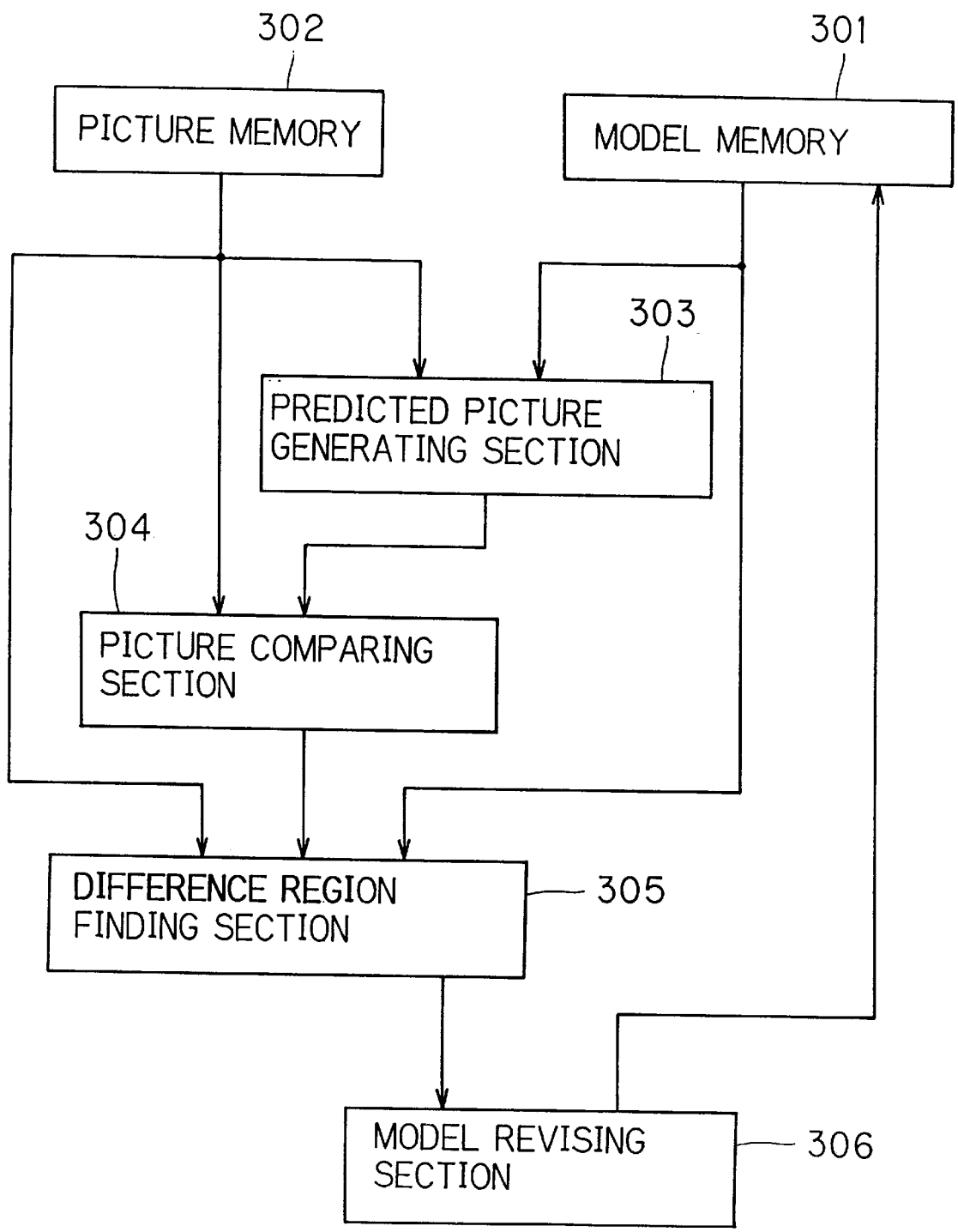
FIG. 53 is a block diagram of the modeling apparatus according to the fifth invention.

FIG. 53 shows an exemplary architecture of the modeling apparatus according to this invention. This apparatus comprises a model memory 301, a picture memory 302, a predicted picture generating section 303, a picture comparing section 304, a difference region finding section 305, and a model revising section 306.

Figure 54:
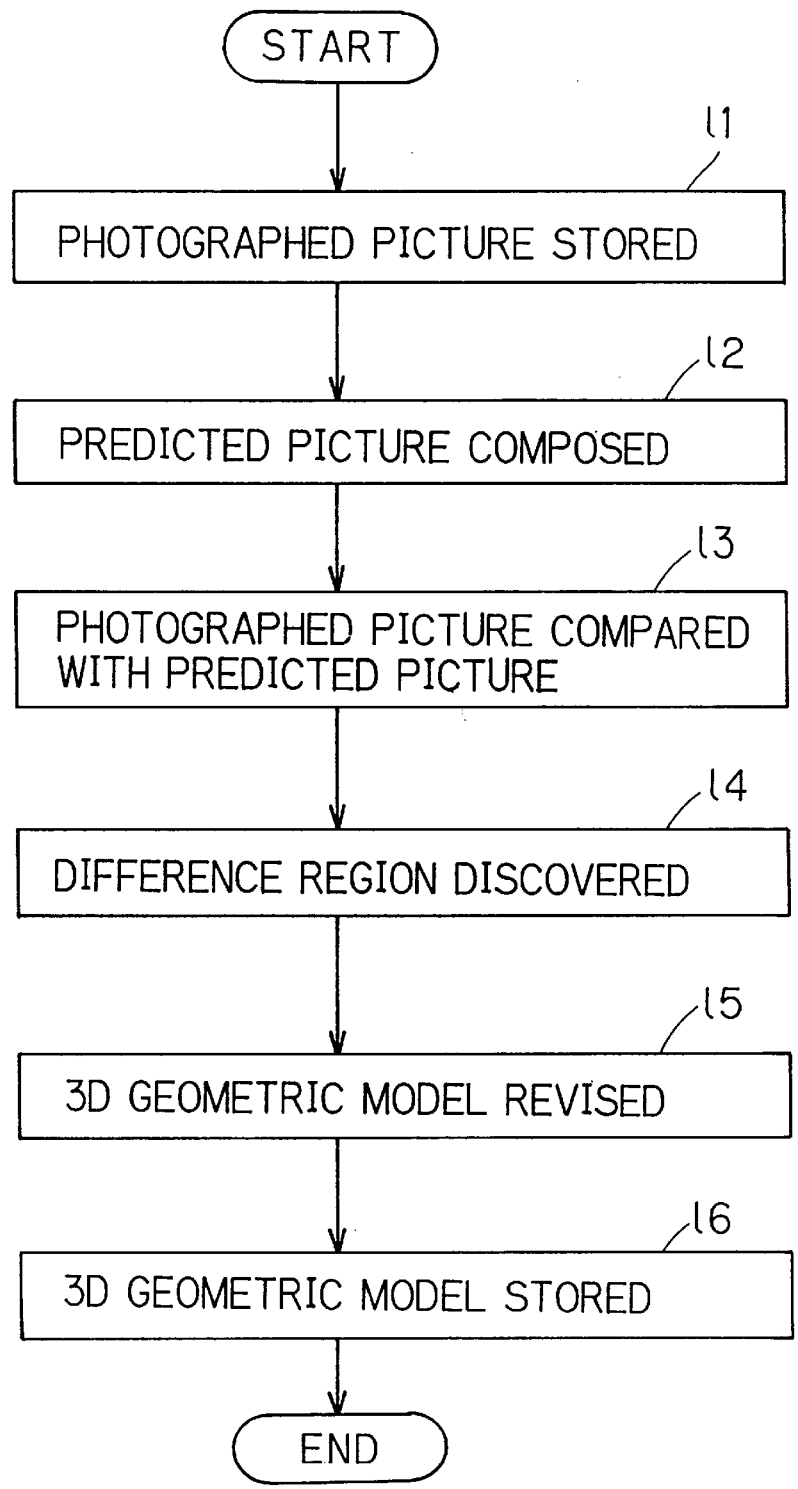
FIG. 54 is a flow diagram of the modeling apparatus according to the fifth invention.

FIG. 54 is a flow diagram of processing in this apparatus.

In step l1, the picture memory 302 stores the actual picture taken of a modeled object from a certain visual point. The stored picture is hereinafter referred to as the photographed picture.

In step l2, the predicted picture generating section 303 generates a picture which should have been viewed by the camera provided the model be correct. This generated picture is hereinafter referred to as the predicted picture.

In step l3, the picture comparing section 304 compares the photographed picture with the predicted picture.

In step l4, the difference region finding section 305 finds a difference region between the two pictures on the basis of comparison by the picture comparing section.

In step l5, the model revising section 306 revises the corresponding model.

In step l6, the model memory 301 stores the model as revised.

The constructions and operations of the respective components are now described.

The model memory 301 stores the model expressed as follows.

The surface of an object existing in a space is divided into small units of plane and a description of the position and surface attributes of this object on a small plane basis is used as the model of the above object.

In this embodiment, the small plane is a triangle and the model stored in the model memory 301 comprises the 3D coordinate values of vertices of each triangle and the attributes, such as color and pattern, of each small plane.

As to the attributes, the picture actually taken may be pasted on a small plane basis or only the feature information such as color and pattern data may be extracted and maintained as attributes.

The picture memory 302 memorizes the picture actually taken with a camera or the like, the coordinates of visual point and the direction of view.

Figure 55:
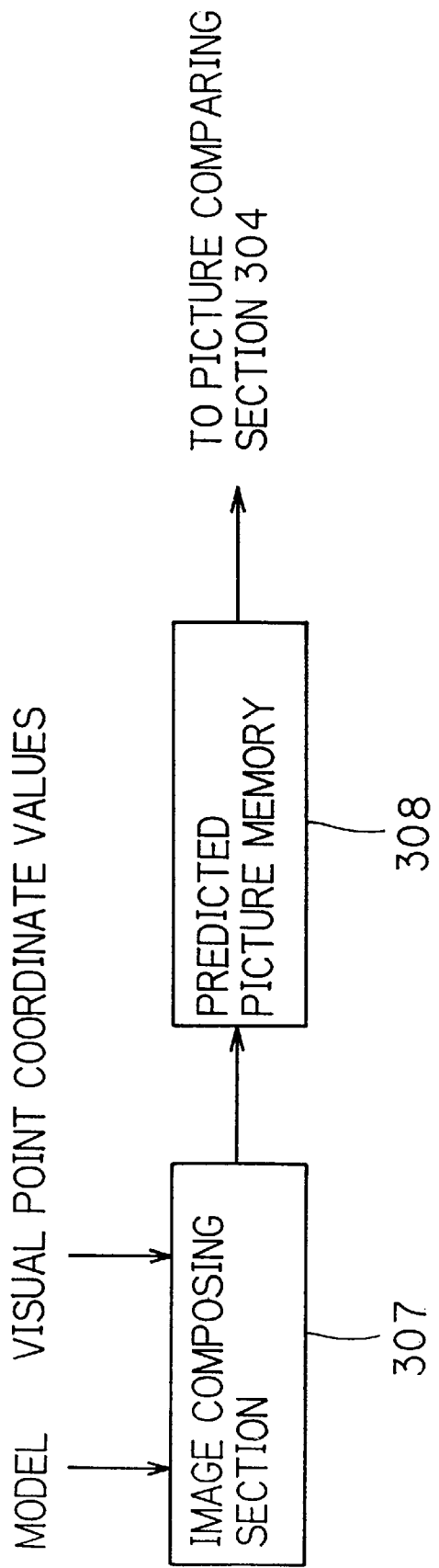
FIG. 55 is a block diagram of the predicted picture generating unit.

FIG. 55 shows the construction of the predicted picture generating section 303. The predicted picture generating section 303 comprises a picture composing means 307 and a predicted picture memory 308.

Figure 56:
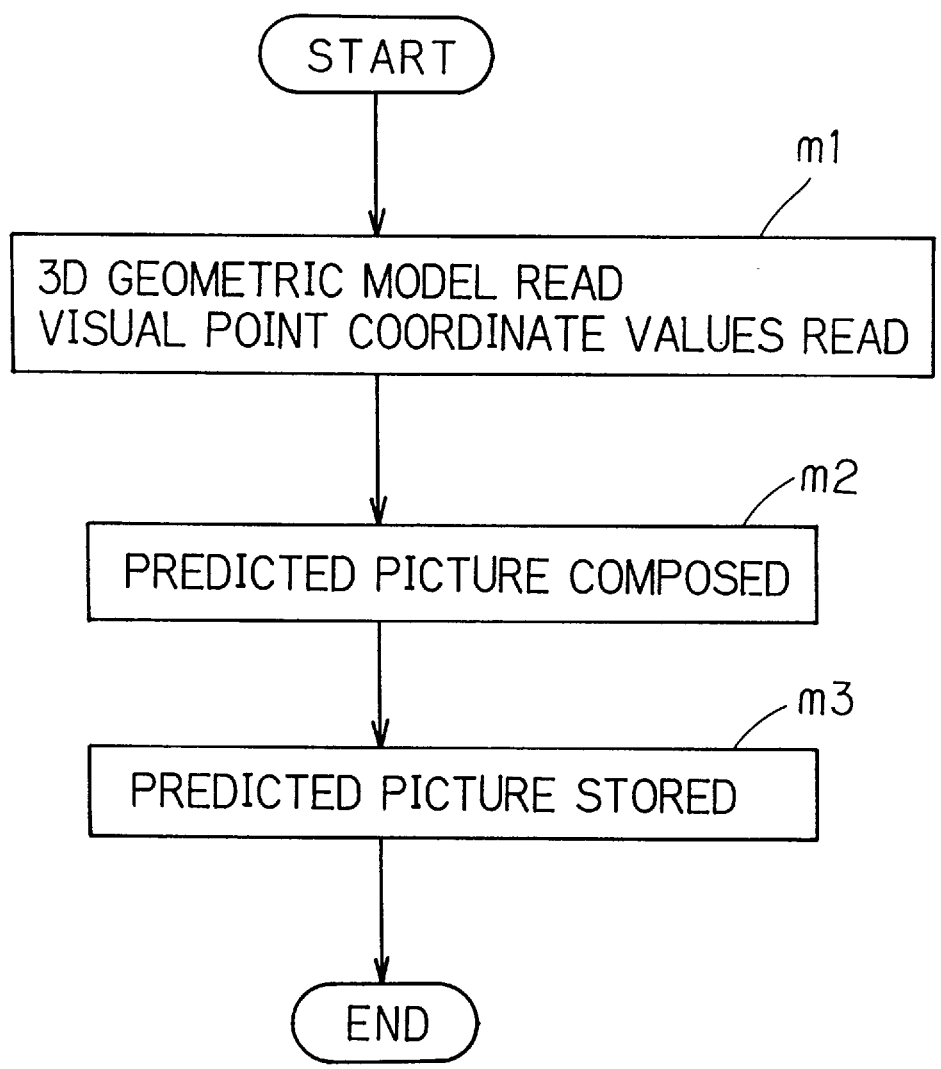
FIG. 56 is a flow diagram of the predicted picture generating unit.

FIG. 56 shows a flow of processing in the predicted picture generating section 303.

In step m1, the image composing means 307 reads out the model from the model memory 301 and the coordinate values of visual point from the picture memory 302.

In step m2, the picture composing means 307 composes a predicted picture from the model and visual point coordinates as follows.

In step m3, the predicted picture thus composed is stored in the predicted picture memory 308.

The procedure for composing a predicted picture in the picture composing means 307 is now described with reference to FIG. 57.

Figure 57:
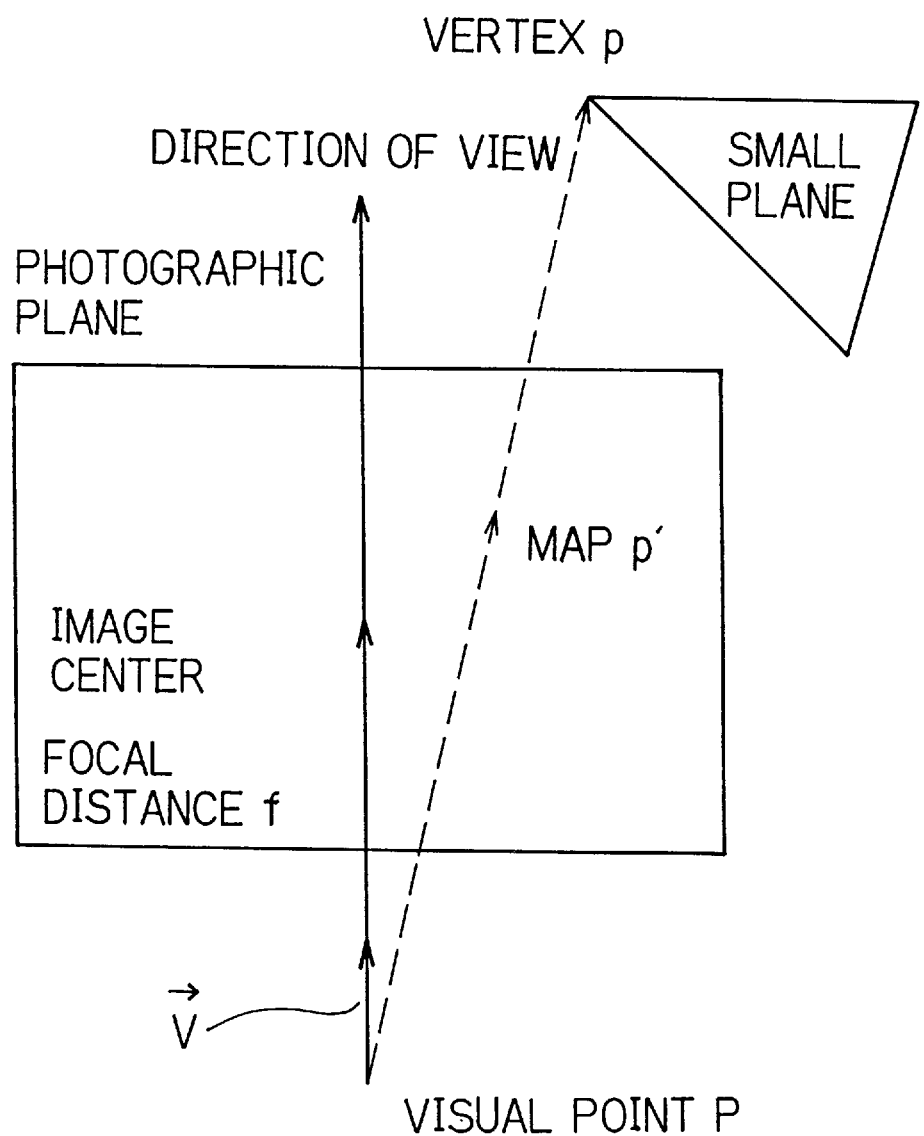
FIG. 57 is a diagram showing the positional relationship between a small plane constituting a model and a photographic plane.

FIG. 57 shows the topological relationship between the small plane constituting the model and the photographic plane. The position vector of vertex p of the small plane in the model is expressed as $\vec{p}$. The attributes of the small plane are expressed as C.

The position vector of visual point P and the unit vector of the direction of view are expressed as $\vec{P}$, $\vec{V}$, respectively. The focal distance of the camera used for photographing is expressed as f.

Figure 58:
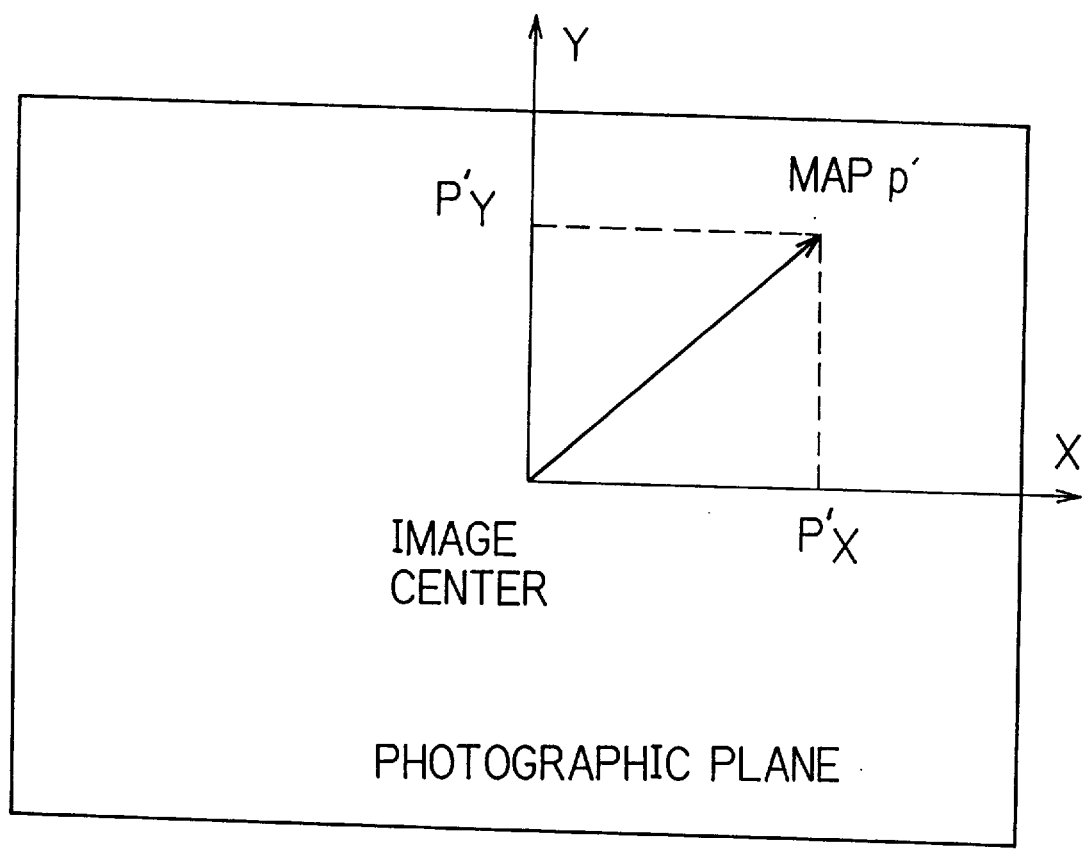
FIG. 58 is a diagram indicating a mapping of the vertices of a small plane on the photographic plane.

As illustrated in FIG. 58, the map p' of each vertex on the photographic plane represent vectors of a coordinate system on the picture and can be expressed by the following equations.

$$\vec{p'} = (p'x, p'y)$$

$$p'x = \left[ \frac{f}{|\vec{p}-\vec{P}|} (\vec{p}-\vec{P}) - f\vec{V} \right] \cdot I$$

$$p'y = \left[ \frac{f}{|\vec{p}-\vec{P}|} (\vec{p}-\vec{P}) - f\vec{V} \right] \cdot J$$

Where the vectors I and J are the unit vectors in the X- and Y-directions, respectively, in the coordinate system on the photographic plane or the inner product of the vectors.

The region enclosed by the maps of respective vertices is referred to as the mapping region of the small plane.

The mapping region is determined for all small planes within the model by the above procedure and the attributes of points within the mapping region of the same small plane are taken as the attributes of the particular small plane. When the same point on the photographic plane is included in the mapping region of different small planes, it is assumed as being included in the mapping region of the small plane closest to the visual point and its attributes are regarded as the attributes of the small plane corresponding to the mapping region in which the point is included.

By the above procedure, a predicted picture is obtained as a set of the mapping regions of small planes.

Figure 59:
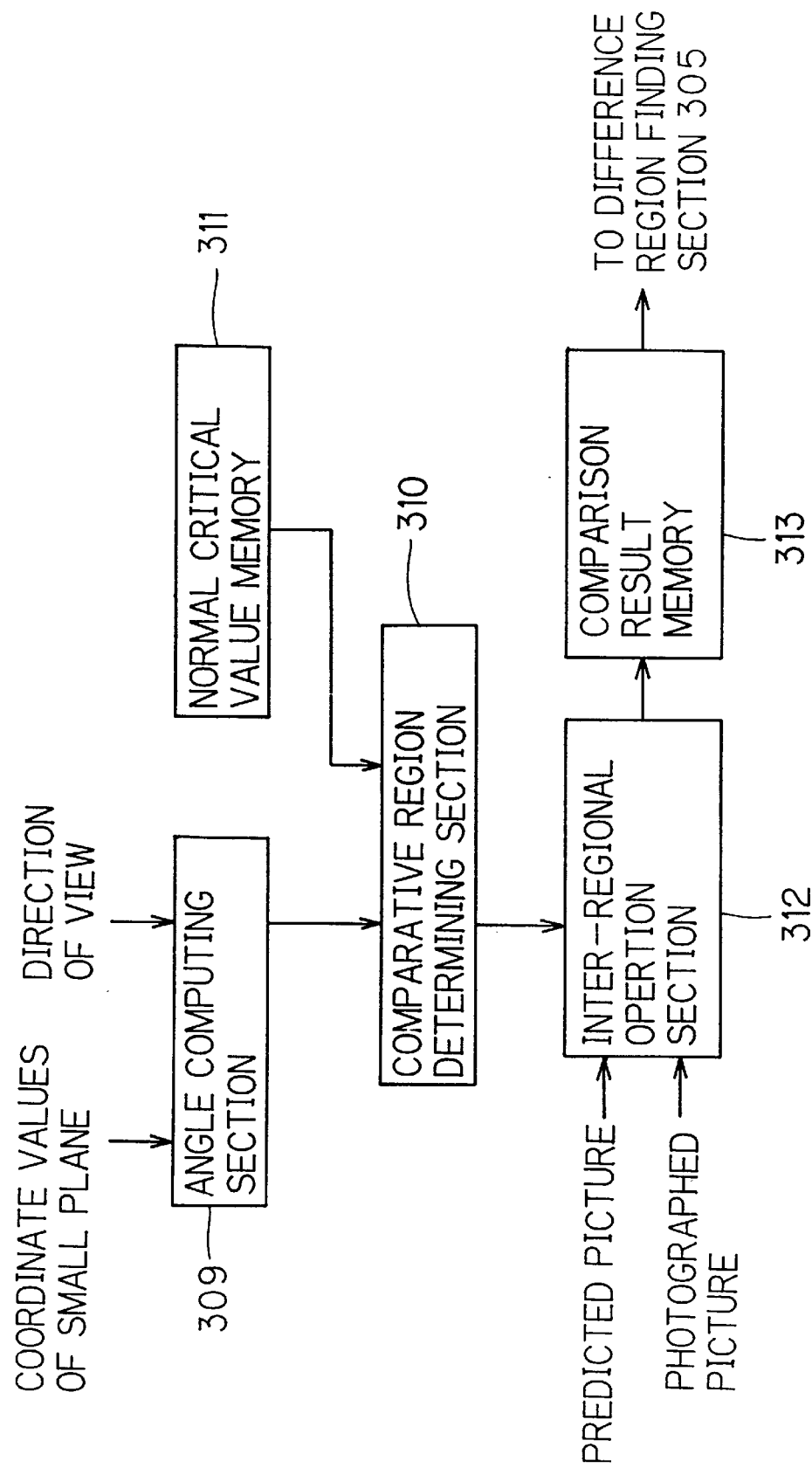
FIG. 59 is a block diagram of the picture comparing unit.

FIG. 59 is a block diagram of the picture comparing section 304. The picture comparing section 304 comprises an angle computing section 309, a comparative region determining section 310, a normal critical value memory 311, an inter-regional operation section 312, and a comparison result memory 313.

Figure 60:
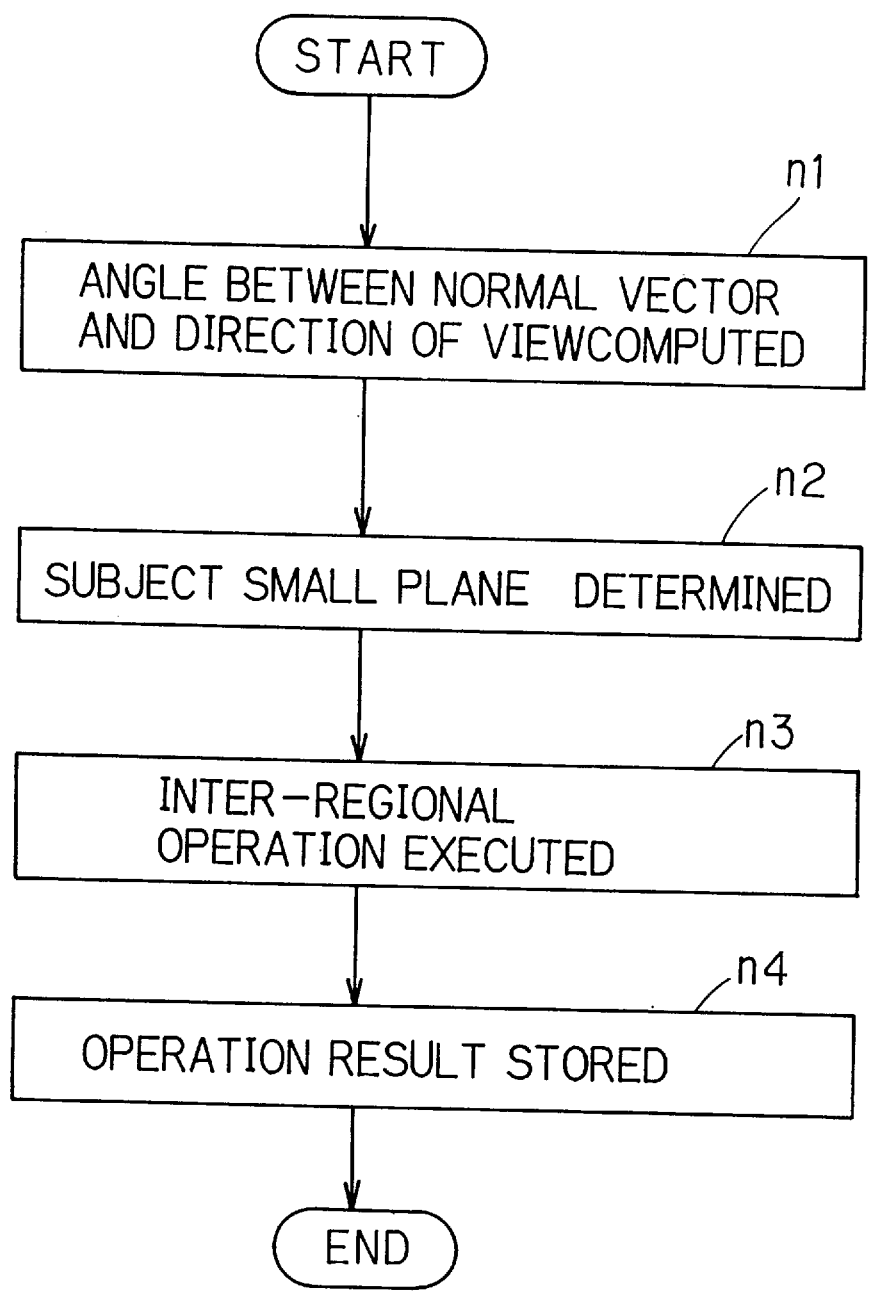
FIG. 60 is a flow diagram of the picture comparing unit.

FIG. 60 shows a flow of processing in the picture comparing section 304.

In step n1, the angle computing section 309 reads out the coordinate values of the small plane corresponding to each mapping region in the predicted image from the model memory 301, determines the normal vector, reads out the direction of view from the picture memory 302, and computes the angle with the direction of view.

In step n2, the comparative region determining section 310 reads out the angle value from the normal critical value memory 311 and determines a small plane such that the computed angle is not greater than or below that value. The thus-determined small plane is called the subject small plane.

In step n3, the inter-regional operation section 312 performs operations between the mapping region of the subject small plane in the predicted picture and the region in the corresponding position in the photographed picture.

In step n4, the comparison result memory 313 stores the operation result.

An example of operation by the inter-regional operation section 312 is now described.

Figure 61A:
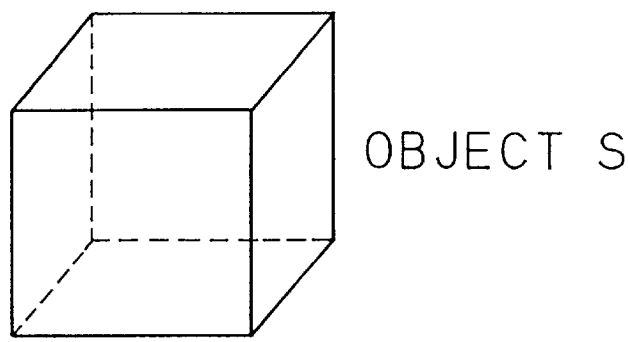
FIG. 61 is a diagram showing the relationship between the model and predicted picture of an object.
Figure 61B:
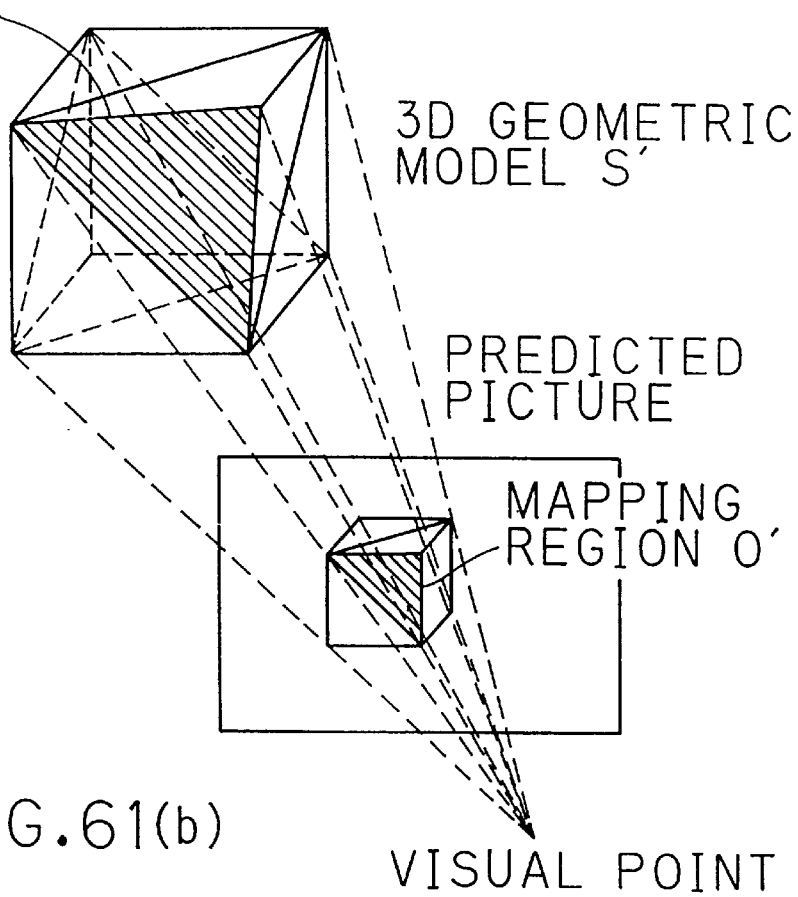

The case in which the model of an object S such as shown in FIG. 61 (a) is changed is explained.

Figure 62A:
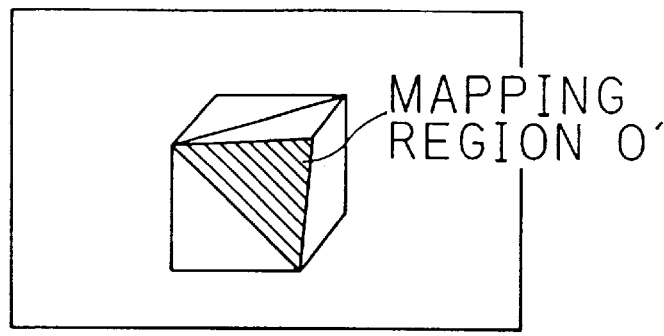
FIG. 62 is a diagram showing the relation among the predicted picture, the picture actually taken and the difference region.
Figure 62B:
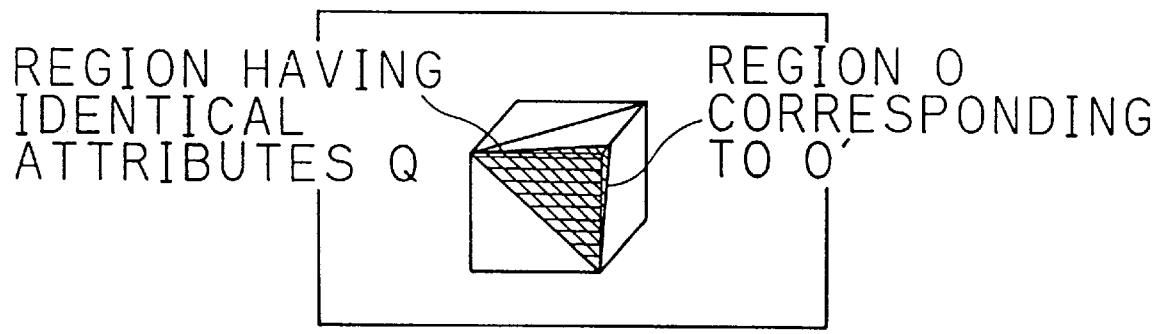
Figure 62C:
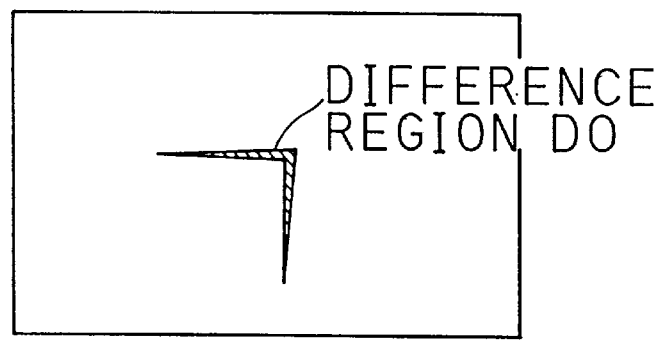

It is assumed that where the model of object S is S' in FIG. 61 (b), the predicted picture that should be obtained on photographing from visual point P provided model S' be correct is as illustrated in FIG. 61 (b). The shaded region O' in the predicted picture is the mapping region of the subject small plane T shown as the shaded region of model S'. The predicted picture including this mapping region O' is shown in FIG. 62 (a). On the other hand, it is assumed that the photographed picture is as shown in FIG. 62 (b) and that the region corresponding to the mapping region O' of the subject small plane is the shaded portion O. Then, the region Q of photographed picture having the same attributes as the subject small plane is indicated by horizontal lines, whereupon the region differing in attributes between O and Q is dO as shown in FIG. 62 (c). This is the operation result. The region representing the operation result is called the difference region and, in this example, dO is the difference region.

Here, as a method for extracting the region Q of the photographed picture, the user may manually designate a region corresponding to the subject small plane T or the region having the same attributes as the attributes of subject small plane T stored in the model memory.

Figure 63:
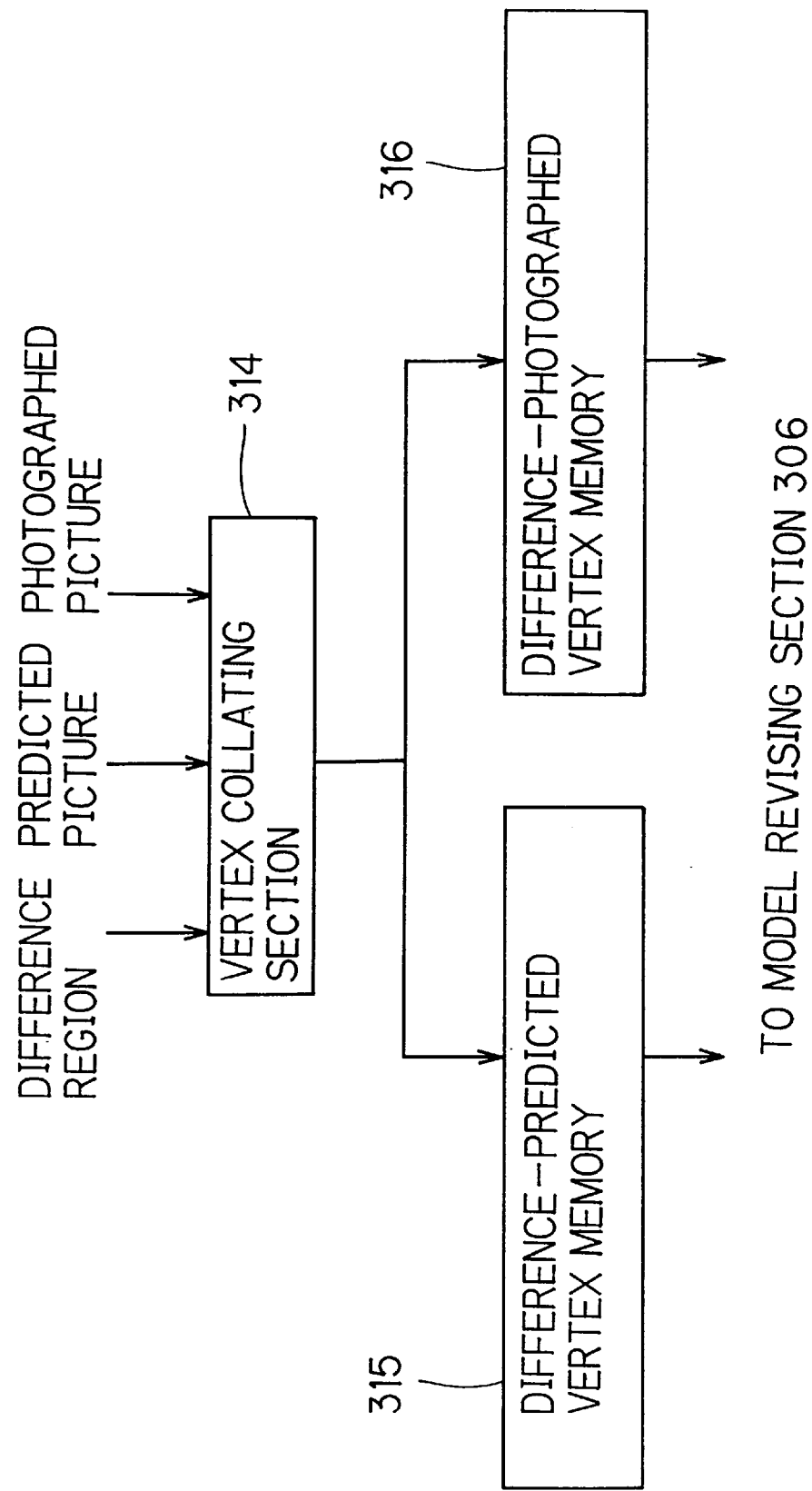
FIG. 63 is a block diagram of the difference region finding unit.

FIG. 63 shows the architecture of the difference region finding section 305. The difference region finding section 305 comprises a vertex collating section 314, a difference-predicted vertex memory 315, and a difference-photographed vertex memory 316.

Figure 64:
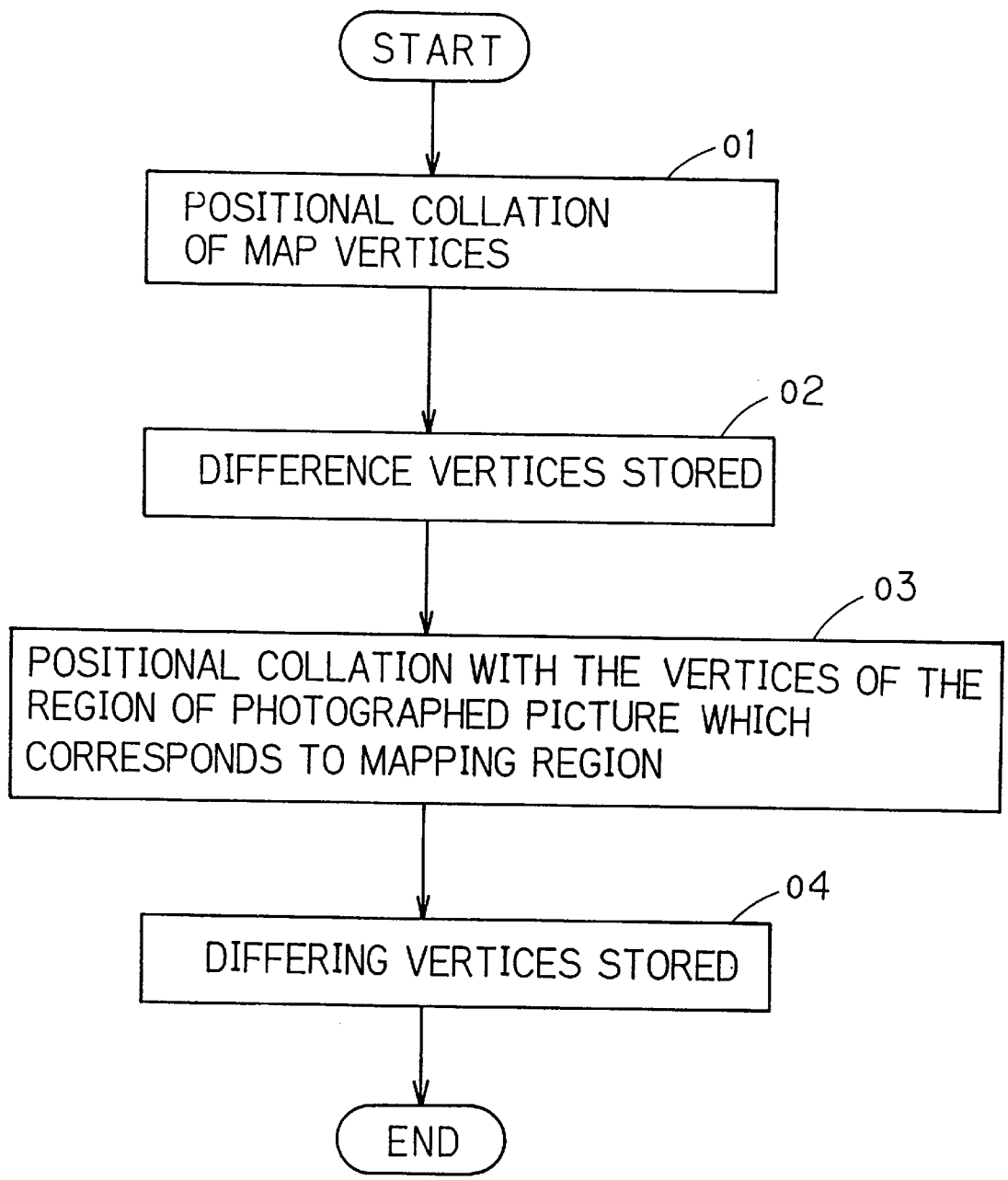
FIG. 64 is a flow diagram of the difference region finding unit.

FIG. 64 shows the flow of processing in the difference region finding section 305.

In step o1, the vertex collating section 314 reads out the difference region from the comparison result memory 313 and extracts the vertices of the difference region. The following techniques, among others, can be used for this purpose.

(1) The method which comprises extracting pixels such that the change in the slope of the outline as computed from the neighboring pixels is greater than a preset threshold value.

(2) The method which comprises taking neighboring pixels on the borderline of the difference region, serially calculating the distance between each of the pixels and the barycenter determined from the pixels in the difference region, and extracting pixels such that the change in distance is greater than a preset threshold value.

(3) The method which comprises performing the removal of noise by contraction or expansion of the difference region, trimming of the borderline or an integration of regions as a pretreatment and, then, performing the extraction using the above method (1) or (2).

Thereafter, a positional collation is performed between the vertices of the difference region and the vertices of the mapping region. This collation can be performed by, for example, the technique which comprises calculating the distance between a vertex of the difference region and the corresponding vertex of the mapping region, selecting the vertex giving the shortest distance, and regarding the vertex giving a distance beyond a preset threshold value as the difference vertex.

The difference vertex found as the result of collation is stored in the difference-photographed vertex memory 316 in step o2. Thus, among the vertices of the difference region, one which is not in agreement with the vertex of the mapping region O' as shown in FIG. 62 (a) is regarded as a difference vertex in the corresponding region within the photographed picture and, as such, is stored in the difference-photographed vertex memory 316.

Then, in step o3, the vertex collating section 314 reads out the photographed picture from the picture memory 302. By way of illustration, after extraction of pixels having the same attributes as the subject small region from the region O of FIG. 62 (b), the vertices of region Q in FIG. 62 (b) are extracted by the same method as used for the extraction of the vertices of the difference region. Then, a positional collation with the vertices of the difference region and any differing vertex is stored in the difference-predicted vertex memory 315 in step o4. In other words, of the vertices of the difference region, one which does not coincide with the vertex of the region Q in FIG. 62 (b) is regarded as being a distinct vertex of the mapping region O' in the predicted picture and is stored in the difference-predicted vertex memory 315.

Figure 65:
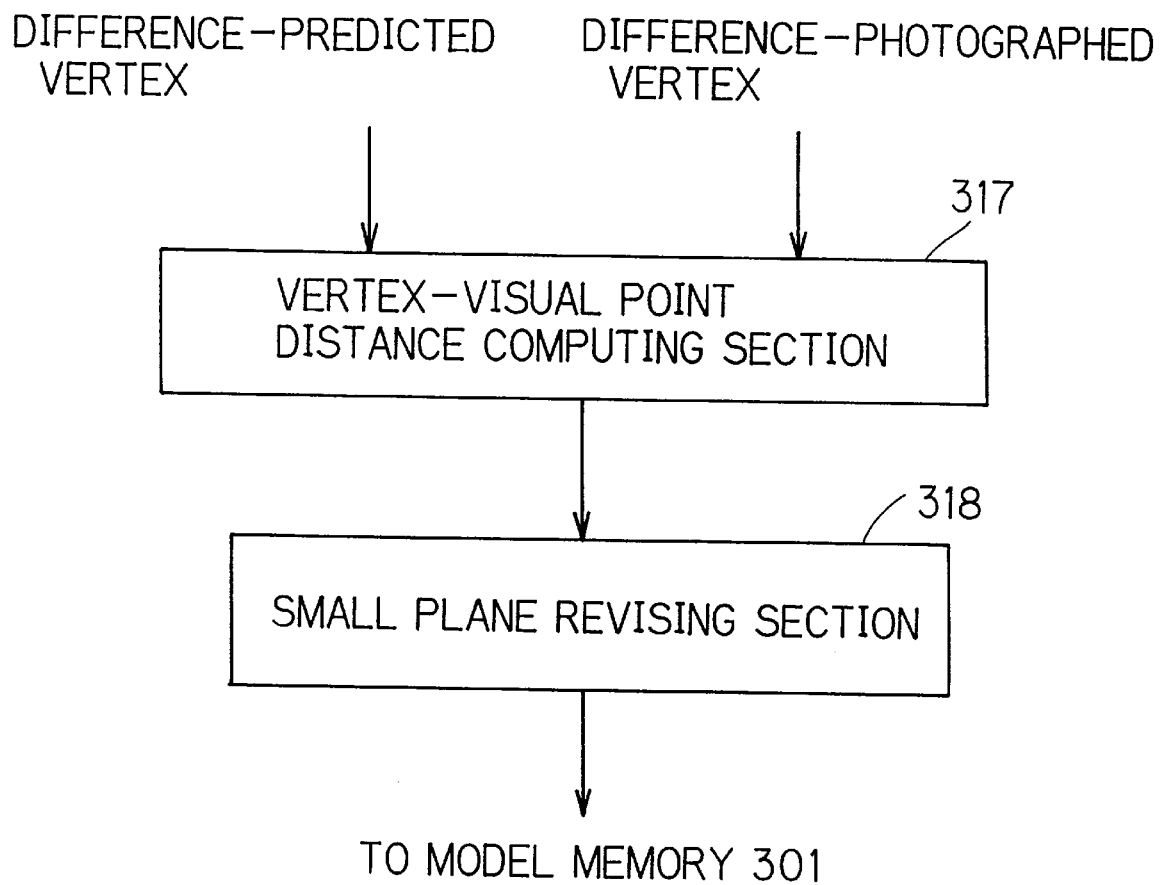
FIG. 65 is a block view of the model revising unit.

FIG. 65 shows the construction of the model revising unit 306. The model revising unit 306 comprises a vertex-visual point distance computing section 317 and a small plane revising section 318.

Figure 66:
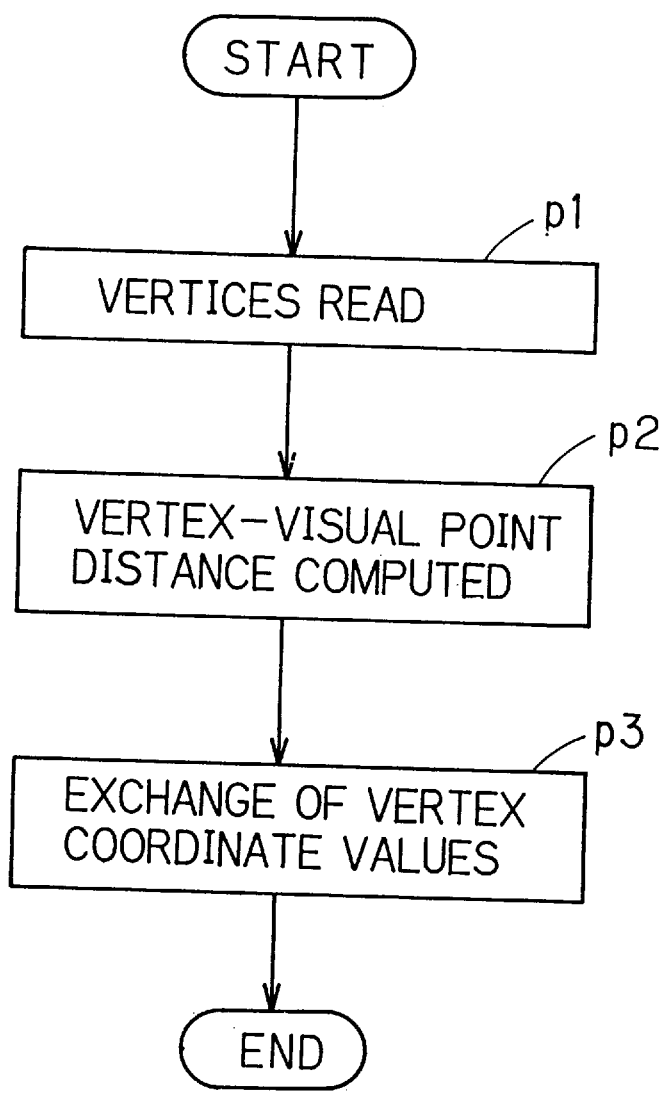
FIG. 66 is a flow diagram of the model revising unit.

FIG. 66 shows the flow of processing in the model revising unit 306.

In step p1, the vertex-visual point distance computing section 317 reads out the vertices from the difference-predicted vertex memory 315 and the difference-photographed vertex memory 316. The vertex read from the difference-predicted vertex memory 315 is designated as A and the vertex read from the difference-photographed vertex memory 316 is designated as B.

In step p2, the vertex-visual point distance computing section 317 computes the distance d between the vertex A and the visual point within the space.

In step p3, the small plane revising section 318 reads out the small plane model including this vertex A from the model memory 301, selects the point which lies on the straight line passing through the vertex B and visual point and situated at a distance of d from the visual point as A' and substitutes the coordinate values of A' for the coordinate values of A.

Figure 67A:
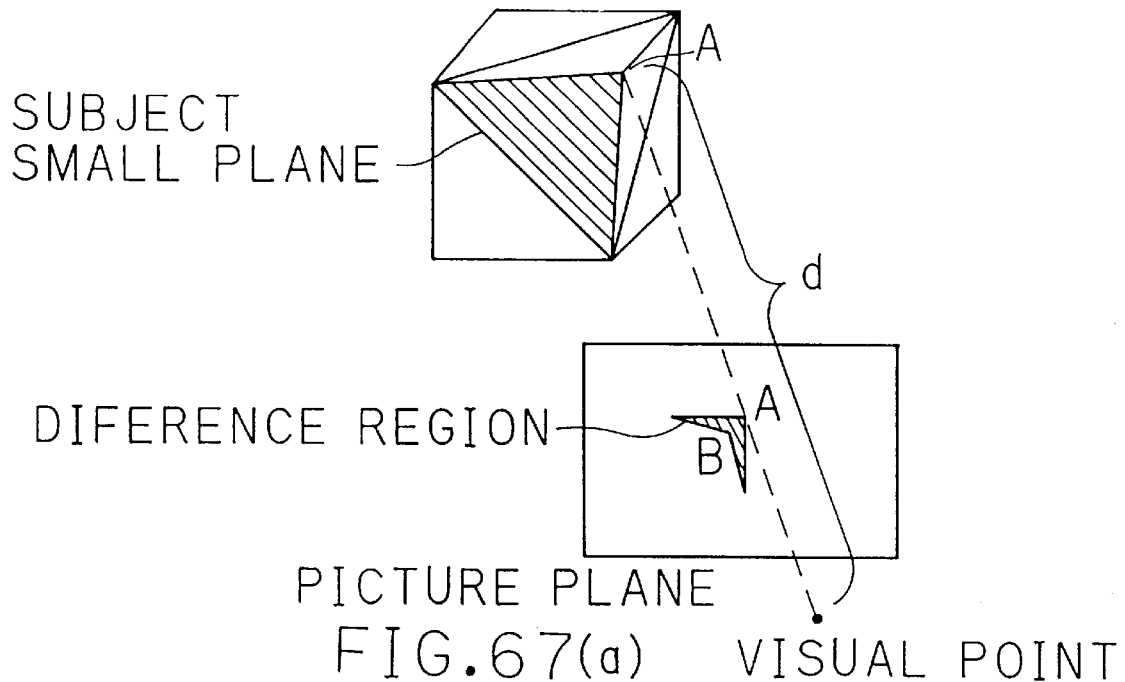
FIG. 67 is a diagram showing a specific model vertex correction procedure in the model revising unit.
Figure 67B:
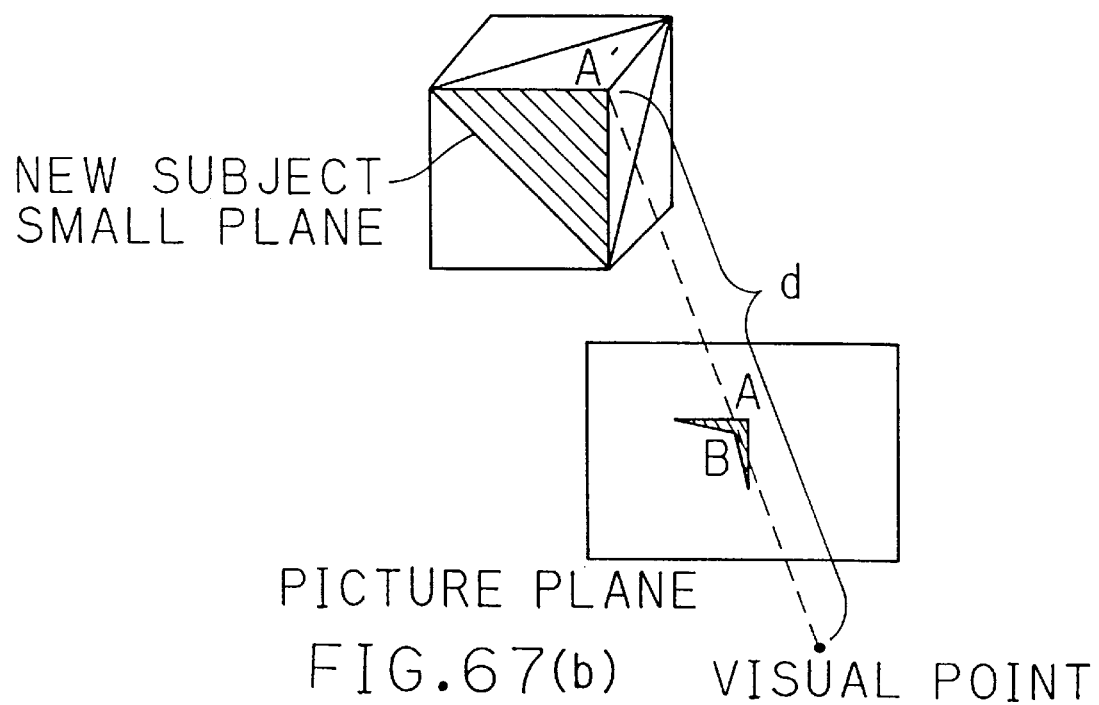

FIG. 67 (a), (b) are diagrams showing the above processing in detail. Referring to FIG. 67 (a), the predicted vertex A on the picture plane is the point mapped from the vertex coordinate A of the small plane model. However, on the picture plane, predicted vertex A differs from photographed vertex B. Therefore, the vertex A of the small plane model must be revised.

Therefore, as shown in FIG. 67 (*b*), the coordinate values of point A' in the space which lies on the straight line interconnecting the visual point and vertex B and situated at a distance of d from the visual point is substituted for A as one vertex of the small plane model. In this manner, the model in the model memory is successively modified to confirm to the actual position and configuration of the object.

Where N dots $\{B_i: i=1, 2, \ldots, N\}$ are stored in the difference-photographed vertex memory 316, the following procedure, for instance, is taken. After the vertex-visual point distance computing section 317 has computed the distance d between A and the visual point within a space, the small plane revising section 318 reads out the small-plane model including the vertex A from the model memory 301 and calculates the coordinate values of point $A_i$ situated on the straight line passing $B_i$ and the visual point and at a distance of d from the visual point for $\{B_i: i=1,2,\ldots,N\}$. After a tetrahedron is constructed using 3D Broni's trigonometry from the two vertices other than $\{A_i: i=1, 2, \ldots, N\}$ and small plane A, the triangle situated in the outermost position of the model is substituted for the small plane read out as the surface.

Figure 68A:
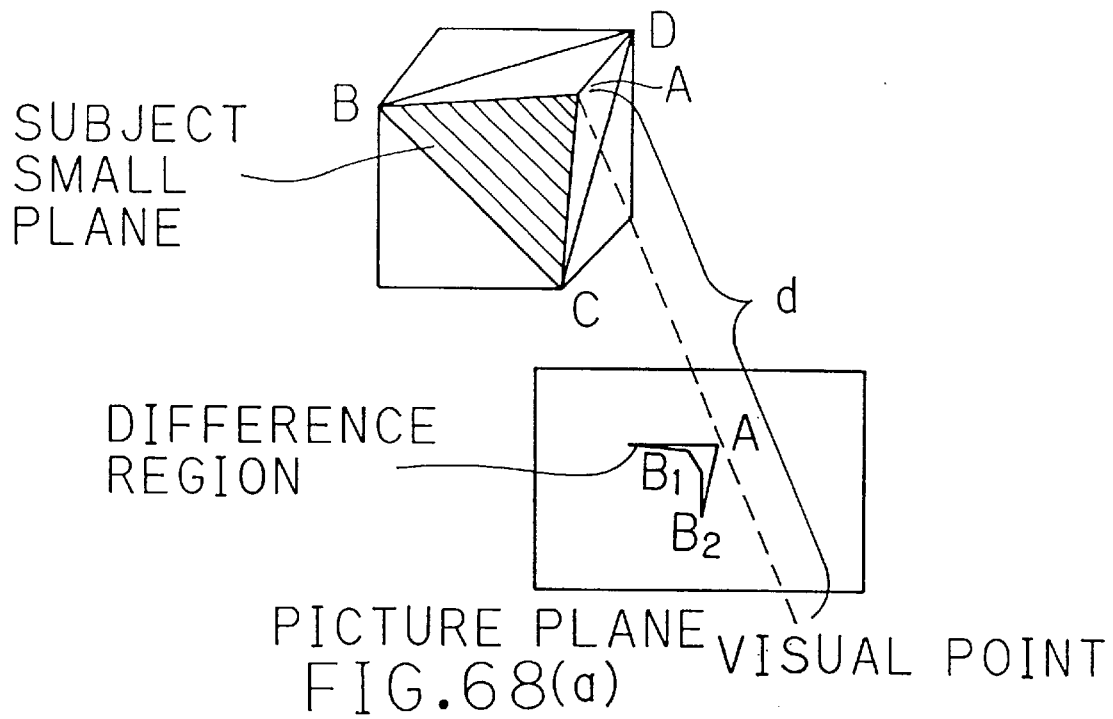
FIG. 68 is a diagram showing another specific model vertex correcting procedure in the model revising unit.
Figure 68B:
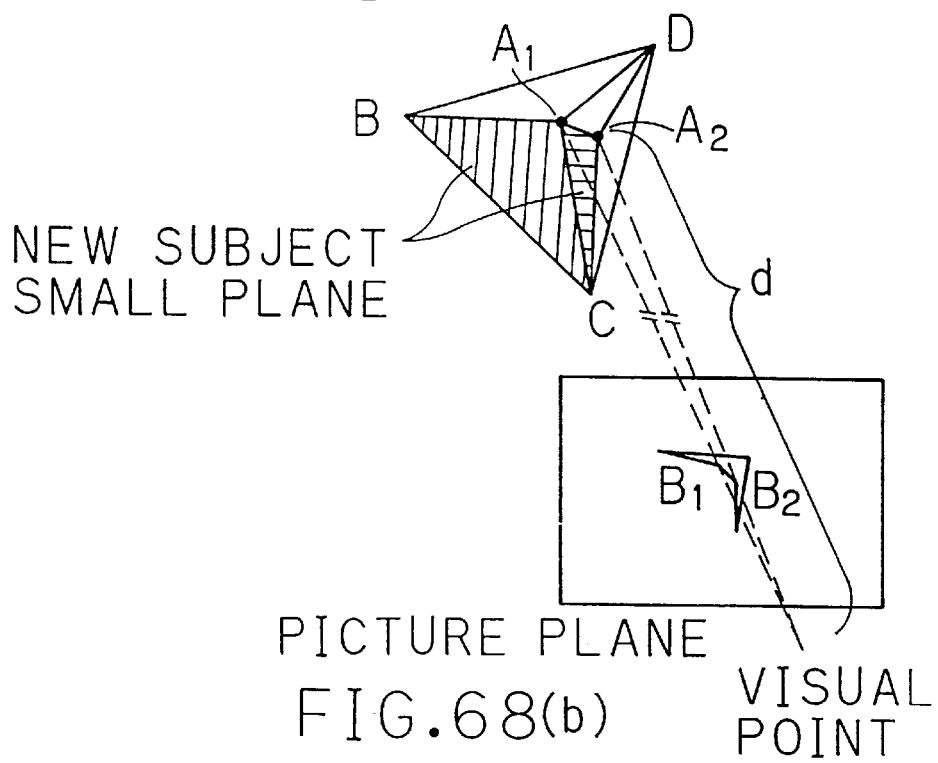

FIG. 68 (*a*), (*b*) are diagrams showing this processing in detail. In FIG. 68 (*a*), the predicted vertex A on the picture plane is the point mapped from the vertex coordinate A of the small-plane model. However, the difference region on the picture plane includes photographed vertices $B_1$, $B_2$ which are different from said vertex. Therefore, the vertex A of the small-plane model must be revised.

Therefore, as illustrated in FIG. 68 (*b*), an interspatial point which is situated on the straight line interconnecting the visual point with $B_1$ at a distance of d from the visual point is designated as $A_1$ and using this $A_1$ and the three vertices B, C and D of the initial small-plane model, a first tetrahedron is constructed in the first place.

Then, an interspatial point which is situated on the straight line interconnecting the visual point with $B_2$ at a distance of d from the visual point is designated as $A_2$ and using this $A_2$ and the three vertices B, C and D of the initial small-plane model, a second tetrahedron is constructed.

From a solid consisting of these first and second tetrahedrons, triangles corresponding to the original subject small plane are respectively extracted. Thus, a triangle ABC is extracted from the first tetrahedron and a triangle $A_1A_2C$ is extracted from the second tetrahedron. In this manner, in lieu of the original subject small plane ABC shown in FIG. 68 (*a*), a triangle $A_1$, $A_2$, B, C shown in FIG. 68 (*b*) is constructed.

By the above processing, the model is sequentially revised to live up with the actually photographed picture and the revised model is stored in the model memory 301.

It should be understood that, in this invention, the model may be sequentially modified as complete data by applying the above processing repeatedly to pictures sequentially photographed from a plurality of different visual points.

What is claimed is:

1. A modeling apparatus comprising:

three-dimensional information input means for measuring and inputting pieces of three-dimensional information concerning objects in a space, said pieces of three-dimensional information comprising (I) three-dimensional geometric information composed of distance and shape data, and (ii) surface attribute information including at least one data item selected from a group consisting of color, pattern and reflectance, environmental model processing means for constructing an environmental model for each object in said space by comparing prestored object data to the pieces of three-dimensional information input by said three-dimensional information input means, picture composing means for composing an artificial picture viewed from a specific viewpoint within said space according to the environmental model constructed by said environmental model processing means, analyzing means for comparing a predetermined plane region in the artificial picture composed by said picture composing means with a predetermined plane region viewed from a specific viewpoint and extracted from the pieces of three-dimensional information comprising three dimensional geometric information and surface attribute information input by said three-dimensional information input means and for providing a revise command for change of the environmental model when a difference is found between the plane region in said artificial picture and the plane region viewed from said specific viewpoint, and observation control means responsive to the revise command, for changing a measurement position of said three-dimensional information input means according to the revise command, wherein said observation control means includes means for changing the environmental model by varying the measurement position of said three-dimensional information input means to allow a difference between the plane region in the artificial picture and the plane region viewed from the specific viewpoint to be minimized in said analyzing means while causing said environmental model processing means to provide an environmental model within said space.

2. The modeling apparatus according to claim 1 wherein said three-dimensional information input means comprises stereo measuring means for obtaining three-dimensional information on an object from a plurality of camera images, three-dimensional measuring means for obtaining three-dimensional information on an object from a series of pictures taken by varying the focal distance of a single camera, and light pattern projection control means for projecting a light pattern to the object and inputting its camera images into said stereo measuring means.

3. The modeling apparatus according to claim 2 wherein said environmental model processing means comprises intra-environmental position detecting means for detecting a position of said three-dimensional information input means in a world coordinate system according to an amount of movement of the modeling apparatus, three-dimensional environmental data updating means for transforming the three-dimensional information input by said three-dimensional information input means into data in the world coordinate system according to the position detected by said intra-environmental position detecting means, three-dimensional environmental data memory updating means for tessellating said space into a three-dimensional grid of cells and for storing and updating a probability that a cell corresponds to an object in said space, and object data managing means for constructing an environmental model description for an object in the space by collating cells having stored probabilities which are higher than a predetermined threshold value.

4. The modeling apparatus according to claim 3 wherein said picture composing means comprises camera coordinate system transforming means for transforming the environmental model to data in a camera coordinate system based on a measuring position of said three-dimensional information input means, model picture composing means which composes an artificial picture of said three-dimensional information input means according to the environmental model transformed by said camera coordinate system transforming means, and display means for displaying the artificial picture.

5. The modeling apparatus according to claim 4 wherein said analyzing means comprises comparative region means for extracting and comparing characteristic regions from said artificial picture and said three-dimensional information input by said three-dimensional information input means, environmental model description revise command preparing means which, when a disagreement occurs between respective ones of said characteristic regions extracted and compared by said comparative region means, outputs a command to revise the environmental model description in accordance with the three-dimensional information, and a mobile observation command preparing means, responsive to said command to revise the environmental model description, outputs a mobile observation command to said three-dimensional information input means.

6. The modeling apparatus according to claim 5 wherein said observation control means comprises mobile mechanism control means which, in response to said mobile observation command, prepares a range, speed and steering angle command and outputs it as mobile control information to said three-dimensional information input means and movement amount computing means for outputting the amount of movement for the detection of position according to said range, speed and steering angle to said intra-environmental position detecting means.

7. The modeling apparatus according to claim 6 wherein said object data managing means is responsive to said command to revise the environmental model description by using three-dimensional information newly measured and fed by said three-dimensional information input means.

8. The modeling apparatus according to claim 1 wherein said environmental model processing means comprises object data memory means for previous storage of data relevant to an intra-environmental object, recognition means for recognizing an intra-environmental object from the data stored in said object data memory means and environmental configuration and surface attribute data input from said three-dimensional information input means and determining the intra-environmental position of the recognized object, object data disposition means for substituting the data relevant to the intra-environmental object recognized by said recognition means for the environmental configuration and surface attribute data obtained by said three-dimensional information input means in the intra-environmental position of the object as determined by said recognition means, and environmental model memory means for storing the object data so substituted by said object data disposition means.

9. A modeling apparatus comprising:

three-dimensional information input means for measuring pieces of three-dimensional information using visual information input from a TV camera or ultrasonic sensors, said pieces of three-dimensional information comprising (I) three-dimensional geometric information composed of distance and shape data, and (ii) surface attribute information including at least one data item selected from a group consisting of color, pattern and reflectance, environmental model processing means for managing the pieces of three-dimensional information input from said three-dimensional information input means and for constructing an environmental model, picture composing means for composing an artificial picture viewed from a specific viewpoint within a space according to the constructed environmental model, analyzing means for comparing a predetermined plane region in the composed artificial picture with a predetermined plane region viewed from said specific viewpoint and extracted from the pieces of three-dimensional information comprising three dimensional geometric information and surface attribute information, and for providing a revise command for change of the environmental model when a difference is found between the plane region in said artificial picture and the plane region viewed from said specific viewpoint, observation control means responsive to the revise command from said analyzing means for changing a measurement position of said three-dimensional information input means, said observation control means including means for distinguishing between outline and non-outline data of a target space in the pieces of three-dimensional information and for changing a measurement position of said three-dimensional information input means so as to sequentially construct a detailed environmental model starting with said outline data, and said observation control means further including means for changing the environmental model by varying the measurement position of said three-dimensional information input means to allow a difference between the plane region in the artificial picture and the plane region viewed from the specific viewpoint to be minimized in said analyzing means while causing said environmental model processing means to provide an environmental model approximating the object within said space.

10. The modeling apparatus according to claim 9 wherein said three-dimensional information input means comprises picture input means for input of pictures, depth computing means which acquires depth using the pictures input from said picture input means, and coordinate transforming means which transforms depth data from said depth computing means to coordinate data in a pre-established coordinate system to acquire three-dimensional data.

11. The modeling apparatus according to claim 9 wherein said observation control means comprises
- outline data generating means which generates outline data, non-outline data and picture data for a target space from the data from said three-dimensional information input means,
- accumulating means for accumulating the outline data, non-outline data and picture data generated by said outline data generating means,
- surface information analyzing means which performs a surface information analysis of the picture data accumulated in said accumulating means, and
- observation position/direction computing means for computing an observation position/direction which clears a background of the observation object using the surface information analyzed by said surface information analyzing means and the outline and non-outline data accumulated in said accumulating means.

12. A modeling apparatus comprising:
- three-dimensional information input means for measuring, using a TV camera or ultrasonic sensor means, pieces of three-dimensional information comprising (I) three-dimensional geometric information composed of distance and shape data, and (ii) surface attribute information including at least one data item selected from a group consisting of color, pattern and reflectance,
- environmental model processing means for managing the pieces of three-dimensional information and for constructing and storing an environmental model description,
- picture composing means for composing an artificial picture viewed from a specific viewpoint within a space according to the environmental model constructed by said environmental model processing means,
- analyzing means for comparing a predetermined plane region in the artificial picture composed by said picture composing means with a predetermined plane region viewed from said viewpoint and extracted from the pieces of three-dimensional information comprising three-dimensional geographic information and surface attribute information, and for providing a revise command for change of the environmental model when a difference is found between the plane region in said artificial picture and the plane region viewed from said specific viewpoint, and
- observation control means responsive to the revise command of said analyzing means for changing a measurement position of said three-dimensional information input means,
- said observation control means comprising
  - error region estimating means for estimating an error region for a position of an observation point measured by said three-dimensional information input means,
  - observing site determining means for predicting an error region for said position of the observation point from a new observing site and for determining said new observing site so that an overlap region between the error region estimated by said error region estimating means and the predicted error region will not be greater than the estimated error region, and
  - position re-estimating means for re-estimating the position of the observation point based on a result of measurement by said three-dimensional information input means from the observing side determined by said observing site determining means,
- wherein said observation control means changes the environmental model by varying the measurement position of said three-dimensional information input means to allow a difference between the plane region in the specific viewpoint to be minimized in said analyzing means to provide an environmental model approximating the object within said space.

13. The modeling apparatus according to claim 12 wherein said observing site determining means is adapted to select, when a plurality of candidates are available for said new observing site, a site providing for a smallest distance of movement as the new observing site.

14. The modeling apparatus according to claim 12 wherein said observing site determining means is adapted to insure that a distance between said new observing site and said position of observation point is equal to a distance between said position and the modeling apparatus.

15. The modeling apparatus according to claim 14 wherein said observing site determining means is adapted to select, when said estimated error region is a polyhedron, a diagonal line from among diagonal lines of said polyhedron, which has a smallest angle with a straight line interconnecting said position of observation point and the modeling apparatus and to determine said new observing site on a line of intersection of a plane perpendicular to said selected diagonal line with a horizontal plane.

16. The modeling apparatus according to claim 14 wherein said observing site determining means is adapted to perform a principal component analysis of coordinate values of points within said estimated error region, select a principal axis, from among a first, second and third principal axes, which has a smallest angle with a straight line passing through said position of observation point and the modeling apparatus, and to determine said new observing site on a line of intersection of a plane perpendicular to said principal axis with a parallel plane including said position of observation point.

17. A modeling apparatus comprising:
- three-dimensional information input means for inputting, using an observation device such as a camera, ultrasound or other visual sensor means, pieces of three-dimensional information comprising (I) three-dimensional geometric information composed of distance and shape data, and (ii) surface attribute information including at least one data item selected from a group consisting of color, pattern and reflectance,
- environmental model processing means for managing the pieces of three-dimensional information and for constructing and storing an environmental model description,
- picture composing means for composing an artificial picture viewed from a specific viewpoint within a space according to the environmental model description constructed by said environmental model processing means,
- analyzing means comparing a predetermined plane region in the composed artificial picture with a predetermined plane region viewed from said specific viewpoint and extracted from said pieces of three-dimensional information comprising three-dimensional geometric information and surface attribute information, and for providing a revise command for change of the environmental model when a difference is found between the plane region in said specific viewpoint, and observation control means responsive to the revise command from said analyzing means for changing a measurement point of said three-dimensional information input means, said observation control means being adapted to control a rotary motion of said observation device so that the three-dimensional information relevant to an outline of an observation target space is input by a change of a direction of view from one visual point and, computing a position and direction of said observation device from said three-dimensional information relevant to the outline of said observation target space, and controlling the rotary motion of said observation device to input three-dimensional information relevant to an interior of said target spaced, and wherein said observation control means changes the environmental model by varying the measurement position of said three-dimensional information input means to allow a difference between the plane region in the artificial picture and the plane region viewed from the specific viewpoint to be minimized in said analyzing means while causing said environmental model processing means to provide an environmental model approximating the object within said space.

* * * * *